(12) United States Patent
Yamasaki et al.

(10) Patent No.: US 6,207,794 B1
(45) Date of Patent: Mar. 27, 2001

(54) POLYOXYALKYLENE POLYOLS, DERIVATIVES THEREOF, AND PROCESS FOR PRODUCING THE POLYOXYALKYLENE POLYOLS

(75) Inventors: Satoshi Yamasaki; Yasunori Hara; Satoshi Tamura; Fumio Yamazaki; Hitoshi Watanabe; Mikio Matsufuji; Shinsuke Matsumoto; Ariko Nishikawa; Tsukuru Izukawa, all of Aichi-ken; Masaaki Aoki, Kanagawa-ken; Tadahito Nobori, Kanagawa-ken; Usaji Takaki, Kanagawa-ken, all of (JP)

(73) Assignee: Mitsui Chemical, Inc. (JP)

( * ) Notice: Subject to any disclaimer, the term of this patent is extended or adjusted under 35 U.S.C. 154(b) by 0 days.

(21) Appl. No.: 09/202,559

(22) PCT Filed: May 28, 1998

(86) PCT No.: PCT/JP98/02340

§ 371 Date: Dec. 17, 1998

§ 102(e) Date: Dec. 17, 1998

(87) PCT Pub. No.: WO98/54241

PCT Pub. Date: Dec. 3, 1998

(30) Foreign Application Priority Data

May 28, 1997 (JP) .................................... 9-138794
Jul. 11, 1997 (JP) .................................... 9-186379
Aug. 7, 1997 (JP) .................................... 9-213092

(51) Int. Cl.[7] .............................. C08J 3/00; C08K 3/20; C08L 75/00; C08G 59/68; C08G 65/04

(52) U.S. Cl. .................. 528/408; 524/507; 524/589; 524/590; 528/44; 528/65; 528/85; 568/620

(58) Field of Search .................................... 524/507, 589, 524/590; 528/44, 65, 85, 408; 568/620

(56) References Cited

U.S. PATENT DOCUMENTS

| 5,093,380 | | 3/1992 | Takeyasu et al. . | |
| 5,100,997 | | 3/1992 | Reisch et al. . | |
| 5,300,535 | * | 4/1994 | Takeyasu et al. | 521/137 |
| 5,777,175 | | 7/1999 | Ohkubo et al. . | |
| 5,952,457 | * | 9/1999 | Kovno et al. | 528/408 |

FOREIGN PATENT DOCUMENTS

| 763555 | 3/1997 | (EP) . |
| 791600 | 8/1997 | (EP) . |
| 61-221215 | 10/1986 | (JP) . |
| 4-59825 | 2/1992 | (JP) . |
| 6-16764 | 1/1994 | (JP) . |

* cited by examiner

Primary Examiner—Patrick D. Niland
(74) Attorney, Agent, or Firm—Burns, Doane, Swecker, Mathis, L.L.P.

(57) ABSTRACT

The present invention is a polyoxyalkylene polyol, its manufacture method, and derivatives, wherein: it is obtained using a phosphazenium compound as a catalyst; the hydroxyl value is 2~200 mgKOH/g; total degree of unsaturation is 0.0001~0.07 meq./g; the head-to-tail bond selectivity of the polyoxyalkylene polyol is 95 mole %; and when the maximum height of the peak of GPC elution curve is set to be 100%, $W_{20}$ is defined as the peak width at the 20% peak height, and $W_{80}$ is defined as the peak width at 80% peak height, the ratio of $W_{20}/W_{80}$ is 1.5 or greater, and less than 3.

24 Claims, No Drawings

POLYOXYALKYLENE POLYOLS, DERIVATIVES THEREOF, AND PROCESS FOR PRODUCING THE POLYOXYALKYLENE POLYOLS

TECHNICAL FIELD

The present invention relates to a polyoxyalkylene polyol and manufacturing method for the same and also derivatives of polyoxyalkylene polyol. Described in more detail, the present invention relates to a polyoxyalkylene polyol and manufacturing method for the same, wherein: an alkylene oxide is addition polymerized to an active hydrogen compound in the presence of a phosphazenium compound catalyst. The present invention also relates to derivatives of this polyoxyalkylene polyol, which are: polymer dispersed polyol, isocyanate terminated prepolymer, polyurethane resin, polyoxyalkylene polyamine, and polyurethane urea resin which uses polyoxyalkylene polyamine as its raw material.

BACKGROUND TECHNOLOGY

Normally, polyoxyalkylene polyol is manufactured on the industrial scale by addition polymerization of alkylene oxide to an active hydrogen compound in the presence of potassium hydroxide (abbreviated as KOH) catalyst. Alkylene oxide is continuously introduced into a reactor which is stocked with KOH catalyst and an active hydrogen compound which is the polymerization initiator. Under conditions of reaction temperature 105~150° C., maximum reaction pressure 490~588 kPa (5~6 kgf/cm$^2$), the reaction is continued until the desired molecular weight is achieved. A crude polyoxyalkylene polyol is obtained. Next, the polyoxyalkylene polyol manufacturing is completed through postprocessing refining steps such as: neutralizing the potassium in the crude polyoxyalkylene polyol with an acid such as inorganic acid, or the like, filtering the potassium which is extracted through dehydration, drying, or the like.

In the prior art, many studies have been done to enhance the production of polyoxyalkylene polyol. For example, known methods for increasing the reaction speed of the monomer alkylene oxide include: increasing the alkylene oxide concentration at the time of the reaction, increasing the amount of catalyst, increasing the reaction temperature, or the like.

However, when using KOH catalyst for addition polymerization of propylene oxide which is the most widely used alkylene oxide, it is known that, with the above method, when the molecular weight of polyoxyalkylene polyol is increased, there is a by product of a monool which has an unsaturated group at the ends of the molecule.

Normally, the monool content corresponds to the total unsaturation degree (represented by C=C) of the polyoxyalkylene polyol. Because this monool is low molecular weight compared to the polyoxyalkylene polyol generated in the main reaction, it greatly widens the molecular weight distribution of the polyoxyalkylene polyol and lowers the average functional group number. Therefore, whether it is foam or elastomer, the polyurethane resin, which uses a polyoxyalkylene polyol with a high monool content, experience unfavorable results such as increased hysterisis, reduced hardness, reduced extension, reduced curing, increased permanent compression set, or the like.

Many studies have been done in order to suppress the generation of monool by product and to improve production of polyoxyalkylene polyol. For example, in U.S. Pat. No. 3,829,505 and in U.S. Pat. No. 4,472,560, there is proposed a method, wherein: a double metal cyanide complex (abbreviated as DMC) catalyst is used as a catalyst for the propylene oxide addition polymerization. DMC is described as performing very well as a polymerization catalyst for polypropylene oxide.

However, when using DMC as a catalyst for the addition polymerization of ethylene oxide as the alkylene oxide, DMC is first deactivated by reactions with an oxidant such as gas which contained oxygen, peroxides, sulfuric acid, or the like. Catalyst residue is separated from the polyol. Furthermore, there is a need to addition polymerize ethylene oxide using a catalyst of an alkali metal hydroxide such as KOH or an alkali metal alkoxide or the like (U.S. Pat. No. 5,235,114).

Furthermore in U.S. Pat. No. 5,093,380 (Column 2, lines 58~68), there is disclosed a manufacture method for a flexible polyurethane foam which uses a polyoxyalkylene polyol having a low C=C. This kind of polyoxyalkylene polyol having a low C=C is obtained in the presence of a catalyst other than an alkali catalyst. For example, the catalyst can be diethyl zinc, iron chloride, porphyrin metal, DMC or the like. DMC catalyst is described as a particularly favorable catalyst.

Furthermore, in Japanese Laid-Open Publication No. 4-59825, when manufacturing a polyether using DMC, if the initiator is low molecular weight, problems, such as the reaction of the monoepoxide not occurring or else the reaction speed being extremely slow, are described. In order to solve these problems, it is necessary to use an initiator of a polyoxypropylene glycol which has already addition polymerized a propylene oxide. However, with this method, there is a limitation on the usable polymerization initiator and the manufacturing process becomes complicated.

When polyoxyalkylene polyol is made to be a high molecular weight, there is a tendency for the viscosity of polyoxyalkylene polyol to increase. When DMC is used, this trend is particularly noticeable.

In U.S. Pat. No. 5,300,535, because the viscosity of the high molecular weight polyoxyalkylene polyol which uses DMC as a catalyst is high, the use of acrylate, vinyl ether compounds as viscosity lowering agents is demonstrated (Column 2, line 5~column 4, line 12). As a result of research by the present inventors, when the viscosity of polyol is high, troubles of molding stability and mixing properties occur in the mechanical molding of flexible polyurethane foams. There are also problems of inferior processability and reduced mixing properties with auxiliary agents.

In Japanese Laid Open Publication No. 7-278289, there is disclosed a polyoxyalkylene polyol, wherein: it has a hydroxide value (abbreviated as OHV) of 10~35 mg KOH/g, a maximum monool content of 15 mol %, and a minimum selectivity for Head-to-Tail (abbreviated as T-H) bond of 96%. Furthermore, in this publication, the catalyst for manufacture of polyol is an alkali metal hydroxide which has a purity of 90% by weight or greater and is a composition which contained at least one compound selected from: cesium hydroxide or rubidium hydroxide. The above polyoxyalkylene polyol has a low viscosity even when the monool content is reduced. The resulting flexible polyurethane foam has good mechanical properties. It is a polyoxyalkylene polyol with excellent properties. However, in order to manufacture a polyoxyalkylene polyol with OHV of 15 mgKOH/g and a monool content of 15 mol % or less while using cesium hydroxide as the catalyst, a long reaction time is required. When considering the productivity of the polyol, it is not necessarily a satisfactory catalyst.

For a polymer-dispersed polyol with polyoxyalkylene polyol as the dispersion medium and a polyurethane which uses the polymer-dispersed polyol, their properties are greatly influenced by the structure and composition of the polyoxyalkylene polyol which is the dispersion medium.

In Japanese Laid-Open Patent Publication No.3-14812, a manufacturing method for a polymer dispersed polyol which has polyoxyalkylene polyol as the dispersing medium is demonstrated. The polyoxyalkylene polyol is obtained using diethyl zinc, iron chloride, metal porphyrin, DMC as a catalyst. Furthermore, by reducing the C=C in the polyoxyalkylene polyol, it is stated that the properties of the flexible polyurethane foam which uses the polymer dispersed polyol which has this polyol as a dispersing medium are improved. However, research was conducted by the present inventors on this polymer dispersed polyol which has a polyoxyalkylene polyol as the dispersing medium where the polyoxyalkylene polyol is catalyzed by DMC. The polymer dispersed polyol was found to have a high viscosity, and the flexible polyurethane foam which uses this polymer dispersed polyol was inferior in humid aged compression set.

In Japanese Laid Open Patent Publication Number 7-330843, there is disclosed a polymer dispersed polyol, wherein a polyoxyalkylene polyol is the dispersing medium; the polyoxyalkylene polyol has OHV of 10~35 mg KOH/g, a monool maximum content of 15 mol %, and a minimum selectivity for H-T bond of 96% by propylene oxide addition polymerization. This polyol is manufactured with an alkali metal catalyst which contains at least one compound of cesium hydroxide or rubidium hydroxide of at least 90 weight % purity. The polymer dispersed polyol which has the above polyoxyalkylene polyol as a dispersed medium has a stable dispersion even when polymer concentration is made high. However, as described above, when using the above catalyst, in order to produce polyoxyalkylene polyol which has a reduced monool content, the manufacturing time becomes long. When taking into account the productivity of polyol and polymer dispersed polyol, it is not a completely satisfactory method.

With regard to the isocyanate terminated prepolymer which is obtained by reacting polyoxyalkylene polyol and polyisocyanate compound, the structure and composition of the polyoxyalkylene polyol has a great influence on the properties of the prepolymer and the polyurethane resin which uses the prepolymer.

In U.S. Pat. No. 5,096,993 and in U.S. Pat. No. 5,116,931, the following inventions are demonstrated: an isocyanate terminated prepolymer which is produced by reacting a polyisocyanate compound and a polyol which has a low C=C by using a DMC catalyst; a thermoplastic polyurethane elastomer (U.S. Pat. No. 5,096,993) and a thermosetting polyurethane elastomer (U.S. Pat. No. 5,116,931) which uses the isocyanate terminated prepolymer. In U.S. Pat. No. 5,096,993, in order to obtain a low hardness polyurethane elastomer, a high molecular weight polyol (number average molecular weight 2,000–20,000) with a C=C of 0.04 meq./g or less is described to be advantageous. Furthermore, when the number average molecular weight is less than 4,000, it is stated that the amount of oxyethylene group is preferably less than 35 weight %. In the embodiments (polyol A, C, D), polyols are described as having oxyethylene group content of 7~23%.

However, for the polyol with an oxyethylene group, after addition polymerizing propylene oxide using DMC catalyst, an alkali metal catalyst such as potassium hydroxide must be further used in conjunction to addition polymerize ethylene oxide. As a result, the manufacturing step becomes complex. Furthermore, as described previously, when the polyoxyalkylene polyol is made into a high molecular weight, there is a tendency for the viscosity of polyoxyalkylene polyol to increase. In particular, when DMC is the catalyst, this trend is even more obvious. As a result, because the viscosity of the isocyanate terminated prepolymer which has been reacted with the polyisocyanate compound also increases, the processability is reduced.

In Japanese Laid Open Publication Number 6-16764, there is a description of a polyurethane curing composition, wherein: an isocyanate terminated prepolymer is a curing component; the isocyanate terminated prepolymer is obtained by reacting a polymer dispersed polyol and an organic polyisocyanate; the polymer dispersed polyol is a polyoxyalkylene polyol with a hydroxyl group number 1.5 or greater, OHV of 5~80 mg KOH/g, C=C of 0.07 meq./g or lower and contains a polymer consisted of monomers which contained a polymerizing unsaturated group. In the embodiment, the manufacturing method of the polyoxyalkylene polyol is not stated, but in column 2 line 33~39, it is stated that the above polyol is obtained by using DMC as a catalyst. However, according to the opinion of the present inventors, a polymer dispersed polyol, where DMC catalyzed polyol is used as the dispersed medium, has a high viscosity. The isocyanate terminated prepolymer which uses these will also have the problem of high viscosity. Furthermore, in order to have ethylene oxide copolymerized to the end of the polyol, an alkali metal catalyst such as KOH is needed, and the manufacturing process becomes complicated.

When an isocyanate terminated prepolymer is manufactured by reacting a polyol and a polyisocyanate compound aromatic polyisocyanate compounds such as 2,4-toluenediisocyanate, 2,6-toluenediisocyanate or the like are widely used. However, normally, some free, unreacted polyisocyanate compound remain in the prepolymer in which an aromatic polyisocyanate compound is used. In this case, not only does toxicity become a problem, but when manufacturing a polyurethane elastomer, the regulation of the reaction with chain extenders becomes difficult. There are also problems of hysterisis in the resulting polyurethane elastomer becoming large.

In Japanese Examined Patent Publication No. 6-13593, in order to solve these problems, there is disclosed a prepolymer composition, wherein: a mixture of 2,4- and 2,6-toluenediisocyanate which contained 1 weight % or greater of the 2,6-isomer and a polyol is reacted at NCO group and OH group equivalent ratio of 2.5~5.0 or lower; afterwards, free toluenediisocyanate is removed by vacuum distillation until a content of 1 weight % or less is achieved.

The prepolymer composition is described as providing a polyurethane elastomer with a long pot life and with an improved hysterisis. In this publication, it is stated that a polyol with average molecular weight of 200~6,000 is used. However, in this publication, there is no reference to the advantages of using a polyol with a low monool content.

In order to improve the mechanical properties of the polyurethane elastomer, there have been many studies from the prior art regarding isocyanate terminated prepolymers which have a low monool content and which use a high molecular weight polyoxyalkylene polyol. As described above, in U.S. Pat. No. 5,096,993 and in U.S. Pat. No. 5,116,931, there is described an isocyanate terminated prepolymer which uses a polyol which is catalyzed by DMC and which has a low monool content. However, the relationship between the prepolymer in which a polyol with a low content of monool is used and in which the content of free isocyanate is reduced and the mechanical properties of the polyurethane obtained from this prepolymer is not described.

Next, a polyoxyalkylene polyamine of the prior art is described. Because polyoxyalkylene polyamine is highly reactive with polyisocyanate compounds, it is mainly used as the material for polyurethane urea resin which is molded by spray method or reaction injection molding (abbreviated as RIM). Normally, spray method and RIM method are processes with extremely fast cycling times. Because molded products can be obtained in 2~4 seconds, a large amount of reaction heat is generated in a short amount of time. As a result, the thermal properties of the resin in the molding process is important.

In Japanese Laid Open Patent Publication No. 6-16763, there is described a high molecular weight polyol which is catalyzed by DMC, and there is also described a polyamine which is obtained by amine capping of this polyol. Furthermore, because the polyol has a low content of ethylenically unsaturated groups (corresponding to C=C), the elastomer which is prepared using these is described as having excellent thermal properties characterized by low amount of heat sag and high temperature at heat deformation (column 13, line 19~column 14, line 20).

By using DMC as the polymerization catalyst of alkylene oxide, in particular propylene oxide, a high molecular weight polyol with a low C=C can be obtained. However, as described above, polyoxyalkylene polyol which is obtained with this method has the disadvantage of having a high viscosity.

By the experiments of the present inventors, polyoxyalkylene polyamine in which the precursor is a polyol which is catalyzed by DMC has a high viscosity. When resin is molded by collision mixing such as by spray method or RIM method or the like, the mixing property of the resin is decreased. As a result, the conditions of the surface of the molded product deteriorates. Furthermore, mechanical properties such as elongation hardness, extension strength is reduced.

The first objective of the present invention is to provide a polyoxyalkylene polyol and manufacturing method for the same, wherein: C=C is low even when an alkylene oxide is addition polymerized to an active hydrogen compound and made into a high molecular weight; H-T bond selectivity is high; and the molecular weight distribution of the polyol of the main reaction component is sharp.

The second objective of the present invention is to provide a polymer dispersed polyol which is derived from the above polyoxyalkylene polyol and which has low viscosity and excellent dispersal stability.

The third objective of the present invention is to provide an isocyanate terminated prepolymer which is derived from the polyoxyalkylene polyol described above and to provide an isocyanate terminated prepolymer which has a low content of free isocyanate compound.

The fourth objective of the present invention is to provide an isocyanate terminated prepolymer which is derived from the above polymer dispersed polyol and which has excellent storage stability.

The fifth objective of the present invention is to provide a polyurethane resin which is derived from the above isocyanate terminated prepolymer and which has excellent mechanical properties, water resistance, and low tack.

The sixth objective of the present invention is to provide a polyoxyalkylene polyamine which has a low viscosity and which is derived from the above polyoxyalkylene polyol.

The seventh objective of the present invention is to provide a polyurethane urea resin which is derived from the above polyoxyalkylene polyamine and which has good surface conditions and excellent mechanical properties.

DISCLOSURE OF THE INVENTION

After undertaking intensive study to solve the above problems, it was discovered that the above problems are solved and a polyoxyalkylene polyol with excellent properties is obtained by a manufacture method, wherein: a crude polyoxyalkylene polyol is manufactured by using a specified phosphazenium compound as a catalyst, at a specified temperature and pressure, and by addition polymerizing an alkylene oxide to an active hydrogen compound; the crude polyoxyalkylene polyol is further refined by a specified method. As a result, the first and second inventions as described later were completed.

Furthermore, the present inventors discovered the following, and each of the inventions were completed.

1. From the polyoxyalkylene polyol which have the above properties, a polymer dispersed polyol with excellent dispersion stability and low viscosity is obtained (the 3rd invention).

2. An isocyanate terminated prepolymer with excellent storage stability is obtained from the polyoxyalkylene polyol with the above properties or from the polymer dispersed polyol (the 4th and 5th invention).

3. Using the polyoxyalkylene polyol with the above properties, a polyurethane resin with excellent physical properties, water resistance, and low tack is obtained from an isocyanate terminated prepolymer which has limited the free isocyanate compound content to less than a specified concentration (the 6th invention).

4. A polyoxyalkylene polyamine with low viscosity can be obtained from the polyoxyalkylene polyol having the above properties (the 7th invention).

5. A polyurethane urea resin with good surface conditions and excellent mechanical properties is obtained from the polyoxyalkylene polyamine with the above properties (the 8th invention).

The present invention subsumes the first invention through the 8th invention.

In other words, the first invention is a polyoxyalkylene polyol which is obtained with a phosphazenium compound as a catalyst. The polyoxyalkylene polyol has a OHV of 2~200 mgKOH/g, C=C of 0.0001~0.007 meq./g, H-T bond selectivity of 95 mole % or greater. In its GPC elution curve, if the maximum height at the peak is 100%, $W_{20}$ is defined as the width of the peak at 20% peak height, and $W_{80}$ is the width at 80% of peak height. The ratio of $W_{20}$ to $W_{80}$, in other words $W_{20}/W_{80}$, of the polyoxyalkylene polyol is 1.5 or greater, and less than 3.

For the phosphazenium compound of the first invention, it is preferable to use either a salt of a phosphazenium cation represented by formula (1) and an inorganic anion, or a phosphazenium compound represented by formula (2).

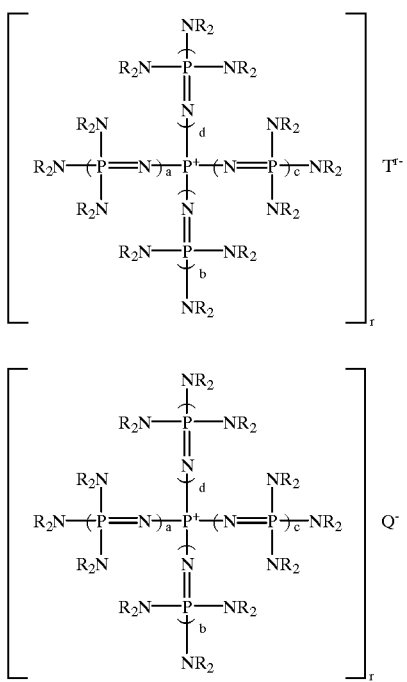

(1)

(2)

In the chemical formula (1) and (2), a, b, c, d are integers from 0~3, where they can not all be 0 simultaneously. R is a hydrocarbon group of the same or different types with carbon number of 1~10. 2 R's off of the same nitrogen atom can form a bond to form a ring structure. In formula (1), r is an integer from 1~3 and represents the number of phosphazenium cations. The $T^{r-}$ indicates an inorganic anion with a valency r. The $Q^-$ of formula (2) indicates a hydroxy anion, alkoxy anion, aryloxy anion, or carboxy anion.

The preferred properties of polyoxyalkylene polyol of the first invention are the following: OHV of 9~120 mg KOH/g, C=C of 0.0001~0.05 meq./g, H-T bond selectivity of 96% mole or greater, and $W_{20}/W_{80}$ of 2 or greater and less than 3. More preferably, C=C is 0.0001~0.03 meq./g, and furthermore, the residual amount of phosphazenium compound catalyst is 150 ppm or less.

The second invention is a manufacturing method for a polyoxyalkylene polyol, wherein: either in the presence of a salt of phosphazenium cation represented by chemical formula (1) and an inorganic anion and also an alkali metal salt or an alkali earth metal salt of an active hydrogen compound, or in the presence of a phosphazenium compound represented by formula (2) and an active hydrogen compound, for every 1 mole of active hydrogen compound, $1\times10^{-4}$~$5\times10^{-1}$ mole of phosphazenium compound represented by formula (1) or formula (2) is prepared; under reaction conditions of reaction temperature 15~130 °C. and maximum reaction pressure of 882 kpa (9 kgf/cm²), alkylene oxide is addition polymerized and crude polyoxyalkylene polyol is manufactured; next, by one of the methods of e~h described below, the phosphazenium compound which is contained in the crude polyoxyalkylene polyol is removed.

(e) For every 100 weight parts of crude polyoxyalkylene polyol, 1~40 weight parts of water is added. Next, for every 1 mole of phosphazenium compound in the crude polyoxyalkylene polyol, 0.5~8 moles of inorganic acid or organic acid is added, and the phosphazenium compound is neutralized at 50~130° C. Next, for every 100 weight parts of crude polyoxyalkylene polyol, 0.005~2.5 weight parts of adsorbent is added. Water is removed through vacuum processing. Phosphazenium salt and adsorbent are removed by filtration.

(f) For every 100 weight parts of crude polyoxyalkylene polyol, 1~40 weight parts of a mixture of an organic solvent which is inactive to polyoxyalkylene polyol and water is added. Next, for every 1 mole of phosphazenium compound in the crude polyoxyalkylene polyol, 0.5~8 moles of inorganic acid or organic acid is added, and phosphazenium compound is neutralized at 50~130° C. Next, for every 100 weight parts of crude polyoxyalkylene polyol, 0.005~2.5 weight parts of adsorbent is added. Water and organic solvents are removed by vacuum processing. Phosphazenium salt and adsorbent are removed by filtration.

(g) For every 100 weight parts of crude polyoxyalkylene polyol, 1~200 weight parts of either water alone or a mixture of water and an organic solvent which is inactive to polyoxyalkylene polyol is added. This is separated. After rinsing, water and organic solvents are removed by vacuum processing.

(h) For every 100 weight parts of crude polyoxyalkylene polyol, 20~200 weight parts of water is added. After bringing into contact with an ion exchange resin at 15~100° C., water is removed by vacuum processing.

With these refining methods, in the above methods of e and f, it is recommended that for every 1 mole of phosphazenium compound in crude polyoxyalkylene polyol, 0.5~2.5 moles of inorganic acid or organic acid is added. It is also recommended that for every 100 weight parts of crude polyoxyalkylene polyol, 0.005~1.5 weight parts of adsorbent is added.

Another preferred method is to have a, b, c, d, and r of formula (1) and (2) be 1, the $T^-$ of formula (1) be a chlorine ion, $Q^-$ of formula (2) be a hydroxy anion.

Another preferred method is the following: for every 1 mole of active hydrogen compound, phosphazenium compound represented by formula (1) or (2) is prepared in the range of $5\times10^{-4}$~$1\times10^{-1}$ mole; under conditions of reaction temperature 40~120° C., maximum reaction pressure of 686 kPa (7 kgf/cm²), alkylene oxide is addition polymerized, and crude polyoxyalkylene polyol is manufactured and refined.

The third invention is a polymer dispersed polyol, wherein: polymer particles are dispersed in a polyol; the polyol is the polyoxyalkylene polyol of the first invention; the concentration of polymer particles is 5~60 weight %. This polymer dispersed polyol preferably has a polymer particle concentration of 10~50 weight %. Furthermore, the polymer particle is preferably a polymer of an ethylenically unsaturated monomer of at least one type selected from the following: acrylonitrile, styrene, acrylamide, and methylmethacrylate.

The fourth invention is a prepolymer with an isocyanate end-group, wherein: a polyol is reacted with a polyisocyanate; the polyol is the polyoxyalkylene polyol of the first invention; the isocyanate group content of the isocyanate terminated prepolymer is 0.3~30 weight %. The polyoxyalkylene polyol of the first invention which has a CPR of 5 or lower is used as the material for the prepolymer.

The prepolymer preferably contained 0.4~20 weight % isocyanate group. Furthermore, it preferably contained 1 weight % or less free isocyanate compound.

The fifth invention is a prepolymer with an isocyanate end-group, wherein: a polyol is reacted with a polyisocyanate; the polyol is the polymer dispersed polyol of the third invention; the isocyanate terminated prepolymer contained 0.3~30 weight % isocyanate group. The isocyanate terminated prepolymer of the fifth invention preferably contained 0.4~20 weight % isocyanate group.

The sixth in invention is a polyurethane resin, wherein: a prepolymer, which contained at least 60 weight % of the isocyanate terminated prepolymer of the fourth and fifth invention, is reacted with a chain extender. The preferred prepolymer is the isocyanate terminated prepolymer of the fourth invention with a free isocyanate compound content of 1 weight % or lower. Furthermore, the preferred polyurethane resin results from using a mixture of the isocyanate terminated prepolymer of the fourth invention with a free isocyanate compound content of 1 weight % or lower and an isocyanate terminated prepolymer with a free isocyanate compound content of 1 weight % or lower obtained from at least one type of polyol chosen from the group consisting of polytetramethyleneglycol, polycaprolactone polyol.

The seventh invention is an polyoxyalkylene polyamine, wherein: a hydroxyl end-group of a polyol is aminated; the polyol is the polyoxyalkylene polyol of the first invention. The polyoxyalkylene polyamine of the seventh invention preferably has an active hydrogen value of 5~180 mgKOH/g, an oxypropylene group content of at least 50 mole %, a selectivity for H-T bond of an oxypropylene group of 95 mole % or greater.

The eighth invention is a polyurethane urea resin, wherein: a polyol which contained the polyoxyalkylene polyamine of the seventh invention and an polyisocyanate compound is reacted.

The polyoxyalkylene polyol provided by the first invention is a polyoxyalkylene polyol obtained with a phosphazenium compound as a catalyst. Even if it becomes a high molecular weight, the content of monool which is a by-product of propylene oxide is low, and the H-T bond selectivity is high. Furthermore, the molecular weight distribution of the main reaction components of the polyoxyalkylene polyol is sharp.

From the polyoxyalkylene polyol having the above properties, the following can be obtained: a polymer dispersed polyol with low viscosity and excellent dispersion stability, an isocyanate terminated prepolymer with excellent storage stability, an isocyanate terminated prepolymer with a low content of free isocyanate compound, and a polyoxyalkylene polyamine with low viscosity. As a result the polyoxyalkylene polyol described above is suitable for use as material for polymer dispersed polyol, isocyanate terminated prepolymer, and polyoxyalkylene polyamine, or the like.

Furthermore, from the polymer dispersed polyol described above, an isocyanate terminated prepolymer with excellent storage stability can be obtained. From the isocyanate terminated prepolymer which has low content of free isocyanate compound, a polyurethane resin which has excellent mechanical properties and water resistance and which has low tack is obtained. From the polyoxyalkylene polyamine described above, a polyurethane urea resin which has good surface conditions and which has excellent mechanical properties is obtained.

Therefore, the polyoxyalkylene polyol, polymer dispersed polyol, isocyanate terminated prepolymer, and polyoxyalkylene polyamine of the present invention can be used as raw material for rigid, semi-rigid, flexible polyurethane foam, paints, adhesives, floor materials, water-proof material, sealant, shoe soles, elastomers, lubricants, and sanitary products. It is a remarkably useful material.

Furthermore, polyoxyalkylene polyamine is an useful compound as the material for various plastics such as epoxy resin, polyamide, polyimide, or the like.

PREFERRED MODE FOR THE PRESENT INVENTION

The present invention will be described in more detail below.

First, the polyoxyalkylene polyol which relates to the present invention will be described. The polyoxyalkylene polyol of the present invention has the following properties 1~4.

1. OHV in the range of 2~200 mg KOH/g.
2. C=C in the range of 0.0001~0.07 meq./g.
3. H-T bond selectivity of 95 mole % or greater.
4. $W_{20}/W_{80}$ in the range of 1.5 or greater, less than 3. (they will be referred to as the 4 requirements of the present invention).

The OHV of the polyoxyalkylene polyol is 2~200 mgKOH/g, preferably 9~120 mgKOH/g, more preferably 11~60 mgKOH/g. When addition polymerization of alkylene oxide, particularly propylene oxide, is conducted until OHV becomes smaller than 2 mgKOH/g, the production time of the polyoxyalkylene polyol becomes too long. Furthermore, when OHV becomes larger than 200 mg KOH/g, there are no meaningful differences between the C=C for the polyoxyalkylene polyol of the present invention and that of the polyoxyalkylene polyol obtained by the KOH catalyst system of the prior art.

C=C of the polyoxyalkylene polyol becomes mainly an indicator for the amount of monool having an unsaturated end group. The monool is produced as part of a side reaction of the propylene oxide. The allowable range of C=C is normally 0.0001~0.07 meq./g, but it is preferably 0.0001~0.05 meq./g, and even more preferably 0.001~0.03 meq./g. Although it is desirable to have C=C be 0, in order to make C=C 0 when the range of OHV is as described above, the reaction temperature, pressure, and the like must be eased, and the reaction time becomes too long. From this standpoint, the allowable lower limit of C=C becomes 0.0001~0.001 meq./g. Furthermore, if C=C becomes greater than 0.07 meq./g, the mechanical properties, curing properties and the like of the polyurethane resin of the flexible polyurethane foam, elastomer, sealant material, or the like deteriorates, and therefore it is not suitable.

With a polyoxyalkylene polyol with this kind of low C=C, if the H-T bond selectivity becomes less than 95 mole %, there is increased viscosity of the polyoxyalkylene polyol. Problems, such as difficulty in molding of the flexible polyurethane foam due to incompatibility with auxiliary agents such as silicone surfactants or the like, can arise. Furthermore, because of the increased viscosity when polyoxyalkylene polyol is made into a high molecular weight, the viscosity of the prepolymer, which is obtained by the reaction of the polyol with a polyisocyanate compound, is also increased. The processability is reduced.

Furthermore, $W_{20}/W_{80}$ is 1.5 or greater, and less than 3. The ratio $W_{20}/W_{80}$ which has been defined for the present invention is an indicator which measures the uniformity of molecular weight distribution of the polyoxyalkylene polyol. This indicator shows the quantity of high molecular weight components in the molecular weight distribution.

In the prior art, with the anionic polymerization of propylene oxide by an alkali metal hydroxide such as KOH, NaOH, or the like, the cause for the widening of the molecular weight distribution of polyoxyalkylene polyol is the generation of monool by the side reaction of propylene oxide. The molecular weight of the monool is small compared to the molecular weight of the polyoxypropylene which is obtained from the main reaction. In the GPC elution curve, the retention time of the peak is later than the reaction components.

However, polyoxypropylene polyol with a low C═C which has been synthesized by an organic metal catalyst such as diethyl zinc, iron chloride, DMC, or the like produces a polyoxypropylene polyol with a higher molecular weight than the main reaction components. A broad tailing of the peak is observed at a position earlier than the GPC peak retention time of the polyol obtained in the main reaction. As a result, the ratio of $W_{20}/W_{80}$ becomes larger. If the molecular weight of polymer is less than the molecular weight for critical entanglement, then the viscosity of the polymer is proportional to the weight average molecular weight. On the other hand, if the molecular weight of the polymer is greater than or equal to the molecular weight for critical entanglement, the viscosity of the polymer is proportional to the 3.4 power of the weight average molecular weight. (reference: Rheology Lecture, Japan Rheology Conference, 1992, published by Kobunshikan kokai).

As a result, polyoxypropylene polyol which contains large amounts of high molecular weight components has a higher viscosity compared to one which contains smaller amounts of high molecular weight components. The viscosities of the following are also increased: a polymer dispersed polyol whose dispersal medium is a polyoxypropylene polyol with large amounts of high molecular weight components, an isocyanate terminated prepolymer and a polyoxyalkylene polyamine which are derived from this polyoxypropylene polyol. As a result, the property of molding for the polyurethane which is obtained from these deteriorates.

When considering the above, the $W_{20}/W_{80}$ ratio needs to be 1.5 or greater, and less than 3. Preferably, it is 2 or greater and less than 3, and more preferably, it is 2.2 or greater and less than 2.8.

The polyoxyalkylene polyol of the present invention which has the above properties is obtained by the following process. A specified phosphazenium compound is used as the catalyst. At a specified temperature and pressure, an alkylene oxide is addition polymerized to an active hydrogen compound, and a crude polyoxyalkylene polyol is manufactured. This is further refined by a specified method.

In the present invention, the phosphazenium compound which is to be used as the catalyst for the addition polymerization of the alkylene oxide is preferably one that is represented by formula (1) or formula (2). The phosphazenium cation in the phosphazenium compound of both formulas is represented by a canonical structural formula where the positive charge is localized on the central phosphorus atom. However, this can be represented in an infinite number of infinite structural formulas. In reality, the positive charge is spread over its entirety.

In the phosphazenium cation represented by chemical formula (1) and chemical formula (2), a, b, c, and d are each positive integers from 0~3, and preferably from 0~2. However, they can not all be 0. Even more preferably, a, b, c, and d are positive integers chosen from among the following combinations: (2,1,1,1), (1,1,1,1), (0,1,1,1), (0,0,1,1), (0,0,0,1). More preferably, a, b, c, and d are chosen from among the following combinations: (1,1,1,1), (0,1,1,1), (0,0,1,1), and (0,0,0,1). Furthermore, the order of the numbers within the ( ) can be altered freely.

R is a hydrocarbon group of the same type or of different types with a carbon number of 1~10. The R can be selected from aliphatic or aromatic hydrocarbon groups, including: methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tertpentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (tert-octyl), nonyl, decyl, phenyl, 4-toluyl, benzyl, 1-phenylethyl, 2-phenylethyl, or the like. Of these, aliphatic hydrocarbon groups with carbon numbers of 1~10 such as: methyl, ethyl, n-propyl, isopropyl, tert-butyl, tert-pentyl, tert-octyl, or the like are preferred. Methyl groups or ethyl groups are preferred more.

When 2 R's from the same nitrogen atom of the phosphazenium cation form a bond and form a ring-structure, the bivalent hydrocarbon group on this nitrogen atom is a bivalent hydrocarbon group with a main chain of 4~6 carbon atoms (the ring is a 5~7 member ring which contains a nitrogen atom). This is preferably a tetramethylene, pentamethylene, or hexamethylene, or the like, or one in which there is a substitution of an alkyl group such as a methyl or ethyl group or the like on the main chain of these. More preferably, it is a tetramethylene or pentamethylene group. It does not matter if all of the possible nitrogen atoms in the phosphazenium cation are ring structures, or if it is only a portion.

The r⁻ in chemical formula (1) indicates an inorganic anion with a valence number of r. r is an integer between 1~3. Examples of such an inorganic anion include anions of the following boric acid, tetrafluoroboric acid, hydrocyanic acid, thiocyanic acid, hydrofluoric acid, hydrogen halide acids such as hydrochloric acid or hydrobromic acid, nitric acid, sulfuric acid, phosphoric acid, phosphorous acid, hexafluorophosphoric acid, carbonic acid, hexafluoroantimonic acid, hexafluorothallic acid, perchloric acid, or the like. Furthermore, inorganic anions can also be $HSO_4^-$ and $HCO_3^-$.

Depending on the situation, these inorganic anions can substitute each other by an ion exchange reaction. From among these inorganic anions, anions of inorganic acids such as boric acid, tetrafluoroboric acid, hydrogen halide acids, phosphoric acid, hexafluorophosphoric acid, and perchloric acid, or the like are preferred. The most recommended is a chlorine anion.

With regard to the synthesis of the salt of a phosphazenium cation represented by formula (1) and an inorganic anion, methods (a)~(d) are cited as some general examples.

(a) 1 equivalent of phosphorus pentachloride and 3~8 equivalent of disubstituted amine ($HNR_2$) are reacted. After further reacting 1~6 equivalents of ammonia, this is treated with a base, and a 2,2,2-tris(disubstituted amino)-2 $\lambda^5$-phosphazene represented by formula (3) is synthesized.

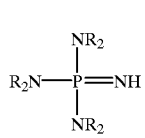

(3)

(b) This phosphazene compound (formula (3)) and bis (disubstituted amino) phosphorochloridate $\{(R_2N)_2P(O)Cl\}$ are reacted. The resulting bis (disubstituted amino) tris (disubstituted amino) phosphoranylidene aminophosphinoxide is chlorinated with an oxychlorophosphorus. Next, this is reacted with ammonia and then treated with a base.

A 2,2,4,4 pentakis(disubstituted amino)-2 $\lambda^5$, 4 $\lambda^5$-phosphazene which is represented by formula (4) is obtained.

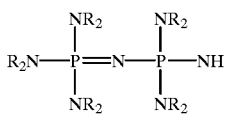
(4)

(c) Phosphazene compound (formula (4)) is used instead of the phosphazene compound (formula 3) which is used in (b). The reactions are conducted with the same procedures as in (b). An oligophosphazene which is represented by formula (5) where q is 3 is obtained. (In the formula, q is an integer from 0~3.

When q is 0, it is a disubstituted amine, if it is 1, it is the compound in formula (3), if it is 2, it is the compound in formula (4), and if it is 3, it represents an oligophosphazene obtained in (c).

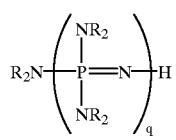
(5)

The R in chemical formulas (3)~(5) is the same R as in formulas (1) and (2).

(d) Compounds of formula (5) with differing q and/or R are sequentially, or compounds of formula (5) with the same q and R are simultaneously reacted with 4 equivalents of phosphorus pentachloride. From this, a salt of the desired phosphazenium cation where r=1 and $r^-=Cl^-$ of formula (1) and a chlorine anion is obtained. When a salt of an inorganic anion other than chlorine anion is desired, ion exchange can be conducted through the normal methods such as a method of treating with a salt of an alkali metal cation and the desired inorganic anion, a method using an ion exchange resin, or the like. In this manner, the salt of a general phosphazenium cation represented by formula (1) and an inorganic anion is obtained.

Coexisting with the salt of the phosphazenium cation represented in formula (1) and inorganic anion, the salt of alkali metal or alkali earth metal and active hydrogen compound is a salt in which the active hydrogen of an active hydrogen compound separates as a hydrogen ion and is displaced with an alkali metal ion or alkali earth metal ion.

An active hydrogen compound which can provide this kind of salt include alcohols, phenol compounds, polyamines, alkanol amines, and the like. For example: water, bivalent alcohols such as ethylene glycol, diethylene glycol, propylene glycol, dipropylene, 1,3-propane diol, 1,4-cyclohexane diol, 1,3-butane diol, 1,4-butane diol, 1,6-hexane diol, 1,4-cyclohexane diol, or the like; alkanol amines such as monoethanol amine, diethanol amine, triethanol amine, or the like; multivalent alcohols such as glycerin, diglycerin, trimethylol propane, pentaerythritol, dipentaerythritol, tripentaerythritol; sugars or their derivatives, such as glucose, sorbitol, dextrose, fructose, sucrose, methylglucoside, or the like; aliphatic amines, such as ethylene diamine, di (2-aminoethyl) amine, hexamethylene diamine, or the like; aromatic amines, such as tolylenediamine, diphenylmethane diamine, or the like; phenol compounds, such as bisphenol A, bisphenol F, bisphenol S, novolak, resol, resorcinol, or the like. Two or more of these active hydrogen compounds can be used together.

Furthermore, compounds obtained by addition polymerizing alkylene oxides to these active hydrogen compounds by known methods of the prior art can also be used. From among these compounds, the most preferred compounds are the following: bivalent alcohols, compounds with a number average molecular weight of a maximum of 2,000 in which alkylene oxide is addition polymerized to a bivalent alcohol, trivalent alcohols, compounds with a number average molecular weight of a maximum of 2,000 in which alkylene oxide is addition polymerized to a trivalent alcohol. If, after an alkylene oxide is bonded to a bivalent or trivalent alcohol, the compound has a number average molecular weight over 2,000, this is not suitable because the amount of monool by-product increases.

In order to obtain alkali metal salts or alkali earth metal salts from these active hydrogen compounds, conventional usual methods are used. In the method, active hydrogen compounds are reacted with a metal selected from alkali metal group or alkali earth metals group, or it is reacted with a basic alkali metal compound or a basic alkali earth metal compound.

A metal selected from alkali metals and alkali earth metals include the following: lithium metal, sodium metal, potassium metal, cesium metal, rubidium metal, magnesium metal, calcium metal, strontium metal, barium metal, or the like.

Examples of basic alkali metal compounds or alkali earth metal compounds include the following: alkali metal or alkali earth metal amides, such as sodium amide, potassium amide, magnesium amide, barium amide, or the like; organic alkali metal compounds or alkali earth metal compounds, such as n-propyl lithium, n-butyl lithium, vinyl lithium, cyclopentadienyl lithium, ethynyl sodium, n-butyl sodium, phenyl sodium, cyclopentadienyl sodium, ethyl potassium, cyclopentadienyl potassium, phenyl potassium, benzyl potassium, diethyl magnesium, ethylisopropyl magnesium, di-n-butyl magnesium, di-tert-butyl magnesium, vinylbromide magnesium, phenylbromide magnesium, dicyclopentadienyl magnesium, dimethyl calcium, potassium acetylide, ethylbromide strontium, phenyliodide barium, or the like; hydride compounds of alkali metals or hydride compounds of alkali earth metals, such as sodium hydride, potassium hydride, calcium hydride, or the like; hydroxides of alkali metals or hydroxides of alkali earth metals, such as sodium hydroxide, potassium hydroxide, lithium hydroxide, rubidium hydroxide, cesium hydroxide, magnesium hydroxide, calcium hydroxide, strontium hydroxide, barium hydroxide, or the like; carbonates of alkali metals or carbonates of alkali earth metals, such as lithium carbonate, sodium carbonate, potassium carbonate, rubidium carbonate, cesium carbonate, magnesium carbonate, calcium carbonate, barium carbonate, or the like; or hydrogencarbonates of alkali metals or hydrogencarbonates of alkali earth metals, such as potassium hydrogencarbonate, sodium hydrogencarbonate, cesium hydrogen-carbonate, or the like.

Active hydrogen compounds containing a plurality of active hydrogens can release all of its active hydrogens and made into an anion by a metal selected from alkali metal and alkali earth metal or by a basic alkali metal compound or alkali earth metal compound. Also, only a portion of the active hydrogens can be separated to form an anion. Between the alkali metal salts or alkali earth metal salts of these active hydrogen compounds, alkali metal salts of the active hydrogen compound are preferred. The cation of the alkali metal salt of the active hydrogen compound is preferably a cation chosen from the following: lithium, sodium, potassium, rubidium, and cesium.

In the presence of a salt of a phosphazenium cation represented by formula (1) and an inorganic anion as well as an alkali metal salt or alkali earth metal salt of an active hydrogen compound, alkylene oxide is addition polymerized. Although a by-product salt of the alkali metal cation or alkali earth metal cation and the inorganic anion is generated, if the by-product salt inhibits the polymerization reaction, it can be removed by filtration method or the like before the polymerization reaction. Another possibility is to isolate the phosphazenium salt of the active hydrogen compound which is derived from the salt represented by formula (1) and the alkali metal salt or alkali earth metal salt of the active hydrogen compound. The alkylene oxide can then be polymerized in the presence of this salt.

In order to obtain the phosphazenium salt of this active hydrogen compound beforehand, the salt represented by formula (1) and an alkali metal salt or alkali earth metal salt of the active hydrogen compound are reacted. As long as the desired salt is generated, there are no limitations on the usage ratio of the two types of salt. Even if there is an excess of either salt, this is not a problem. Normally, the usage amount of the alkali metal salt or alkali earth metal salt of the active hydrogen compound is 0.2~5 equivalents for every one equivalent of the salt of phosphazenium cation and inorganic anion. It is preferably 0.5~3 equivalents, and more preferably it is 0.7~1.5 equivalents.

Normally, in order to have an effective contact between them, a solvent is needed. As long as it does not interfere with the reaction, any solvent can be used. Examples of solvents include: alcohols such as water, methanol, ethanol, propanol, or the like; ketones, such as acetone, methylethyl ketones, or the like; aliphatic hydrocarbons or aromatic hydrocarbons such as n-pentane, n-hexane, cyclohexane, benzene, toluene, xylene, or the like; halogenated hydrocarbons, such as dichloromethane, chloroform, bromoform, carbon tetrachloride, dichloroethane, orthodichlorobenzene, or the like; esters, such as ethylacetate, methylpropionate, methylbenzoate, or the like; ethers, such as diethylether, tetrahydrofuran, 1,4-dioxane, ethyleneglycol dimethylether, triethylene glycol dimethylether, or the like; nitriles, such as acetonitrile, propionitrile, or the like; polar aprotic solvent, such as N,N-di-methylformamide, dimethylsulfoxide, sulfolane, hexamethyltriamide phosphate, 1,3-dimethyl-2-imidazolidinone, or the like.

These solvents are selected based on the chemical stability of the materials used in the reaction. Preferably, it is selected from the following: aromatic hydrocarbons such as benzene, toluene, xylene, or the like; ethers, such as diethylether, tetrahydrofuran, 1,4-dioxane, ethyleneglycol dimethylether, or the like; nitriles, such as acetonitrile, or the like; polar aprotic solvent, such as N,N-dimethylformamide, dimethylsulfoxide, sulfolane, hexamethyl phosphoric triamide, 1,3-dimethyl-2-imidazolidinone, or the like. These solvents can be used alone, or two or more types can be mixed and used.

The salts which are the raw material are preferably in solution, but can be in a suspension. Because of the differing types, quantities, concentrations, and the like of salts which are to be used, the reaction temperature is not uniform. Usually, it is 150° C. or lower. Preferably, it is −78~80° C., even more preferably, it is in the range of 0~50° C. The reaction can be executed under reduced pressure, normal pressure, or increased pressure. Preferably it is 9.8~980 kPa (0.1~10 kgf/cm$^2$). Even more preferably it is in the range of 98~294 kPa (1~3 kgf/cm$^2$). The reaction time is normally 1 minute 24 hours, preferably 1 minute~10 hours, and more preferably it is in the range of 5 minutes~6 hours.

If the phosphazenium salt of the active hydrogen compound is to be isolated from the reaction solution, a combination of conventional means is used. The method is not uniform and depends on the type of the target salt, the types and excess amounts of the 2 salts which are the source materials, the type and amount of solvent which is used. Normally, the by-product salt of the alkali metal or alkali earth metal cation and the inorganic anion precipitates as a solid. If necessary, after some amount of concentration, solid-liquid separation can be conducted by methods such as filtration or centrifugation. The precipitate is removed, and the liquid is concentrated and dried in order to obtain the target salt.

If the by-product salt is still in solution even after concentrating, it can be concentrated further, after which a poor solvent can be added. Either the by-product salt or the target salt can be precipitated, or else, after concentrating and drying, they can be separated by extracting one salt, for example. If there is an excess amount of one of the salts of the source material, large amounts of this salt may be mixed in with the target salt. After redissolving, the salt can be extracted with another suitable solvent if necessary and separated. Furthermore, if necessary, the target salt can be purified by recrystallization or column chromatography, or the like. Normally the target salt is obtained as a liquid of medium viscosity or high viscosity, or it is a solid.

In the presence of a salt of a phosphazenium cation represented by formula (1) and an inorganic anion as well as an alkali metal salt or alkali earth metal salt of an active hydrogen compound, alkylene oxide is addition polymerized. An active hydrogen compound of the same type or different type as the active hydrogen compound which constructs the alkali metal or alkali earth metal salt of the active hydrogen compound, or the phosphazenium salt of the active hydrogen compound derived from this, can also be present in the reaction system. When salts are present, there are no particular limitations on the amount, but it is in the range of $1 \times 10^{-13}$~$5 \times 10^{-1}$ mole for every 1 mole of alkylene oxide, and it is preferably in the range of $1 \times 10^{-7} 1 \times 10^{-1}$ mole. Furthermore, if the salt is to be supplied as a solution, if the solvent inhibits the polymerization reaction, it can be removed beforehand by methods such as heating under reduced pressure, or the like.

In order to simplify the removal process of the phosphazenium compound after polymerization, a known initiator of the prior art can be used for the salt of the phosphazenium cation represented by formula (1) and the inorganic anion as well as for the alkali metal salt or alkali earth metal salt of the active hydrogen compound. Known initiators are those in which an active hydrogen compound is reacted with an alkali metal, alkali earth metal, basic alkali metal compound, or a basic alkali earth metal compound.

However, when too much initiator of the prior art is used, it can cause an increased C=C of the polyoxyalkylene polyol. The usage amount should be as small as possible. Normally, for every 1 mole of active hydrogen compound, it is $1 \times 10^{-8}$~$1 \times 10^{-1}$ moles. It is preferably $1 \times 10^{-5}$~$1 \times 10^{31}$ 1 mole. More preferably, it is in the range of $1 \times 10^{-4}$~$1 \times 10^{-1}$ mole.

Another method of manufacture of the polyoxyalkylene polyol of the present invention will be described. In the presence of a phosphazenium compound represented by formula (2) and an active hydrogen compound, alkylene oxide is addition polymerized to produce a polyoxyalkylene polyol.

$Q^-$ in the phosphazenium compound represented by formula (2) is an anion selected from a group containing: hydroxy anion, alkoxy anion, aryloxy anion, and carboxy anion. Of these $Q^-$, it is preferably a hydroxy anion. Examples include: alkoxy anions which are derived from aliphatic alcohols such as methanol, ethanol, n-propanol, isopropanol, or the like; aryloxy anions derived from aromatic hydroxyl compounds such as phenol, cresol, or the like; carboxy anions which are derived from formic acid, acetic acid, propionic acid, or the like.

Among these, the preferred ones are hydroxy anions, alkoxy anions derived from alkyl alcohols with a low boiling point, such as methanol, ethanol, n-propanol, and the like; carboxy anions derived from carbonic acids such as formic acid, acetic acid, and the like. More preferably, it is hydroxy anion, methoxy anion, ethoxy anion, acetate anion. These phosphazenium compounds can be used alone, or two or more types can be mixed and used.

The general synthesis method for the phosphazenium compound represented by formula (2) is first, to synthesize a phosphazenium chloride which is formula (1) with an r=1, $r^-=Cl^-$. The method is the same as the synthesis method described previously for the salt represented by formula (1). Next, the chlorine anion of the phosphazenium chloride can be substituted with the desired anion $Q^-$ by the following methods, for example: a method of processing with a hydroxide of an alkali metal, hydroxide of an alkali earth metal, alkoxide, aryl oxide, or carboxide; or a method which uses an ion exchange resin; or the like. In this manner, a general phosphazenium compound represented by formula (2) is obtained.

The active hydrogen compound which coexists with chemical formula (2) is the same as the active hydrogen compound which provides the alkali metal salt or alkali earth metal salt of the active hydrogen compound which was previously described in detail.

In the presence of a phosphazenium compound represented by formula (2) and an active hydrogen compound, alkylene oxide is addition polymerized. Normally in this method, any excess amount of active hydrogen compound which is used remains. Depending on the type of phosphazenium compound, byproducts such as water, alcohol, aromatic hydroxy compound, carbonic acid, or the like are generated. If necessary, these byproducts can be removed prior to the addition polymerization of the alkylene oxide. Depending on the physical properties of the byproduct, the usual methods such as the following are used: heating or vacuum removal method, method of passing an inert gas, a method in which adsorbents are used.

In order to simplify the removal of the phosphazenium compound after polymerization, a known initiator of the prior art can be used for the phosphazenium compound represented by formula (2) and the active hydrogen compound. The known initiators are the compounds described previously. However, when too much initiator of the prior art is used, it causes an increased C=C of the polyoxyalkylene polyol. As a result, the usage amount should be kept to a minimum. It is normally in the range of $1\times10^{-8}\sim1\times10^{-1}$ mole. Preferably it is $1\times10^{-5}\sim1\times10^{-1}$ mole. More preferably it is in the range of $1\times10^{-4}\sim1\times10^{-2}$.

In the presence of phosphazenium compound, the alkylene oxide which is to be addition polymerized to active hydrogen compound can be propylene oxide, ethylene oxide, 1,2-butylene oxide, 2,3-butylene oxide, styrene oxide, cyclohexene oxide, epichlorohydrin, epibromohydrin, methylglycidyl ether, allylglycidyl ether, or the like. Two more types can be used together. Among these, it is preferably propylene oxide, 1,2-butylene oxide, ethylene oxide. An alkylene oxide which contains 50 mol % or greater of propylene oxide is particularly preferably. Most preferably, it is an alkylene oxide which contains at least 70 mol % of propylene oxide.

Using propylene oxide and ethylene oxide as examples, methods of polymerization include the following examples: after polymerizing propylene oxide, ethylene oxide is copolymerized as a block in an ethylene oxide capping reaction; in a random reaction, propylene oxide and ethylene oxide are randomly copolymerized; and in a triblock copolymerization reaction, after propylene oxide is polymerized, ethylene oxide is polymerized, next propylene oxide is polymerized. Among these, preferable polymerization methods are ethylene oxide capping reaction and the triblock copolymerization reaction.

The polyoxyalkylene polyol which possesses the above properties is obtained by manufacturing under the following conditions. For every one mole of active hydrogen compound, $1\times10^{-4}\sim5\times10^{-1}$ moles of the phosphazenium compound represented by formula (1) or (2) is used. It is preferably in the range of $5\times10^{-4}\sim1\times10^{-1}$, and more preferably in the range of $1\times10^{-3}\sim1\times10^{-2}$ moles.

When polyoxyalkylene polyol is made into a high molecular weight, an increased concentration, within the range described above, of phosphazenium compound with respect to the active hydrogen compound is preferred. If for every 1 mole of active hydrogen compound the phosphazenium compound represented by formula (1) or (2) is less than $1\times10^{-4}$ mole, the polymerization rate of alkylene oxide is lowered, and the manufacture time for polyoxyalkylene polyol becomes long. On the other hand, if it exceeds $5\times10^{-1}$ mole, the cost for the phosphazenium compound as part of the manufacture cost becomes high.

The addition polymerization temperature of alkylene oxide is 15~130° C. It is preferably 40~120° C., and even more preferably, it is in the range of 50~110° C. When conducting the addition polymerization of alkylene oxide at a low temperature within the above range, it is preferable to increase the concentration of the phosphazenium compound with respect to the active hydrogen compound within the range described above. Methods for supplying alkylene oxide to the polymerizing system include a method of supplying a portion of the necessary amount of alkylene oxide in one batch and a method of supplying alkylene oxide continuously or intermittently, or the like. When using the method where a portion of the necessary amount of alkylene oxide is supplied in one batch, the reaction temperature for the start of the alkylene oxide polymerization reaction is on the lower end of the range described above, and after the alkylene oxide is supplied, the reaction temperature is gradually increased. When the polymerization temperature is lower than 15° C., the polymerization rate of alkylene oxide is reduced, and the manufacture time for polyoxyalkylene polyol becomes long. If the polymerization temperature exceeds 130° C., C=C exceeds 0.07 meq./g when propylene oxide is used as the alkylene oxide.

The maximum pressure at the time of addition polymerization of alkylene oxide is ideally 882 kPa (9 kgf/cm²). Normally, the addition polymerization of alkylene oxide is conducted inside a pressure reactor. The addition polymerization of alkylene oxide can be started under vacuum conditions or atmospheric conditions. When starting from an atmospheric pressure, it is preferably conducted in the presence of inactive gases such as nitrogen or helium. If the maximum reaction pressure of the alkylene oxide exceeds 882 kPa (9 kgf/cm$^2$), the amount of monool by-product increases. The maximum reaction pressure is preferably 686 kPa (7 kgf/cm$^2$), and more preferably 490 kPa (5 kgf/cm$^2$). When using propylene oxide as the alkylene oxide, the maximum reaction pressure is preferably 490 kPa (5 kgf/cm$^2$).

If necessary, a solvent can be used at the time of the addition polymerization reaction of alkylene oxide. Examples of solvents include: aliphatic hydrocarbons, such as pentane, hexane, heptane, or the like; ethers such as diethylether, tetrahydrofuran, dioxane, or the like, aprotic polar solvents such as dimethyl sulfoxide, N,N-dimethyl formamide, or the like. When using a solvent, a method of recovering and reusing the solvent is preferred in order to prevent the manufacturing cost of polyoxyalkylene polyol from increasing.

Using a phosphazenium compound as the catalyst, a crude polyoxyalkylene polyol is obtained by addition polymerizing alkylene oxide to an active hydrogen compound. Methods regarding the removal of phosphazenium compound from the crude polyoxyalkylene polyol will be described.

(e) For every 100 weight parts of crude polyoxyalkylene polyol, 1~40 weight parts of water is added. Next, for every 1 mole of phosphazenium compound in the crude polyoxyalkylene polyol, 0.5~8 moles of inorganic acid or organic acid is added. The phosphazenium compound is neutralized at 50~130° C. Next, for every 100 weight parts of crude polyoxyalkylene polyol, 0.005~2.5 weight parts of adsorbents is added. Water is removed by vacuum treatment, and the phosphazenium salt and adsorbent are removed by a filtration process (removal method by acid neutralization).

(f) For every 100 weight parts of crude polyoxyalkylene polyol, 1~40 weight parts of a mixture of water and an organic solvent which is inactive to polyoxyalkylene polyol is added. Next, for every 1 mole of phosphazenium compound in the crude polyoxyalkylene polyol, 0.5~8 moles of inorganic acid or organic acid is added. The phosphazenium compound is neutralized at 50~130° C. Next, for every 100 weight parts of crude polyoxyalkylene polyol, 0.005~2.5 weight parts of adsorbents is added. Water and organic solvent are removed by vacuum treatment, and the phosphazenium salt and adsorbent is removed by a filtration process (removal method by acid neutralization).

(g) For every 100 weight parts of crude polyoxyalkylene polyol, 1~200 weight parts of either water alone or a mixture of water and an organic solvent which is inactive to polyoxyalkylene polyol is added and separated. After rinsing with water, the water and organic solvent are removed by vacuum treatment (water rinsing treatment method).

(h) For every 100 weight parts of crude polyoxyalkylene polyol, 20~200 weight parts of water is added. This is added into contact with an ion exchange resin at 15~100° C. Next, the ion exchange resin is removed by filtration. Water is removed by vacuum treatment (ion exchange treatment method).

In the above methods e. and f., it is preferable to add 0.5~2.5 moles of inorganic acid or organic acid for every 1 mole of phosphazenium compound in the crude polyoxyalkylene polyol. It is also preferable to add 0.005~1.5 weight parts of adsorbent for every 100 weight parts of crude polyoxyalkylene polyol.

First, methods e. and f. (removal method by acid neutralization) will be explained. In the polyoxyalkylene polyol of the present invention, the polyoxyalkylene polyol with a low OHV (in the range of OHV 2~30 mg KOH/g) has a high molecular weight and a low concentration of hydrophilic hydroxyl group. In the polymerization reaction of alkylene oxide, if the usage amount of phosphazenium compound is high with respect to the active hydrogen compound, the amount of water or organic solvent used for neutralizing phosphazenium compound becomes an important factor in reducing the concentration of phosphazenium compound in the polyoxyalkylene polyol.

For neutralization, method e. uses 1~40 weight parts of water. It is preferably 1~30 weight parts, and more preferably 1.2~20 weight parts. In method f., 1~40 weight parts of a mixture of water and an organic solvent which is inactive to polyoxyalkylene polyol is used. It is preferably 1~30 weight parts, and more preferably 1.2~20 weight parts. In method f., the mixture solvent preferably contains at least 20 weight % water. If there is 10 mole % or greater of hydrophilic oxyethylene group in the polyoxyalkylene polyol, less water can be used. However, if there are no oxyethylene groups, then the amount of water is increased. If the amount of water is less than 1 weight part, the concentration of phosphazenium compound in the product increases. However, if more than 40 weight parts is used, the energy used for removing water or removing solvent increases.

Examples of organic solvents which are inactive to polyoxyalkylene polyol include: among the hydrocarbon solvents—toluene, hexanes, pentanes, heptanes, butanes, lower alcohols, cyclohexane, cyclopentane, xylenes, or the like. The removal of these organic solvents from polyoxyalkylene polyol is implemented by a heating and pressure reducing operation. A method where the temperature is 100~140° C. and the degree of vacuum is 10 mmHg abs (1,330 Pa) or lower is preferred.

Inorganic or organic acid is used as the acid for neutralizing the phosphazenium compound. Examples of inorganic acid include: phosphoric acid, phosphorous acid, hypophosphorous acid, pyrophosphoric acid, hydrochloric acid, sulfuric acid, sulfurous acid, and their aqueous solutions. Inorganic acid acidic salts can be used as the inorganic acid. Examples include: lithium dihydrogen phosphate, sodium dihydrogen phosphate, potassium dihydrogen phosphate, lithium monohydrogen phosphate, sodium monohydrogen phosphate, potassium monohydrogen phosphate, lithium hydrogen sulfate, sodium hydrogen sulfate, potassium hydrogen sulfate, lithium hydrogen carbonate, sodium hydrogen carbonate, potassium hydrogen carbonate, acidic sodium pyrophosphate (for example, sodium hydrogen pyrophosphate), or the like. The following are recommended for use as organic acids: formic acid, oxalic acid, succinic acid, acetic acid, maleic acid, benzoic acid, paratoluene sulfonic acid, dodecyl benzene sulfonic acid, and their aqueous solutions.

Aqueous solutions of the following are preferable: phosphoric acid, hydrochloric acid, sulfuric acid, maleic acid, oxalic acid. For every 1 mole of phosphazenium compound in the crude polyoxyalkylene polyol, 0.5~8 moles of these acids are used. Preferably, 0.5~6 moles are used, and even more preferably, 0.5~2.5 moles are used. The neutralization is conducted in the temperature range of 50~130° C. A neutralization temperature of 70~95° C. is preferred. Although it also depends on the scale of the reaction, the neutralizing time is 0.5~3 hours. If the amount of acid is close to 8 moles for every 1 mole of phosphazenium compound, it is better to use it in conjunction with an acid adsorbent. If the acid is less than 0.5 moles, the concentration of phosphazenium compound in the polyoxyalkylene polyol product increases. If the amount of acid exceeds 8 moles, the amount of adsorbent needed to remove the acid becomes high.

After the neutralization reaction is completed, an adsorbent is introduced. It is preferable to also add one or more types of an oxidation inhibitor at this time. Examples of oxidation inhibitors include: t-butyl hydroxy toluene (BHT), pentaerythrityl tetrakis [3-(3,5-di-tert-butyl-4-hydroxyphenyl)propionate], octadecyl-3-(3,5-di-tert-butyl-4-hydroxyphenyl)-propionate, ethylhexyl phosphate, 4, 4'-bis-α, α-dimethylbenzyldiphenyl amine, 2-tert-butyl-4-ethyl phenol, 2,6-di-tert-butyl-4-ethyl phenol, or the like. The amount of oxidation inhibitor to be added is 200~5,000 ppm of crude polyoxyalkylene polyol. It is preferably in the range of 300~4,000 ppm, and even more preferably within 350~2,000 ppm.

For every 100 weight parts of crude polyoxyalkylene polyol, 0.005~2.5 weight parts of adsorbents which adsorb acid and alkali components are added. It is preferably 0.005~1.5 weight parts, and even more preferably 0.03~1.1 weight parts. Examples of adsorbents include: synthetic magnesium silicate, synthetic aluminum silicate, activated clay, acidic clay, synthetic aluminum-magnesium silicate, or the like. The adsorbent preferably has a low amount of sodium elution.

Specific adsorbents are sold under a variety of product names such as: Tomita series, for example Tomita AD-100, Tomita AD-200, Tomita AD-300, Tomita AD-400, Tomita AD-500, Tomita AD-600, Tomita AD-700, Tomita AD-800, Tomita AD-900 (Tomita Pharmaceuticals Co., Ltd.), KYOWAAD series, for example KYOWAAD 200, KYOWAAD 300, KYOWAAD 400, KYOWAAD 500, KYOWAAD 600, KYOWAAD 700, KYOWAAD 1000, KYOWAAD 2000 (Kyowa Chemical Industry Co., Ltd.), Magnesol (Dallas Co.).

After the adsorbent is introduced, water or water and organic solvent are removed under condition of 100~140° C., 1,330 Pa (10 mmHg abs). Afterwards, polyoxyalkylene polyol is recovered by a filtration procedure. Filtration assisting agents such as diatomaceous earth or celite, or the like can also be used. The acid value of the polyoxyalkylene polyol obtained by this procedure is preferably 0.05 mgKOH/g or less.

Next, method g. (water rinsing method) will be described. For every 100 weight parts of crude polyoxyalkylene polyol, 1~200 weight parts of water alone or water and an organic solvent which is inactive to polyoxyalkylene polyol is added. At 15~130° C., this is stirred and separated, and after rinsing, the solvent is removed by vacuum treatment. For the water, ion exchange water or city water, or the like is preferable. When a mixture solvent of water and organic solvent which is inactive to polyoxyalkylene polyol is used, it is preferable to use a mixture solvent with at least 20 weight % of water. By adding water alone or a mixture of water and an organic solvent, the phosphazenium compound in the poly-oxyalkylene polyol is extracted in the water. After conducting stationary liquid separation for 2~30 hours, water is exchanged. Although it also depends on the scale of the reaction, rinsing is conducted 3~5 times. After rinsing, water removal and solvent removal is conducted by heat and vacuum processing. As described previously, it is preferable to add oxidation inhibitors prior to heat processing.

Next, method h. (ion exchange processing method) is explained. For every 100 weight parts of crude polyoxyalkylene polyol, 20~200 weight parts of water is added. After contacting with an ion exchange resin at 15~100° C., water is removed by vacuum processing. Examples of contact methods of ion exchange resin and crude polyoxyalkylene polyol include: a method of passing a solution of crude polyoxyalkylene polyol through a column filled with ion exchange resin; a method of adding ion exchange resin to crude polyoxyalkylene polyol and stirring, or the like.

For the ion exchange resin, positive ion exchange resins are good, and the sulfonated functional group type based on styrenedivinyl benzene copolymer is preferred. Furthermore, either the gel-type or the macroporous-type can be used in the present invention. Furthermore, the property of the ion exchange resin can be either strongly or weakly acidic. A strong acid ion exchange resin is recommended. This kind of strong acid ion exchange resins are sold under a variety of product names, such as: LEWATIT S100, S109, SP112, SP120, S100KF (manufactured Bayer AG.), DOWEX HCR-S, 50WX1, 50WX2, (manufactured Dow Chemicals), AMBERLITE IR120, IR122, 200C (manufactured Rohm & Haas Co., Ltd.), or the like. As described previously, an oxidation inhibitor is preferably added at the time of water removal.

By each of the methods described above, after conducting the phosphazenium compound removal operation, the residual amount of phosphazenium compound catalyst in polyoxyalkylene polyol is normally 150 ppm or less, although it may depend on the processing conditions. Preferably it is 90 ppm or less, and more preferably it is 50 ppm or less. When the residual amount of phosphazenium compound in the polyoxyalkylene polyol exceeds 150 ppm, the reaction with a polyisocyanate compound becomes difficult to regulate. The lower limit of the residual amount of phosphazenium compound catalyst is preferably as low as possible. Normally, it is possible to remove up to around 1 ppm using the above refining methods.

The residual amount of phosphazenium compound catalyst, as defined by the present invention, is the phosphazenium cation represented by formula (1) and (2).

Furthermore, the CPR (Controlled Polymerization Rate, an indicator for the amount of basic substances in polyol) of the polyoxyalkylene polyol obtained by the above operation is 5 or less, and is preferably 3 or less. The most favorable CPR is 0. When the CPR of polyoxyalkylene polyol becomes greater than 5, the storage stability of the isocyanate terminated prepolymer which is reacted with the polyisocyanate compound is reduced.

Furthermore, the peroxide concentration in the polyoxyalkylene polyol obtained by the above process is 0.28 mmol/kg or less. Preferably it is 0.20 mmol/kg or less, and most preferably it is 0.15 mmol/kg or less. When the peroxide concentration exceeds 0.28 mmol/kg, if a tin catalyst is used at the reaction with isocyanate compound, the activity of the tin catalyst is lowered by the peroxides. The moldability and mechanical properties of the polyurethane is decreased.

Next, a polymer dispersed polyol of the present invention will be explained.

A polymer dispersed polyol has a polyol as its dispersal medium. Ethylenically unsaturation monomers are polymerized, and the polymer dispersed polyol is manufactured by dispersing polymer particles in the polyol. The polyoxyalkylene polyol used in the polymer dispersed polyol of the present invention satisfies the 4 requirements of the present invention and is also a polyoxyalkylene polyol with a residual amount of phosphazenium compound catalyst of 150 ppm or less. The OHV of the polyoxyalkylene polyol is in the range of 10~100 mgKOH/g, and is preferably in the range of 15~50 mgKOH/g. This kind of polyoxyalkylene polyol is obtained by the method described previously.

The ethylenically unsaturated monomer used for the manufacture of the polymer dispersed polyol has at least one ethylenically unsaturated group which is capable of polymerization. Examples include one type or a mixture of two or more types of the following: cyano group containing monomer such as acrylonitrile, methacrylonitrile; ester methacrylate monomers, such as methylacrylate, butylacrylate, stearylacrylate, hydroxyethylacrylate, dimethylamino ethylacrylate, dimethylamino propylmethacrylate, or the like; carboxyl group containing monomers, such as acrylic acid, methacrylic acid, itaconic acid, maleic acid, fumaric acid, or the like; acid anhydride containing monomers, such as maleic acid anhydride, itaconic acid anhydride, or the like; hydrocarbon monomers, such as butadiene, isoprene, 1,4-pentadiene, or the like; aromatic hydrocarbon monomers, such as styrene, α-methyl styrene, phenyl styrene, chloro-styrene, or the like; halogen containing monomers, such as vinyl chloride, vinylidene chloride, or the like; vinyl ethers, such as vinylethyl ether, vinylbutyl ether, or the like; vinyl ketones, such as vinylethyl ketone, or the like; vinyl esters, such as vinyl acetate, or the like; acrylamides, such as acrylamide, N,N-dimethyl acrylamide, N-isopropyl acrylamide, N,N-dimethylamino propyl acrlyamide, methylene bisacrylamide, or the like; methacrylamides, such as N,N-dimethyl methacrylamide, or the like.

Among these, the ones which are particularly recommended are at least one type of compound selected from the group consisting of acrylonitrile, styrene, acrylamide, and methyl methacrylamide.

The initiator for the present invention is a radical initiator which initiates polymerization by generating radicals. Examples include: azo compounds, such as 2,2'-azobisisobutyronitrile, or the like; peroxides, such as benzoyl peroxide, t-butyl peroxide, di-t-butyl peroxide, or the like; peroxydisulfide, or the like. The usage amount is 0.1~10.0 weight % with respect to ethylenically unsaturated monomer, and preferably it is 0.5~5.0 weight %.

The usage amount of ethylenically unsaturated monomer is 5~60 weight % with respect to the total weight of polyoxyalkylene polyol and ethylenically unsaturated monomer. It is preferably 10~50 weight %. If the amount of ethylenically unsaturated monomer is less than 5 weight %, a sufficient improvement effect for using the polymer dispersed polyol is not observed with the hardness of the polyurethane, or the like. If the amount of ethylenically unsaturated monomer exceeds 60 weight %, the increase in viscosity of the resulting polymer dispersed polyol is very rapid, and this decreases processability and makes dispersion difficult.

In this invention, a chain transfer agent can be used as necessary. Chain transfer agents which can be used include: alcohols, such as isopropanol, or the like; mercaptans; halogenated hydrocarbons; aliphatic tertiary amines, such as triethylamine, tripropylamine, tributylamine, N,N-diethylethanol amine, or the like; morpholines, such as N-methyl morpholine, N-ethyl morpholine, or the like; sodium methallyl sulfonate, sodium allyl sulfonate, or the like. In particular, triethylamine alone, or a mixture of triethylamine and isopropanol is recommended. The usage amount of chain transfer agent is 0.1~10.0 weight % with respect to the total weight of polyoxyalkylene polyol and ethylenically unsaturated monomer.

Polymerization can be conducted in the presence of a dispersion stabilizing agent for the purposes of stably dispersing the polymer particles. Examples of such a dispersion stabilizing agent include polyester polyols which contain unsaturated carboncarbon bonds as described in Japanese Examined Patent Publication No. 49-46556, or modified polyols which have acryl groups, methacryl groups allyl groups, or the like at the end of the molecule. High molecular weight polyoxyalkylene polyol or polyester polyol which essentially does not have any unsaturated carbon-carbon bonds may also be used.

The manufacture of polymer dispersed polyol is conducted by a polymerization reaction using the polyoxyalkylene polyol described above, ethylenically unsaturated monomer, initiator, as well as a chain transfer agent and dispersion stabilizing agent as necessary.

The polymerization reaction can be conducted by a batch method or a continuous method. Although it depends on the type of initiator, the polymerization temperature is greater than the breakdown temperature of the initiator, and is preferably in the range of 60~200° C., and more preferably in the range of 90~150° C. The polymerization reaction can be conducted under increased pressure or under atmospheric pressure.

The polymerization reaction can be conducted without any solvent, or it may be conducted with a solvent of at least one type selected from water or an organic solvent, or it may be conducted in the presence of a mixture of water and the organic solvent. Examples of organic solvents include: toluene, xylene, acetonitrile, hexane, heptane, dioxane, ethylene glycol dimethyl ether, N,N-dimethyl formamide, methanol, butanol, isopropanol, or the like.

After the polymerization reaction is completed, the resulting polymer dispersed polyol can be directly used as the material for polyurethane, but preferably it is used after unreacted ethylenically unsaturated monomer, breakdown products of initiator, chain transfer agents, solvents, or the like are removed by a vacuum treatment.

From the standpoint of polymer dispersion stability and the effect on the properties of the polyurethane, the average particle diameter of the polymer contained in the polymer dispersed polyol of the present invention is preferably 0.01~10 micrometers. The chain transfer agents, dispersal stabilizing agents, the type and amount of solvent, the weight composition ratio of the ethylenically unsaturated monomer, or the like can all be adjusted appropriately in order to achieve a particle size in this range.

The isocyanate terminated prepolymer of the present invention will be described. The prepolymer with an isocyanate end-group is manufactured by reacting a polyol with a polyisocyanate compound. The polyol used in the present invention is a polyoxyalkylene polyol which satisfies the requirements 1~4 which are described above, or it is a polymer dispersed polymer as described above which is derived from this polyoxyalkylene polyol.

First, the method which uses polyoxyalkylene polyol as the polyol will be explained. Of the polyoxyalkylene polyol which satisfies the 4 requirements of the present invention, it is preferably a polyoxyalkylene polyol with 150 ppm or less of residual phosphazenium compound, and more preferably it has 50 ppm or less.

The polyisocyanate compound used in the present invention can be a known aromatic, aliphatic, alicyclic compound, or the like with 2 or more isocyanate groups in one molecule and is used in the manufacture of polyurethane. Examples include: 2,4-tolylene diisocyanate, 2,6-tolylene diisocyanate, an isomer mixture of these polyisocyanate compounds with an 80/20 weight ratio (abbreviated as TDI-80/20) and a 65/35 weight ratio (abbreviated as TDI-65/35), a hydrogenated 2,4-tolylene diisocyanate and hydrogenated 2,6-tolylene diisocyanate where hydrogen is added to the aromatic ring of these tolylene diisocyanate compounds, an isomer mixture of these hydro-tolylene diisocyanate with a 80/20 weight ratio (abbreviated as hydro-TDI-80/20) and 65/35 weight ratio (abbreviated as hydro-TDI 65/35), 4, 4'-diphenyl methane diisocyanate, 2,4'-diphenyl methane diisocyanate, 2,2'-diphenyl methane diisocyanate, any isomer mixture of diphenyl methane dipsocyanatus, 4,4'-dicyclohexyl methane diisocyanate (abbreviated as hydro MDI), isopropylidene bis (4-cyclohexyl isocyanate), 2, 2, 4-trimethyl hexamethylene diisocyanate, 2,4,4-trimethyl hexamethylene diisocyanate, bitolylene diisocyanate, m-xylene diisocyanate, toluidine diisocyanate, xylene diisocyanate, an isocyanate compound where a hydrogen is added to the aromatic ring of a xylene diisocyanate (abbreviated as hydro XDI), lysine diisocyanate methyl ester, hexamethylene diisocyanate, isophorone diisocyanate, naphthalene diisocyanate, p-phenylene diisocyanate, norbornene diisocyanate, and carbodiimide or biuret modified products of these polyisocyanate compounds, or modified prepolymers of these using polyol, monohydroxy compound alone or together. The above polyisocyanate compounds can be mixed at any ratio and used.

The preferred polyisocyanate compounds are: mixtures of 2,4- and 2,6-tolylene diisocyanate TDI-80/20, TDI-65/35, hydro TDI 80/20 and hydro TDI 65/35 which are given as examples, p-phenylene diisocyanate, diphenylmethane diisocyanates, hydro MDIs, xylene diisocyanate, hydro XDI, hexamethylene diisocyanate, cyclohexyl diisocyanate, norbornene diisocyanate, isophorone diisocyanate.

When manufacturing isocyanate terminated prepolymer, the isocyanate index (NCO index), which is the ratio of the isocyanate group concentration with respect to the active hydrogen group concentration in the polyoxyalkylene polyol, is 1.3~20.0, preferably 1.4~12.0, and more preferably 1.5~9.0.

The content of isocyanate (referred to as the NCO %) in the isocyanate terminated prepolymer is 0.3~30 weight %, preferably 0.4~20 weight %, even more preferably 0.8~18 weight %. Isocyanate terminated prepolymer which is used in one-fluid type curing composition which uses the moisture in the air as the curing agent is designed to have a low NCO %. Furthermore, in two-fluid curing composition which has a curing agent selected from the group consisting of glycols, such as 1,4-butane diol or polyoxyalkylene polyols, and polyamine compounds, such as 3,3'-dichloro-4, 4'-diamino diphenyl methane, diethyl diamino toluene, or the like, the isocyanate terminated prepolymer which is used for this has a comparatively higher NCO % than that for a one-fluid type.

The temperature at the time of manufacture of the isocyanate terminated prepolymer is preferably 50 120° C. and more preferably 70~105° C. At the time of reaction, it is desirable to have the reaction occur under an inactive gas in order to avoid contact with moisture in the air. Inactive gas includes nitrogen, helium, or the like. Nitrogen is preferred. The reaction is conducted under nitrogen atmosphere for 2~20 hours while stirring.

Although a catalyst does not need to be used, if one is to be used, a known catalyst can be used. Examples include: amine catalysts, such as triethylamine, tripropylamine, tributylamine, N,N,N',N'-tetramethyl hexamethylene diamine, N-methyl morpholine, N-ethyl morpholine, dimethylcyclohexyl amine, bis(2-dimethyl-amino)ethyl ether, triethylene diamine, and the salt of triethylene diamine; amine salts, such as dibutyl amine-2-ethylhexoate, or the like; organic metal catalysts such as tin acetate, tin octylate, tin oleate, tin laureate, dibutyl tin diacetate, dibutyl tin dilaurate, dibutyl tin dichloride, 2-ethyl tin hexylate, lead octate, lead naphthenate, nickel naphthenate, and cobalt naphthenate, or the like.

These catalysts can be freely mixed and used. Of these catalysts, organic metal catalysts are particular favorable. The usage amount is 0.0001~1.0 weight parts for every 100 weight parts of polyoxyalkylene polyol, and is preferably 0.01~0.8 weight parts.

When manufacturing isocyanate terminated prepolymer, an organic solvent which is inactive to polyisocyanate compounds and polyoxyalkylene polyol can be used before or after the reaction. The usage amount of the organic solvent is 40 weight % or lower with respect to the total weight of the polyoxyalkylene polyol and polyisocyanate compound. It is preferably 20 weight % or less.

For this solvent, aromatics, aliphatics, alicyclics, ketones, esters and ester ethers can be used. Examples include: toluene, xylenes, hexanes, cyclohexane, methyl ethyl ketone, methyl isobutyl ketone, ethyl acetate, butyl acetate, ethyl cellosolve acetate, butyl cellosolve acetate, or the like.

The isocyanate terminated prepolymer of the present invention can be used for both the one-fluid type curing composition which cures by itself in reaction with the water in the air, or the two-fluid type curing composition which has a curing agent which has an active hydrogen group. If polyoxyalkylene polyol is used as the curing agent which has an active hydrogen group, it is preferable to use the polyoxyalkylene polyol obtained by the present invention.

Catalyst for curing, filler, plasticizer, pigment, stiffener, flame retardants, and stabilizers which are described below can be mixed with the isocyanate terminated prepolymer of the present invention.

Examples of fillers include: fumed silica, silica, silicic acid anhydride, carbon black, calcium carbonate, magnesium carbonate, diatomaceous earth, burnt clay, clay, talc, titanium oxide, bentonite, iron (II) oxide, hydrocastor oil, zinc stearate, or the like. The amount to be added is 2~60 weight parts for every 100 weight parts of isocyanate terminated prepolymer, and it is preferably 10~50 weight parts.

Examples of plasticizers include: dioctyl phthalate, dibutyl phthalate, dioctyl adipate, phthalate, butylphalyl butyl glycolate, dioctyl sebacate, tricresyl phosphate, tributyl phosphate, chlorinated paraffin, petroleum ethers or the like. The amount to be added is 5~40 weight parts for every 100 weight parts of isocyanate terminated prepolymer, and it is preferably 5~15 weight parts.

Examples of stiffeners include carbon black black filler, white carbon white filler, silica, kaolin which is a silicate, bentonite, fine powder silicic acid anhydride, barite, gypsum, bone meal, dolomite, and the like. The amount to be added is 1~50 weight parts for every 100 weight parts of isocyanate terminated prepolymer, and it is preferably 2~30 weight parts.

Examples of flame retardants include: tris (2-chloropropyl) phosphate, tris (dichloropropyl) phosphate, tris (dibromopropyl) phosphate, tris (2,2-chloroethyl) phosphate, hexabromocyclododecane, CR-505 and CR-507 of Daihachi Kagaku, Phosagard 2XC-20 and C-22-R of Monsanto Chemicals, Fyroll 6 of Stouffer Chemicals, or the like. The usage amount is 0.1~30 weight parts for every 100 weight parts of isocyanate terminated prepolymer, and it is preferably 0.2~20 weight parts.

Examples of stabilizing agents include oxidation inhibitors, ultraviolet absorbing agents, heat stabilizers. There are no particular limitations for oxidation inhibitors. Examples include: butyl hydroxyanisole, t-butyl hydroxytoluene, 1,3,5-trimethyl-2,4,6-tris(3,5-di-t-butyl-4-hydroxybenzyl)benzene, 3,9-bis[2-(3-(3-t-butyl-4-hydroxy-5-methylphenyl)-propionyloxy)-1,1dimethyl-ethyl]-2,4,8,10-tetraoxaspiro(5,5)undecane, distearyl thiodipropionate, or the like.

Examples of ultraviolet absorbing agents include: p-t-butyl-phenyl salicylate, 2-hydroxy-4-methoxybenzophenone, 2-hydroxy-4-methoxybenzophenone, or the like. Examples of heat stabilizing agents include: tris (2,4-di-t-butylphenyl) phosphate, triphenyl phosphate, trilauryl phosphate, or the like. The amount to be added for each is 100~8,000 ppm for every 100 weight parts of isocyanate terminated prepolymer. Pigment, antimold agents such as bis(tri-n-butyltyne)oxide, or the like, antifoaming agents, organic solvents as described above, water removal agents, or the like can be used as necessary.

Next, the method where polymer dispersed polyol is used as polyol will be explained. Isocyanate terminated prepolymer which uses polymer dispersed polyol is basically manufactured by the same method as when polyoxyalkylene polyol is used. The polyisocyanate compound, auxiliary agents, or the like are the same ones as described previously. In other words, it is a method which uses polymer dispersed polyol in place of polyoxyalkylene polyol.

For the polymer dispersed polyol, the polymer dispersed polyol of the present invention is used. When considering the viscosity of the prepolymer, it is preferable to use the polymer dispersed polyol of the present invention which has a polymer concentration of 5~30 weight %. The isocyanate group content of the isocyanate terminated prepolymer is 0.3~30 weight %, and it is preferably 0.4~20 weight %.

Next, an isocyanate terminated prepolymer with 1 weight % or less of free isocyanate compound content will be explained. An isocyanate terminated prepolymer which has a free isocyanate compound content of 1 weight% or less has a isocyanate group content of 0.3~30 weight %, and it is preferably 0.4~20 weight %, and it is more preferably 0.8~18 weight %.

Furthermore, it is preferable that the free isocyanate compound content in the isocyanate terminated prepolymer be 0.8 weight % or less. It is more preferably 0.5 weight % or less. When the content of free isocyanate compound exceeds 1 weight %, the control of the reaction during the molding process of the polyurethane resin becomes difficult. Furthermore, the resulting polyurethane resin has a larger hysterisis loss.

Isocyanate terminated prepolymer which has 1 weight % or less of free isocyanate compound content is manufactured through the following three processes.

(Process 1) Manufacturing process of polyoxyalkylene polyol.

(Process 2) Manufacturing process of crude isocyanate terminated prepolymer.

(Process 3) Vacuum treatment process of crude isocyanate terminated prepolymer.

In the first process, polyoxyalkylene polyol is manufactured in the same method as the manufacture method for polyoxyalkylene polyol as described above. From the polyoxyalkylene polyol which is obtained, the polyoxyalkylene polyol with OHV of 10~200 mgKOH/g and which satisfy properties 2~4, and which has a CPR of 5 or lower is used. Furthermore, the residual amount of phosphazenium compound catalyst is 150 ppm or less, and preferably it is 90 ppm or less, and even more preferably it is 50 ppm or less.

Next, the second process is explained. The second process is a manufacture process for crude isocyanate terminated prepolymer, wherein: the ratio of the isocyanate group concentration to the hydroxyl group concentration of the polyoxyalkylene polyol (NCO index) is in the range of 2.5~10.0; a polyol which contained 60~100 weight % of the polyoxyalkylene polyol obtained in the first process and a polyisocyanate compound is reacted in the presence of inactive gas at a reaction temperature of 20~100° C.

When polyol which contained 60~100 weight % of phosphazenium catalyzed polyoxyalkylene polyol of the present invention is reacted with polyisocyanate compound, NCO index is in the range of 2.5~10.0. It is preferably in the range of 3.0~9.0 and even more preferably it is in the range of 3.5~8.0. If the NCO index becomes smaller than 2.5, dimers (will be referred to as oligomers), which are formed by the reaction between isocyanate terminated prepolymer and a polyol which has been partially isocyanated, form more easily. The viscosity of the prepolymer increases, but the hysterisis loss of the polyurethane elastomer which uses the polymer becomes larger. Furthermore, if the NCO index exceeds 10.0, the time for the vacuum processing, which is the third process of the present invention, becomes long.

At the time of prepolymerization, a polyol with at least 60 weight % of a phosphazenium-catalyzed polyoxyalkylene polyol of the present invention is used. Preferably, the content of the phosphazerium-catalyzed polyoxyalkylene polyol of the present invention is at least 70 weight %. If the phosphazenium-catalyzed polyoxyalkylene polyol becomes less than 60 weight %, the viscosity of the isocyanate terminated prepolymer rises. The polyol which is used together with the phosphazenium-catalyzed polyoxyalkylene polyol of the present invention is a low molecular weight polyol of at least one type selected from the group consisting of ethylene glycol, diethylene glycol, propylene glycol, dipropylene glycol, 1,3-propane diol, 1,4-cyclohexane diol, 1,3-butane diol, 1,4-butane diol, 1,5-pentane diol, neopentyl glycol, 1,6-hexane diol, 1,4-cyclohexane diol, glycerin, and trimethylol propane. These compounds can be used alone or together.

Of these compounds, a compound selected from the group consisting of ethylene glycol, diethylene glycol, propylene glycol, dipropylene glycol, 1,3-propane diol, 1,4-cyclohexane diol, 1,3-butane diol, 1,4-butane diol, 1,5-pentane diol, neopentyl glycol, 1,6-hexane diol, and 1,4-cyclohexane diol are recommended. More preferably, it is selected from the group consisting of ethylene glycol, diethylene glycol, propylene glycol, dipropylene glycol, 1,3-propane diol, 1,4-cyclohexane diol, 1,3-butane diol, 1,4-butane diol.

Other than the low molecular weight polyols described above, at least one type of polyol selected from the group consisting of polytetramethylene glycol, polyethylene adipate, polycaprolactone polyol, polycarbonate polyol, castor oil polyol and polybutanediene polyol can be used. These polyols can be used alone or jointly. Among these polyols, polytetramethylene glycol, polyethylene adipate, polycaprolactone polyol, polycarbonate polyol are preferred. The average molecular weight of these polyols is 300~6,000, and 800~4,000 is desirable.

For the polyol used in the prepolymerization, two or more types of the phosphazenium-catalyzed polyoxyalkylene polyol of the present invention with differing OHV's can be used together. Two or more polyoxyalkylene polyols with differing average functional group number can also be used. For example, a polyoxyalkylene polyol which uses as the initiator a 2 functional active hydrogen compound such as ethylene glycol, propylene glycol, or dipropylene glycol and a polyoxyalkylene polyol which uses as the initiator a 3 functional active hydrogen compound such as glycerin, trimethylol propane, or the like can be used.

Polyisocyanate compound used in the present invention is the same as the ones explained in the isocyanate terminated prepolymer section above.

The prepolymerization reaction of the present invention is conducted under an atmosphere of inactive gas such as nitrogen or helium. The reaction temperature of the mixture of polyol and tolylene diisocyanate is 20~100° C., preferably 30~98° C., and more preferably 35~95° C. If the reaction temperature is lower than 20° C., the prepolymer reaction time becomes long. If the temperature exceeds 100° C., oligomers described previously are more easily generated.

The third process is explained. The crude isocyanate termi- nated prepolymer obtained in the second process is vacuum treated under condition of 70~180° C., pressure of 665 Pa (5mmHg abs.) or lower. This process produces an isocyanate terminated prepolymer with a free isocyanate compound content of 1 weight % or less.

In order to produce a prepolymer with a free isocyanate compound content of 1 weight % or less, vacuum processing is conducted under temperature of 70~180° C., pressure 665 Pa (5 mmHg abs.) or lower.

The vacuum processing operation is an important process for suppressing the formation of dimers of unreacted isocyanate compound at the vacuum processing step. The temperature at the time of vacuum operation is 70~180° C., preferably 80~150° C., and more preferably 85~130° C. When the temperature becomes lower than 70° C., the time needed to remove unreacted isocyanate compounds becomes longer. When the temperature exceeds 180° C., the viscosity of the prepolymer in the vacuum treatment process increases. The pressure is 665 Pa (5 mmHg abs.) or lower, preferably 266 Pa (2mmHg abs.), more preferably 133 Pa (1 mmHg abs.) or lower.

When the pressure exceeds 665 Pa (5 mmHg abs.), the time needed to remove unreacted isocyanate compound becomes longer, and the viscosity of the prepolymer in the vacuum treatment process increases. The vacuum processing is preferably by film evaporation method, using a forced circulation agitated film type evaporator, or a membrane molecular distillation device or the like (reference: 5th edition, Chemical Engineering Handbook [Kagaku Kogaku Binran], Chemical Engineering Association [Kagaku Kogaku Kyokai] Maruzen Corp. 1988). Examples of such a device include: Smith type film evaporator with trade name Wipren, Exceba, from the Sinko Pantech Corp., or a Contro type film evaporator and Sanbay type film evaporator from Hitachi Corp. The polyisocyanate compound recovered from the prepolymer by the vacuum processing can be reused in the prepolymerization reaction. The polyisocyanate which is reused in the prepolymer reaction is preferably a polyisocyanate compound with few impurities such as dimers, oligomers, or the like.

By conducting the processes 1 through 3, an isocyanate terminated prepolymer with a free isocyanate content of 1 weight % or less can be produced. Next, a polyurethane resin which uses the isocyanate terminated prepolymer of the present invention will be described.

Polyurethane resin, wherein a prepolymer which contains the isocyanate terminated prepolymer of the present invention and a chain extender are reacted, is mainly used in the fields of polyurethane elastomer, polyurethane urea elastomer, sealant agent, coating material, adhesives. The prepolymer contains at least 60 weight % of the isocyanate terminated prepolymer of the present invention, and it preferably contains at least 70 weight %.

Prepolymers which use phosphazenium catalyzed polyoxyalkylene polyol other than the isocyanate terminated prepolymer of the present invention are those shown as examples in Japanese Examined Patent No. 6-13593 wherein isocyanate terminated prepolymer has a free isocyanate content of 1 weight % or less and use polytetramethylene glycol, polyoxyethlene adipate, and polycaprolactone polyol as components. If the content of isocyanate terminated prepolymer which uses phosphazenium catalyzed polyoxyalkylene polyol becomes less than 60%, the viscosity of the prepolymer increases, and the processability is reduced.

The chain extender used for the manufacture of the polyurethane resin is a compound which has 2 or more active hydrogen groups which can react with the isocyanate group per molecule. It is also at least one type selected from a group consisting of a polyol compound and a polyamine compound. Polyol compounds include, for example: bivalent alcohols, such as ethylene glycol, propylene glycol, dipropylene glycol, diethylene glycol, triethylene glycol, 1,3-propane diol, 1,3-butane diol, 1,4-butane diol, 1,5-pentane diol, neopentylglycol, 1,6-hexane diol, or the like; trivalent alcohols, such as glycerin, trimethylol propane, or the like; cyclohexanes such as 1,4-cyclohexane diol, spirohexane diol; those compounds which contain a spiro ring and methylene chain and containing various bonds such as a ether bond or ester bond to bond these; derivatives of these which contained various substitution groups.

Furthermore, for the polyamine compound, known polyamine compounds from the prior art can be used. These include: aromatics, such as tolylene diamine, 3,5-diethyl-2,4-diaminotoluene, 3,5-diethyl-2,6-diaminotoluene, diphenyl methane diamine, m-phenylene diamine, 3,3'-dichloro, 4'-diamino diphenylmethane, diethyltoluene diamine, or the like; aliphatics, such as diamine, isophorone diamine, norbornene diamine, or the like; glicyclic diamine; straight chain aliphatic diamine; alkyl dihydrazides, such as carbodihydrazide, dihydrazide adipate, or the like; and their derivatives.

Furthermore, polyols in which alkylene oxides are added to these active hydrogen compounds by the known methods can also be used as chain extenders. Furthermore, the phosphazenium catalyzed polyoxyalkylene polyol of the present invention can also be used. When using a polyol described above, a polyol with a C=C of 0.07 meq./g or lower is used in order to improve the appearance and mechanical properties of the polyurethane resin.

Of the compounds which are described above, the preferred polyols are selected from a group consisting of ethylene glycol, propylene glycol, diethylene glycol, triethylene glycol, 1,4-butane diol, 1,4-cyclohexane diol, glycerin, trimethylol propane, 3,5-diethyl-2,4-diaminotoluene, 3,5-diethyl-2,6-diaminotoluene, 3,3'- dichloro-4,4'-diaminodiphenyl methane, isophorone diamine, norbornene diamine, and polyols in which alkylene oxide is addition polymerized to these compounds. The following polyols are more preferable: ethylene glycol, propylene glycol, diethylene glycol, triethylene glycol, 1,4-butane diol, glycerin, trimethylol propane, isophorone diamine, norbornene diamine, and polyols in which alkylene oxide is addition polymerized to these compounds.

Normally, the manufacture method for polyurethane resin is to have the isocyanate terminated prepolymer and chain extender adjusted to the desired temperature beforehand, and a vacuum defoaming process is conducted. Next, both components are mixed, and rapid stirring is conducted. This is then injected into a mold which has been heated to the desired temperature, 40~140° C., for example, and a molded product is manufactured. Catalyst for curing inorganic acid, organic acid, silicone coupling agent, filler, plasticizer, pigment dyes, reinforcing agents, flame retardants, stabilizers, defoamers, or the like can be added depending on the objective. For the polyurethane curing catalyst, known catalysts for polyurethane manufacture, such as amine compounds and organic metal compounds, or the like can be used. This kind of polyurethane curing catalyst is the same compounds which were described in the section on isocyanate terminated prepolymer.

In order to suppress the viscosity changes of the prepolymer over time, inorganic acid or organic acid can be added to the prepolymer. For inorganic acids, phosphoric acid is recommended, and for organic acids, adipic acid, 2-ethyl hexanoic acid, and oleic acid, or the like are recommended. These acids can be used alone, or two or more types can be used together. The usage amount is 0.001~10.0 weight parts for every 100 weight parts of prepolymer which contains isocyanate terminated prepolymer of the present invention, and it is preferably 0.003~5.0 weight parts.

Examples of silicone coupling agent include the following:

γ-aminopropyl trimethoxysilane, γ-mercaptopropyl trimethoxysilane, γ-glycidoxypropyl trimethoxysilane, or the like. The usage amount is 0.01~8.0 weight parts for every 100 weight parts of prepolymer which contains isocyanate terminated prepolymer of the present invention, and it is preferably 0.03~5.0 weight parts.

Finally, polyoxyalkylene polyamine and polyurethane urea resin which is derived from the polyoxyalkylene polyamine will be described.

The active hydrogen value of the polyoxyalkylene polyamine of the present invention is 5~180 mg KOH/g, and is preferably 9~170 mg KOH/g, and is more preferably 12~150 mgKOH/g. Furthermore, the main chain structure of the polyoxyalkylene polyamine contains at least 50 mol % of oxypropylene group, and is preferably at least 70 mol %. Furthermore, H-T bond selectivity of the oxypropylene group bond is 95 mol % or greater. If the H-T bond selectivity becomes less than 95 mol %, the viscosity of the polyoxyalkylene polyamine increases, and the molding properties of polyurethane urea resin decreases.

The manufacture method of polyoxyalkylene polyamine will be explained. The polyoxyalkylene polyol used in the manufacture of polyoxyalkylene polyamine is preferably one which satisfies the 4 requirements of the present invention. A polyoxyalkylene polyol with these properties is obtained by the method described above.

Polyoxyalkylene polyamine is manufactured by aminating a portion or all of the end hydroxyl groups of the polyoxyalkylene polyol described above. Examples of methods of amination include the following:

(i) a method of reacting polyoxyalkylene polyol and a nitrogen containing active hydrogen compound of at least one type selected from the group consisting of ammonia, primary amine, secondary amine, and diamine in the presence of a hydrogenationdehydrogenation catalyst.

(j) a method of first reacting a polyoxyalkylene polyol and a compound which contained in its molecule a cyano group or a nitro group as well as a functional group capable of reacting to a hydroxyl group and then conducting a hydrogen addition reaction or the like.

First the method in (i) will be explained.

Known catalysts from the prior art can be used for the hydrogenation-dehydrogenation catalyst. The following are representative examples: support-type catalysts in which Ni, Co, or the like are supported by catalyst supports such as diatomaceous earth, silica, alumina; Ni, Co Raney catalysts, Ni/Zn catalysts, Co/Zn catalysts, Ni/Co/Zn catalysts, Cu/Cr catalysts. Of these, support-type catalysts are particularly favorable.

Normally, primary amines are amine compounds with a carbon number of 1~20, and it is preferably 1~10. Concrete examples include the following: alkylamines, such as methylamine, ethylamine, n-propylamine, isopropylamine, butylamine, isobutylamine, sec-butylamine, t-butylamine, amylamine, hexylamine, heptylamine, octylamine, nonylamine, decylamine, dodecylamine, tetradecylamine, hexadecylamine, octadecylamine, oleylamine, or the like; alkylamines with substitution groups such as β-aminopropylmethylether, β-aminopropylethylether, or the like; aralkylamines such as benzylamine, p-methylbenzylamine, or the like; alicyclic amines, such as cyclopentylamine, cyclohexylamine, or the like. Furthermore, mixtures of 2 or more selected from the primary amines listed above can also be used.

Normally, secondary amines are amine compounds with a carbon number of 2~40. Concrete examples include the following: alkylamines, such as dimethylamine, diethylamine, di n-propylamine, diisopropylamine, dibutylamine, diamylamine, dihexylamine, methylethylamine, methylpropylamine, methylisopropylamine, ethylpropylamine, ethylisopropylamine, N-methyldodecylamine, or the like; aralkylamines, such as dibenzylamine, N-methylbenzylamine, or the like. Furthermore, mixtures of 2 or more selected from the secondary amines listed above can also be used.

Examples of diamines are the following: ethylene diamine, diaminopropane, diaminobutane, diaminotoluene, m-phenylenediamine, diaminodiphenylmethane, diaminophenylsulfone, di-ethyldiaminotoluene, diamino indan derivatives, or the like. Furthermore, mixtures of 2 or more selected from the diamines listed above can also be used.

The usage amount of the nitrogen containing active hydrogen compound is determined by what the polyoxyalkylene polyamine is to be used for. However, it is usally 0.2~50 equivalents for every one equivalent of the hydroxyl group, and preferably it is 1~10 equivalents. The amount of the previously described catalyst is normally 0.1~20 weight % with respect to the polyoxyalkylene polyol, but it is preferably 0.3~10 weigh %, and more preferably 0.5~5 weight %.

In method (i), for the purposes of obtaining a polyoxyalkylene polyamine with a high secondary amination, the reaction can be conducted with a univalent alcohol present with ammonia and primary amine which are the nitrogen containing active hydrogen compounds. Univalent alcohols can be primary with a carbon number of 1~10 or secondary. Concrete examples include the following: alkylalcohols, such as methanol, ethanol, n-propanol, isopropanol, n-butanol, isobutanol, sec-butanol, amylalcohol, hexanol, heptanol, octanol, nonylalcohol, decylalcohol, or the like; alkylalcohols with substitution groups such as β-hydropropylmethylalcohol, β-hydropropylethylalcohol, or the like; arakylalcohol, such as benzylalcohol, p-methylbenzylalcohol, o-methylbenzylalcohol, or the like; cycloalkylalcohol such as cyclopetnylalcohol, cyclohexylalcohol, or the like.

Depending on the previously described polyoxyalkylene polyol, catalyst, nitrogen containing active hydrogen compound, and objective, amination reaction is conducted using an univalent alcohol. There are no particular limitations on the reaction conditions. Generally, the reaction temperature is 60~280° C., preferably 130~250° C. Reaction pressure is 490~14,700 kPa (5~150 kgf/cm$^2$), particularly 2940~9.800 kPa (30~100 kgf/cm$^2$). Reaction time is 1~20 hours, preferably 5~10 hours. Hydrogen can be present in the reaction system. Reaction temperature less than 60° C. lengthens the reaction time. Temperatures greater than 280° C. heat degrades the products.

After completion of the reaction, the polyoxyalkylene polyamine which is the target can be obtained through a combination of the following methods as appropriate: recovery of unreacted nitrogen containing active hydrogen compounds and alcohol, if univalent alcohol is present, by vacuum processing; catalyst filtration; water rinsing; drying or the like.

Next, the method (j) will be described.

Compounds which have a cyano group or nitro group and a functional group capable of reacting with a hydroxyl group include cyano compounds or nitro compounds which have ethylenically unsaturated group, ester group, carboxyl group, halogen substitution group, or the like. Concrete examples include the following: α, β-unsaturated nitrites, such as acrylonitrile, methacrylonitrile, or the like; nitroester benzoates such as p-nitromethyl benzoate, p-nitroethyl benzoate, or the like; nitrobenzoic acids, such as o-nitrobenzoic acid, p-nitrobenzoic acid, or the like; halogen-substituted benzonitrile, such as o-chlorobenzonitrile, p-chlorobenzonitrile, or the like; cyanobenzyl halides, such as o-cyanobenzyl chloride, p-cyanobenzyl chloride, or the like; nitrohalobenzenes, such as p-nitrochlorobenzene, p-nitrobromobenzene, or the like; nitrobenzylhalides, such as p-nitrobenzyl chloride, p-nitrobenzyl bromide, or the like; or the like.

Normally, when α, β-unsaturated nitrites are used, polyoxyalkylene polyol is cyanoalkylated in the presence of an alkali metal hydroxide and water, and a cyano group is introduced to the end of the polyoxyalkylene polyol. When the concentration of residual phosphazenium compound is high in the polyoxyalkylene polyol, an alkali metal hydroxide does not need to be used, but generally, an alkali metal hydroxide, such as sodium hydroxide, potassium hydroxide, rubidium hydroxide, cesium hydroxide, or the like, is used to shorten the reaction time. In order to suppress the polymerization reaction of α, β-unsaturated nitrile and to react the end hydroxyl group of the polyoxyalkylene polyol, it is important to conduct the reaction in the presence of water.

In order to have the target cyanoalkylating reaction proceed, the appropriate amounts of polyoxyalkylene polyol, α, β-unsaturated nitrile, alkali metal hydroxide which is used depending on the objective, and water are selected. Normally, for every 100 weight parts of polyoxyalkylene polyol, 2~15 weight parts of water is used. When an alkali metal hydroxide is used, 0.01~7.0 weight parts for every 100 weight parts polyoxyalkylene polyol is used. For the α, β-unsaturated nitrile, 0.2~0.5 equivalents are used for every 1 equivalent of the hydroxyl group of polyoxyalkylene polyol. The α, β-unsaturated nitrile can be added appropriately depending on the progress of the reaction, or it can be added all at once. There are no particular limitations to the reaction conditions, but usually the reaction temperature is 10~ 130° C., reaction time is 5~20 hours. After completion of the reaction, the cyanoalkylated polyoxyalkylene polyol is obtained by neutralizing the acid with an alkali metal hydroxide catalyst and removing water and the like.

When nitro ester benzoate or nitrobenzoic acid is used, in the presence of a basic catalyst or an acid catalyst, a nitro group is introduced to the end of the polyoxyalkylene polyol by conducting an ester exchange reaction with the polyoxyalkylene polyol, or by conducting a direct esterification. When the concentration of residual phosphazenium compound in the polyoxyalkylene polyol is high, a basic catalyst or acid catalyst does not need to be used, but in general a basic catalyst or acid catalyst which is listed below is used.

Examples of basic catalysts include, the following: alkali metal hydroxides, such as sodium hydroxide, potassium hydroxide, rubidium hydroxide, cesium hydroxide, or the like; alkali metal carbonates, such as sodium carbonate, potassium carbonate, rubidium carbonate, cesium carbonate, or the like; alkali metal hydrogen carbonates, such as sodium hydrogen carbonate, potassium hydrogen carbonate, rubidium hydrogen carbonate, cesium hydrogen carbonate, or the like; alkali earth metal hydroxides, such as calcium hydroxide, magnesium hydroxide, barium hydroxide, strontium hydroxide, or the like; tertiary amine compounds, such as trimethylamine, triethylamine, dimethyl-palmitylamine, or the like; or the like. Examples of acid catalysts include, the following: proton acids, such as sulfuric acid, hydrochloric acid, p-toluene sulfonic acid, or the like; Lewis acids, such as boron trifluoride etherate, or the like. For every 1 equivalent of the hydroxyl group of polyoxyalkylene polyol, 0.2~20 equivalents of nitro ester benzoate, nitrobenzoic acid is normally used.

When a basic catalyst or an acidic catalyst is used, the usage amount is 0.002~0.5 equivalents for every 1 equivalent of the nitro ester benzoate, and 0.0001~0.5 equivalents for every 1 equivalent of nitrobenzoic acid. There are no particular limitations on the reaction conditions. Normally, the reaction temperature is 50~250° C., reaction time is 1~20 hours. The reaction can take place under reduced pressure or increased pressure. Furthermore, a solvent can be present in the reaction system. The solvent can be anything which does not interfere with the above reaction and which forms an azeotropic mixture with water. Concrete examples include the following: benzene, toluene, xylene, or the like. After the completion of the reaction, the target nitro-benzoated polyoxyalkylene polyol is obtained by combining the following methods as needed: neutralization of the catalyst; recovery of unreacted nitro esther benzoate or nitro benzoic acid; rinsing with water; drying, or the like.

When using a halogen substituted benzonitrile, cyanobenzyl halide, nitrohalobenzone, nitrohalobenzyl (referred to as aromatic cyano compounds, or aromatic nitro compounds), in the presence of a basic catalyst which acts as a hydrogen halide scavenger, a cyano group or a nitro group is introduced to the molecule end of polyoxyalkylene polyol by dehydrohalogenation reaction with polyoxyalkylene polyol. If the concentration of phosphazenium compound in the polyoxyalkylene polyol is high, a basic catalyst does not need to be used, but generally a basic catalyst which is listed below is used.

Examples of basic catalysts include the following: alkali metals, such as sodium metal, potassium metal, rubidium metal, and cesium metal, or the like; alkali metal hydroxides, such as sodium hydroxide, potassium hydroxide, rubidium hydroxide, cesium hydroxide, or the like; alkali metal carbonates, such as sodium carbonate, potassium carbonate, rubidium carbonate, cesium carbonate, or the like; alkali metal hydrogen carbonates, such as sodium hydrogen carbonate, potassium hydrogen carbonate, rubidium hydrogen carbonate, cesium hydrogen carbonate, or the like; alkali earth metal hydroxides, such as calcium hydroxide, magnesium hydroxide, barium hydroxide, strontium hydroxide, or the like; tertiary amine compounds, such as trimethylamine, triethylamine, dimethylpalmitylamine, or the like. The usage amount of aromatic cyano compound or aromatic nitro compound is determined based on its use, but normally 0.2~20 equivalents for every 1 equivalent of hydroxyl group is used. When a basic catalyst is used, normally 1~10 equivalents is used for every 1 equivalent of aromatic cyano compound or aromatic nitro compound.

There are no particular limitations to the reaction conditions. However, normally, reaction temperature is 50~250° C., reaction time is 1~20 hours. The reaction pressure can be reduced pressure or increased pressure. Solvent can be present in the reaction system. A solvent which does not interfere with the above reaction and which is a polar solvent is particularly suitable. Concrete examples include the following: dimethylformamide, dimethylsulfoxide, dimethylimidasolidinone, sulforan, or the like. After completing the reaction, the target compound which has at least one type of cyano group or nitro group on the molecule end is obtained by an appropriate combination of the following methods: neutralization of basic catalyst, recovery of unreacted aromatic cyano compound or aromatic nitro compound; rinsing with water; drying; or the like.

By the methods described above, in the presence of a catalyst, a polyoxyalkylene polyamine is obtained by conducting a hydrogenation reaction on a compound which has at least one type selected from a group consisting of a cyano group or a nitro group on the molecule terminus. A known compound of the prior art can be used as the catalyst. For example, support-type catalysts in which Ni, Co, or the like are supported by catalyst supports such as diatomaceous earth, silica, alumina; Ni, Co Raney catalysts; support-type catalysts in which precious metals such as Pd, Pt, Ru, or the like are supported by catalyst supports such as carbon, alumina, silica. Among these, supported catalysts are one of the more suitable catalysts.

Normally, the usage amount of catalyst is 0.1~20 weight % with respect to the compound which contained at least one type of either cyano group or nitro group on the molecule end as described above. There are no particular limitations to the reaction conditions, but generally, the temperature is 30~200° C., preferably 50~150° C. The reaction pressure is 98~8,820 kPa (1~90 kgf/cm$^2$), preferably 980~4,900 kPa (10~50 kgf/cm$^2$). The reaction time is 1~20 hours and preferably 5~10 hours.

A solvent can be present in the reaction system. The solvent can be anything which does not interfere with the above reaction. Examples include: lower alcohols, such as methanol, ethanol, or the like; aromatic hydrocarbons, such as toluene, xylene, or the like. Furthermore, ammonia can be present in the reaction system. After completion of the reaction, the targeted polyoxyalkylene polyamine can be obtained by an appropriate combination of methods: catalyst filtration, rinsing, drying, or the like.

Manufacturing a polyoxyalkylene polyamine by aminating a portion or all of the hydroxyl end-group of a polyoxyalkylene polyol is possible with methods other than the (i), (j) described above. For example, the following methods may be used: a method of ester exchange reaction between polyoxyalkylene polyol and amino ester benzoate; a method of first reacting polyoxyalkylene polyol and p-nitrochloride benzoate in the presence of a hydrogen halide scavenger, and then reducing the nitro group; a method of reacting polyoxyalkylene polyol and isophthalic acid anhydride in the presence of a strong base; a method in which after prepolymerizing with a polyisocyanate compound, the residual isocyanate group is hydrolyzed to an amino group.

Next, the polyurethane urea resin will be explained. The polyurethane urea resin is manufactured by rapidly mixing a polyol which contained the polyoxyalkylene polyamine of the present invention, a chain extender, and a polyisocyanate compound.

The polyol which is used for the raw material of the polyurethane urea resin is a polyol which contains at least 2 weight % of the polyoxyalkylene polyamine described above.

Preferably, it contains at least 30 weight % of this polyoxyalkylene polyamine. More preferably, it contains at least 50 weight %. When the polyoxyalkylene polyamine content in the polyol is less than 2 weight %, improvement in the surface conditions and the mechanical properties of the polyurethane urea resin is not seen.

Examples of polyols other than the polyoxyalkylene polyamine used in the present invention include the following: polyoxyalklyene polyol which is used as the starting substance for the polyoxyalkylene polyamine of the present invention, polyoxyalkylene polyol manufactured by known methods of the prior art, polyoxyalkylene polyamine, polymer dispersed polyol, polytetramethylene glycol, polyester polyol, polybutadiene polyol, and polycarbonate polyol. However, the polyoxyalkylene polyol which is used as the starting substance for the polyoxyalkylene polyamine of the present invention is strongly recommended.

The polyisocyanate compound used in the manufacture of polyurethane urea resin is the same as the one described in the section on the isocyanate terminated prepolymer.

Chain extenders are compounds which have, for every molecule, 2 or more active hydrogen groups which can react with an isocyanate group. At least one type of either polyol compound or polyamine compound with molecular weight 800 or lower is used. Concrete examples of the compound are described in the section on the isocyanate terminated prepolymer.

The amount of chain extender is usually 1~50 weight % with respect to the polyol which contained polyoxyalkylene polyamine. Furthermore, the isocyanate index (NCO index), which is the ratio of the isocyanate group concentration with respect to the active hydrogen concentraion in the polyol which contained polyoxyalkylene polyamine and in the chain extender is 0.7~2.0.

Normally, polyurethane urea resin is manufactured by, first, preparing the solution in which the polyol which contained polyoxyalkylene polyamine is mixed with chain extender. Next, after rapidly mixing the resulting mixture solution with polyisocyanate compound, it is injected into a mold heated to 40~130° C. Catalyst for curing, filler, plasticizer, strengthening agent, flame retardant, stabilizer, internal mold lubricant, foaming agent, silicon surfactant or the like can be used according to the objective. The catalyst, filler, plasticizer, strengthening agent, flame retardant, and stabilizer which are described in the section on isocyanate terminated prepolymer are preferred.

The usage amount of catalyst is 0.001~5.0 weight parts for every 100 weight parts polyol which contained the polyoxyalkylene polyamine of the present invention, and preferably it is 0.01~1.0 weight parts. The amount of filler to be added is 0.01~40 weight parts, and preferably it is 5~15 weight parts. The amount of strengthening agent to be added is 1~50 weight parts, and preferably 2~30 weight parts. The usage amount of flame retardant is 0.1~30 weight parts, and preferably 0.2~20 weight parts.

Stabilizers include oxidation inhibitors, ultraviolet ray absorbers, heat stabilizers. The amount to be added is 200~5,000 ppm for each with respect to 100 weiight parts of polyol which contains polyoxyalkylene polyamine of the present invention.

For the internal mold lubricant, zinc stearate, polyolefin wax, or compounds which are listed in Japanese Publication No. 60-500418 are suitable. The usage amount of the internal mold lubricant is 0.1~10 weight parts for 100 weight parts of the polyol which contains the polyoxyalkylene polyamine of the present invention.

The foaming agent uses at least one type of compound selected from from the group consisting of water, low boiling point hydrocarbon compound, hydrochlorofluorocarbon (HCFC) and hydrofluorocarbon (HFC). Examples of hydrocarbons with low boiling point include the following: cyclopentane, n-pentane, isopentane, or the like. Examples of HCFC's include the following: HCFC-141b, and examples of HFC's include HFC-134a, HFC-356, or HFC 245fa, or the like. If only water is used as the foaming agent, 0.1~9 weight parts for every 100 weight parts of polyol which contained polyoxyalkylene polyamine of the present invention is used. If the foaming agent uses at least one selected from the group consisting of low boiling point hydrocarbon, HCFC, and HFC, 1~40 weight parts are used for every 100 weight parts of polyol which contained polyoxyalkylene polyamine of the present invention. These foaming agents can be used together with water.

Known organic silicon surface active agents of the prior art can be used for the silicon surfactant. Examples include the following: products from Japan Unicar Company with product names: L-520, L-532, L-540, L-544, L-550, L-3600, L-3601, L-5305, L-5307, L-5309, or the like; products from Toray Dow Corning, with product names: SRX-253, SRX-274C, SF-2961, SF-2962, or the like; products from Shinetsu Silicone, with product names: F-114, F-121, F-122, F-220, F-230, F-258, F-260B, F-317, F-341, F-601, F-606, or the like; products from Toshiba silicone with product names: TFA-420, TFA-4202, or the like. These silicon surfactants can be freely mixed and used. The usage amount is 0.05~10 weight parts for 100 weight parts of polyol which contained polyoxyalkylene polyamine of the present invention.

EXAMPLES

Examples of the present invention are described below and illustrate the mode of the present invention.

The polyoxyalkylene polyol's values for Examples 1~11 and Comparative Examples 1~10 of hydroxyl value, total degree of unsaturation, viscosity, H-T bond selectivity, and residual amount of phosphazenium compound catalyst in the polyoxyalkylene polyol (units: ppm) are measured by the method described below.

(1) The hydroxyl value (OHV, units: mgKOH/g), C=C, and viscosity (represented by η, units: mPa·s/25° C.) of the polyoxyalkylene polyol.

They are measured by the method described in JIS K 1557.

(2) H-T bond selectivity

Using a 400 MHz $^{13}$C nuclear magnetic resonance (NMR) device by Nihon Denshi, the $^{13}$C-NMR spectrum of polyoxyalkylene polyol is measured using chloroform deuteride as a solvent. The H-T bond selectivity is determined from the ratio of the signal (16.9~17.4 ppm) of the methyl group of the oxypropylene unit of the head-to-tail bond to the signal (17.7~18.5 ppm) from the methyl group of the oxypropylene unit of the head-to-head bond.

The assignment of each signal is based on the values described in the report by F.C. Schilling, A.E. Tonelli [Macromolecules, Vol. 19, pp. 1337~1343 (1986)].

(3) Indicator value $W_{20}/W_{80}$ for the molecular weight distribution of polyoxyalkylene polyol.

This is determined from the elution profile of the gel permeation chromatography (GPC) of the polyoxyalkylene polyol.

The conditions under which GPC is measured is as below.

Measurement and analysis device: LC-6A system from Shimazu Seisakujo

Detector: RID-6A differential refraction detector from Shimazu Seisakujo

Separation column: Showa Denko's Shodex GPC KF series: KF-801, 802, 802.5, 803, the four are connected in series.

eluent: tetrahydrofuran for liquid chromatography liquid flow rate: 0.8 ml/min

Column temperature: 40° C.

(4) Residual amount of phosphazenium compound catalyst in polyoxyalkylene polyol (unit: ppm)

The measurement was conducted by a capillary electrophoresis method using a fully automatic CIA system from Waters Co. Hydrochloric acid solution is added to the sample. Extraction of the phosphazenium compound into the hydrochloric acid solution is conducted with a shaker (Tokyo Rikakiki Corp. EYELA Shaker). Afterwards, stationary liquid separation was conducted, and the water phase is separated. Using a capillary electrophoresis analysis device, the phosphazenium cation was quantified.

Phosphazenium Compound Catalyst

For the synthesis of polyoxyalkylene polyol, the phosphazenium compounds described below were used as catalysts for alkylene oxide.

(1) Phosphazenium compound a (will be referred as P5NMe2Cl)

From Fluka Company, tetrakis [tris (dimethyl amino) phosphoranylidene amino] phosphonium chloride $\{[(Me_2N)_3P=N]_4\ P^{+Cl^-}\}$.

With regard to formula (1), this phosphazenium compound is a chlorine anion with a, b, c, d as (1,1,1,1) in that order, R as a methyl group, r as 1. (T$^-$=Cl$^-$).

(2) Phosphazenium compound b (will be referred as P5NMe2OH).

Fluka Co.'s tetrakis [tris (dimethylamino) phosphoranylidene amino] phosphonium chloride $\{[(Me_2N)_3P=N]_4P^+$ Cl$^-\}$ was prepared into a 2.5 weight % aqueous solution using ultrapure water. A polycarbonate cylindrical column was filled with an ion exchange resin (Bayer Co. product name Lewatit MP-500) in which the exchange group was made a hydroxyl group by a 1N sodium hydroxide aqueous solution. The 2.5 weight % aqueous solution of tetrakis [tris (dimethylamino) phosphoranylidene amino] phosphonium chloride was passed through the column by an upward flow from the bottom of the column at a space velocity (SV) of 0.5 (lhr) and temperature of 23° C. Ion exchange was conducted to form tetrakis [tris (dimethylamino) phosphoranylidene amino] phosphonium hydroxide.

Furthermore, ultra pure water was passed through this column filled with ion exchange resin. The phosphazenium compound which remains in the column was recovered. Afterwards, by conducting vacuum dehydration of the aqueous solution of tetrakis [tris (dimethylamino) phosphoranylidene amino] phosphonium hydroxide under condition of 80° C., 7,980 Pa (60 mmHgabs) for 2 hours, and then for 7 hours at 80° C., 133 Pa (1 mmHg abs), a tetrakis [tris (dimethylamino) phosphoranylidene amino] phosphonium hydroxide $\{[(Me_2N)_3P=N]_4P^+OH^-\}$ powder was obtained.

The yield determined from the weight measurement of this compound after drying was 98%. The chemical shift in the $^1$H-NMR (Nihon Denshi 400 MHzNMR) due to the dimethylformamide deuteride solution using tetramethyl silane as the internal standard was 2.6 ppm (d,J=9.9 Hz, 72H). The elemental analysis values were C: 38.28, H: 9.82, N:29.43, P: 19.94 (theoretical values C: 38.09, H: 9.72, N: 29.61, P: 20.46). With respect to chemical equation (2), this phosphazenium compound was, in the order of a,b,c,d, (1,1,1,1) and R was a methyl group, and Q was a hydroxy anion of OH.

Furthermore, in order to derive an alkali metal salt of an active hydrogen compound, potassium hydroxide (Wako Pure Chemical Industries, Ltd.) and 50 weight % aqueous solution of cesium hydroxide (CHEMETALL GMBH.) were used as the alkali metals. When potassium hydroxide was used, it was used in the form of a 50 weight % aqueous solution using ion exchange water as the diluent. Potassium hydroxide will be referred to as KOH, and cesium hydroxide will be referred as CsOH.

The synthesis results of the polyoxyalkylene polyol will be described in detail below. The synthesis device for the polyoxyalkylene polyol is a pressure autoclave (Nitto Koatsu Co.) with an inner capacity of 2.5L and is equipped with an agitator, thermometer, pressure meter, nitrogen inlet opening, and a monomeric alkylene oxide inlet opening. (This synthesis device will be referred to as the autoclave.)

Example 1
Polyoxyalkylene Polyol A

Into a 500 ml four port flasks which were equipped with an agitator, a nitrogen inlet pipe and a thermometer, 0.013 moles of KOH (50 weight % aqueous solution) for every 1 mole of glycerin were added. While nitrogen entered through a capillary tube, vacuum dehydration was conducted for 4 hours under the conditions of 110° C., 10 mmHgabs, (1330 Pa) or lower. Potassium salt of glycerin was produced. (will be referred to as Gly—K).

Next, for every 1 mole of glycerin which was added to produce Gly—K, 0.012 moles of P5NMe2Cl were added. After agitating for 2 hours at 105° C. under nitrogen. atmosphere, vacuum filtration was conducted using a 5C filter paper from Advantech Toyo Corp. After filtration, the compound was placed in the autoclave. After conducting nitrogen substitution, under condition of reaction temperature 70~85° C. and a pressure which was at a vacuum condition of 10 mmHgabs (1,330 Pa) and reaching a maximum pressure during the reaction of 4 kgf/cm² (392 kPa), addition polymerization of propylene oxide was conducted until OHV of 27.8 mgKOH/g was achieved.

Next, pressurization by nitrogen took place until a gauge pressure of 1.2 kgf/cm² (219 kPa) was reached. Under condition of reaction temperature 105° C., the maximum reaction pressure of 5 kgf/cm² (490 kPa), addition polymerization of ethylene oxide was conducted until OHV of 24.0 mg KOH/g was achieved. Once the internal pressure of the autoclave stabilized at a constant pressure, vacuum treatment was conducted for 40 minutes at 105° C., 5 mm Hgabs (665 Pa). A crude polyoxyalkylene polyol was obtained.

For every 100 weight parts of crude polyoxyalkylene polyol which contained the phosphazenium compound, 10 weight parts of ion exchange water, and for every 1 mole of phosphazenium compound in the crude polyoxyalkylene polyol, 4 moles of phosphoric acid in the form of 75.1 weight % aqueous solution were added in. Neutralization reaction was conducted at 90° C. for 2 hours. After completion of the neutralization reaction, 800 ppm of t-butylhydroxytoluene (BHT) was added for every 100 weight parts of crude polyoxyalkylene polyol. Dehydration was conducted under a vacuum. While the pressure inside the autoclave was 400 mmHg abs (53 kPa), 5,000 ppm of adsorbent (Kyowa Chemical Industry Co. trade name: KW-700) and 3,000 ppm of adsorbent (Tomita Pharmaceutical Co. trade name AD-600NS) were added. While further dehydrating under a vacuum, the same operations were conducted for 4 hours at final temperature at 105° C. and pressure of 10 mmHg abs. (1,330 Pa) or less.

Next, 2 weight parts of diatomaceous earth filtration assisting agent (Showa Kagaku Kogyo, product name R-#500) was added for every 100 weight parts of crude polyoxyalkylene polyol. After agitating for 20 minutes at 105° C. and pressured from vacuum to atmospheric with nitrogen, vacuum filtration was conducted with 5C filter paper from Advantech Toyo Corp. Recovery of polyoxyalkylene polyol was conducted (acid neutralization method).

After removing the phosphazenium compound, the OHV of the polyoxyalkylene polyol was 24.1 mg KOH/g, C=C 0.013 meq./g, viscosity ($\eta$) 1220 mPa·s/25° C., H-T bond selectivity 96.4 mol %, $W_{20}/W_{80}$ was 2.68. The residual amount of catalyst was 22 ppm.

Example 2
Polyoxyalkylene Polyol B

In a 500 ml four port flask which were equipped with a agitating device, nitrogen inlet pipe, and thermometer, 0.009 moles of KOH (50 weight % aqueous solution) for every 1 mole of dipropylene glycol were added. While nitrogen entered through a capillary tube, vacuum dehydration was conducted for 5 hours under conditions of 103° C., 11 mm Hgabs. (1,463 Pa), and a potassium salt of dipropylene glycol (referred to as DPG-K) was produced. Afterwards, for every 1 mole of propylene glycol which was stocked to prepare DPG-K, 0.008 moles of P5NMe2Cl was added. Under nitrogen atmosphere, after agitating for 2 hours at 100° C., vacuum filtration was conducted with 5C filter paper from Advantech Toyo Corp.

After filtration, the compound was placed in the autoclave. After conducting nitrogen substitution, under conditions of reaction temperature 75~78° C., a pressure which goes from vacuum conditions of 20 mmHgabs. (2,660 Pa) to a maximum reaction pressure of 4 kgf/cm² (392 kPa), addition polymerization of propylene oxide was conducted until OHV of 37.3 mg KOH/g was achieved. Once the internal pressure of the autoclave stabilized at a constant pressure, vacuum treatment was conducted for 40 minutes at 105° C., 5 mm Hgabs (665 Pa). Crude polyoxyalkylene polyol was obtained.

For every 100 weight parts of crude polyoxyalkylene polyol which contain phosphazenium compound, 10 weight parts of ion exchange water, and for every 1 mole of phosphazenium compound in the crude polyoxyalkylene polyol, 2.5 moles of phosphoric acid in the form of 75.1 weight % aqueous solution were added in. Neutralization reaction was conducted at 80° C. for 2 hours. After completion of the neutralization reaction, 600 ppm of t-butylhydroxytoluene (BHT) was added for every 100 weight parts of crude polyoxyalkylene polyol. Dehydration was conducted under a vacuum. While the pressure inside the autoclave was 400 mmHg abs (53 kPa), 15,000 ppm of adsorbent (Kyowa Chemical Industry Co. trade name: KW-700) and 7,000 ppm of adsorbent (Tomita Pharmaceutical Co. trade name AD-600NS) were added. While further dehydrating under a vacuum, the same operations were conducted for 3 hours at 105° C., pressure of 10 mmHgabs. (1,330 Pa) or less. After pressuring from a vacuum to atmospheric using nitrogen, vacuum filtration was conducted using 5C filter paper from Advantech Toyo Corp. The recovery of polyoxyalkylene polyol was conducted (acid neutralization removal method).

After removing the phosphazenium compound, the OHV of polyoxyalkylene polyol was 37.4 mg KOH/g, C=C 0.009 meq./g, viscosity ($\eta$) 510 mPa·s/25° C., H-T bond selectivity 96.6 mol %, $W_{20}/W_{80}$ was 2.65. The residual amount of catalyst was 30 ppm.

Example 3
Polyoxyalkylene Polyol C

In to a 500 ml four port flask which were equipped with an agitating device, nitrogen inlet pipe, and thermometer, 0.018 moles of KOH (50 weight % aqueous solution) for every 1 mole of glycerin were added. While nitrogen entered through a capillary tube, vacuum dehydration was conducted for 4 hours under condition of 110° C., 8 mm Hgabs. (1,064 Pa) or lower, and a potassium salt of glycerin (referred to as Gly—K) was produced. Afterwards, for every 1 mole of glycerin which was stocked to prepare Gly—K, 0.016 moles of P5NMe2Cl was added. Under nitrogen atmosphere, after agitating for 1 hour at 1 05° C., vacuum filtration was conducted with 5C filter paper from Advantech Toyo Corp.

After filtration, the compound was placed in the autoclave. After conducting nitrogen substitution, the reaction temperature was made to be at 28° C. from a vacuum condition of 10 mmHgabs. (1,330 Pa). 5 weight % of the amount of propylene oxide needed to produce a polyoxyalkylene polyol with OHV of 31.5 mgKOH/g was added in one batch. The reaction temperature was gradually raised so that the maximum pressure during the reaction does not exceed 8kgf/cm² (784kPa). When the reaction temperature reached 78° C. and the internal pressure inside the autoclave became stable, addition polymerization of propylene oxide was conducted under constant temperature until OHV of 31.5 mgKOH/g was reached. Right away, pressurization by nitrogen was conducted until a gage pressure of 1.2 kgf/cm² (219 kPa) was reached. Under condition of reaction temperature 115° C., the maximum reaction pressure of 5 kgf/cm² (490 kPa), addition polymerization of ethylene oxide was conducted until OHV of 27.6 mg KOH/g was achieved. Once the internal pressure of the autoclave stabilized at a constant pressure, vacuum treatment was conducted for 40 minutes at 105° C., 5 mm Hgabs (665 Pa). Crude polyoxyalkylene polyol was obtained.

For every 100 weight parts of crude polyoxyalkylene polyol which contained phosphazenium compound, 4 weight parts of ion exchange water, and for every 1 mole of phosphazenium compound in the crude polyoxyalkylene polyol, 2.02 moles of oxalic acid in the form of 8.5 weight % aqueous solution were added in. Neutralization reaction was conducted for 2 hours at 70° C. After completion of the neutralization reaction, 1500 ppm of t-butylhydroxytoluene (BHT) was added for every 100 weight parts of crude polyoxyalkylene polyol. Dehydration was conducted under a vacuum. While the pressure inside the autoclave was 400 mmHg abs (53kPa), 1,000 ppm of adsorbent (Kyowa Chemical Industry Co. trade name: KW-700) and 12,000 ppm of adsorbent (Tomita Pharmaceutical Co. trade name AD-600NS) were added. While further dehydrating under a vacuum, the same operations were conducted for 4 hours at a final temperature at 105° C. and pressure of, 10 mmHg abs. (1,330 Pa) or less. Next, after pressuring from vacuum to atmospheric with nitrogen, vacuum filtration was conducted with 5C filter paper from Advantech Toyo Corp. Recovery of polyoxyalkylene polyol was conducted (acid neutralization removal method). After removing the phosphazenium compound, the OHV of polyoxyalkylene polyol was 27.5 mg KOH/g, C=C 0.011 meq./g, viscosity ($\eta$) 1090 mPa·s/ 25° C., H-T bond selectivity 95.9 mol %, $W_{20}/W_{80}$ was 2.61. The residual amount of catalyst was 83 ppm.

Example 4
Polyoxyalkylene Polyol D

In a four port 500 ml flask which were equipped with a agitating device, nitrogen inlet pipe, and thermometer, 0.15 moles of CsOH (50 weight % aqueous solution) for every 1 mole of glycerin were added. While nitrogen entered through a capillary tube, vacuum dehydration was conducted for 5 hours under conditions of 105° C., 8 mm Hgabs. (1,064 Pa) or less, and a cesium salt of glycerin (referred to as Gly—Cs) was produced. Afterwards, for every 1 mole of glycerin which was stocked to prepare Gly—Cs, 0.12 moles of P5NMe2Cl was added. Under nitrogen atmosphere, after agitating for 1 hour at 25° C. , vacuum filtration was conducted with 5C filter paper from Advantech Toyo Corp.

After filtration, the compound was placed in the autoclave. After conducting nitrogen substitution, under conditions of reaction temperature of 88° C. from an atmospheric condition., and a maximum reaction pressure of 3.5 kgf/cm² (343 kPa), addition polymerization of propylene oxide was conducted until OHV of 38.5 mgKOH/g was reached. Right away, gauge pressure was adjusted to 1.2 kgf/cm² (219 kPa) using nitrogen. Under condition of reaction temperature 120° C., maximum reaction pressure of 5 kgf/cm² (490 kPa), addition polymerization of ethylene oxide was conducted until OHV of 33.2 mg KOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained phosphazenium compound, 10 weight parts of ion exchange water and 5 weight parts of n-hexane (Wako Pure Chemical Industries, guaranteed reagent; will be referred as hexane) were added. Next, for every 1 mole of phosphazenium compound in the crude polyoxyalkylene polyol, 4 moles of phosphoric acid in the form of 75.1 weight % aqueous solution was added in. Neutralization reaction was conducted for 2 hours at 65° C. After completion of the neutralization reaction, 1500 ppm of t-butylhydroxytoluene (BHT) was added for every 100 weight parts of crude polyoxyalkylene polyol. Dehydration, hexane removal were conducted under a vacuum. While the pressure inside the autoclave was 500 mmHg abs (67 kPa), 10,000 ppm of adsorbent (Tomita Pharmaceutial Co. trade name: AD-600NS) was added. While further dehydrating and removing hexane under a vacuum, the same operations were conducted for 4 hours at a final temperature at 105° C. and pressure of 10 mmHg abs. (1,330 Pa) or less. After pressuring from vacuum to atmospheric with nitrogen, vacuum filtration was conducted with 5C filter paper from Advantech Toyo Corp. Recovery of polyoxyalkylene polyol was conducted (acid neutralization removal method). After removing the phosphazenium compound, the OHV of polyoxyalkylene polyol was 33.1 mg KOH/g, C=C 0.018 meq./g, viscosity ( 77) 850 mPa·s/25° C., H-T bond selectivity 96.5 mol %, $W_{20}/W_{80}$ was 2.71. The residual amount of catalyst was 29 ppm.

Example 5
Polyoxyalkyene Polyol E

In a 500 ml four port flask which were equipped with a agitating device, nitrogen inlet pipe, and thermometer, 0.012 moles of P5NMe2OH and 0.03 moles of toluene (Wako Pure Chemical Industries, guaranteed reagent) for every 1 mole of glycerin were added. While nitrogen entered through a capillary tube, vacuum dehydration and toluene removal were conducted for 4 hours under condition of 105° C., 10 mm Hgabs. (1,330 Pa) or less. Afterwards, the flask content was placed in the autoclave. After conducting nitrogen substitution, the reaction temperature was made to be 80° C. from atmospheric conditions, with a maximum reaction pressure of 4.0 kgf/cm² (392 kPa), addition polymerization of propylene oxide was conducted until OHV of 28.0 mgKOH/g was reached.

Right away, gauge pressure was adjusted to 1.2 kgf/cm² (219 kPa) with nitrogen. Under condition of reaction temperature 100° C., the maximum reaction pressure of 4 kgf/cm² (392 kPa), addition polymerization of ethylene oxide was conducted until OHV of 24.1 mg KOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained phosphazenium compound, 10 weight parts of ion exchange water was added. Next, for every 1 mole of phosphazenium compound in the crude polyoxyalkylene polyol, 2.5 moles of phosphoric acid in the form of 75.1 weight % aqueous solution was added in. Neutralization reaction was conducted for 2 hours at 85° C. After completion of the neutralization reaction, 1000 ppm of t-butylhydroxytoluene (BHT) was added for every 100 weight parts of crude polyoxyalkylene polyol. Dehydration was conducted under a vacuum. While the pressure inside the autoclave was 500 mmHg abs (67 kPa), 15,000 ppm of adsorbent (Tomita Pharmaceutical Co. trade name: AD-600NS) was added. While further dehydrating under a vacuum, the same operations were conducted for 4 hours at a final temperature at 105° C. and pressure of, 10 mmHg abs. (1,330 Pa) or less. After pressuring from vacuum to atmospheric with nitrogen, vacuum filtration was conducted with 5C filter paper from Advantech Toyo Corp. Recovery of polyoxyalkylene polyol was conducted (acid neutralization removal method).

After removing the phosphazenium compound, the OHV of polyoxyalkylene polyol was 24.1 mg KOH/g, C=C 0.015 meq./g, viscosity (η) 1150 mPa·s/25° C., H-T bond selectivity 95.9 mol %, $W_{20}/W_{80}$ was 2.63. The residual amount of catalyst was 19 ppm.

Example 6
Polyoxyalkyene Polyol F

In a 500 ml four port flask which were equipped with an agitating device, nitrogen inlet pipe, and thermometer, 0.016 moles of P5NMe2OH and 0.02 moles of toluene for every 1 mole of dipropylene glycol were added. While nitrogen entered through a capillary tube, vacuum dehydration and toluene removal were conducted for 3 hours under condition of 103° C., 10 mm Hgabs. (1,330 Pa) or less. Afterwards, the flask content was placed in the autoclave. After conducting nitrogen substitution, the reaction temperature was made to be 75~78° C. from vacuum conditions of 10 mmHgabs. (1,330 Pa), and with a maximum reaction pressure of 4 kgf/cm² (392 kPa), addition polymerization of propylene oxide was conducted until OHV of 28.2 mgKOH/g was reached. Once the internal pressure of the autoclave stabilized at a constant pressure, vacuum treatment was conducted for 40 minutes at 105° C., 5 mm Hgabs (665 Pa). Crude polyoxyalkylene polyol was obtained.

For every 100 weight parts of crude polyoxyalkylene polyol which contained phosphazenium compound, 150 weight parts of ion exchange water and 30 weight parts of ion exchange resin (Bayer Co. Product name: Lewatit S-100BG) which was exchanged to a hydrogen ion type by a dilute hydrochloric acid solution were added. Under nitrogen atmosphere, it was agitated for 4 hours at 60° C. Next, vacuum filtration with 5B filter paper from Advantech Toyo Corp. was conducted. After removing the ion exchange resin, for every 100 weight parts of polyoxyalkylene polyol which contained water, 90 weight parts of ion exchange water and 20 weight parts of Bayer Co. Lewatit S-100BG which was exchanged to hydrogen ion type were added again. The same operation was conducted. Ion exchange resin was removed by filtration. 700 ppm of BHT was added for every 100 weight parts of polyoxyalkylene polyol which contained water. Vacuum dehydration was conducted for 3 hours under condition of 105° C., 10 mmHgabs. (1,330 Pa) or less. The water in the polyoxyalkylene polyol was removed. Furthermore, vacuum filtration was conducted with 5C filter paper from Advantech Toyo Corp. (ion exchange processing method). After removing the phosphazenium compound, the OHV of polyoxyalkylene polyol was 28.3 mg KOH/g, C=C 0.010 meq./g, viscosity (η) 710 mPa·s/25° C., H-T bond selectivity 96.0 mol %, $W_{20}/W_{80}$ was 2.62. The residual amount of catalyst was 12 ppm.

Example 7
Polyoxyalkyene Polyol G

In a 500 ml four port flask which were equipped with an agitating device, nitrogen inlet pipe, and thermometer, 0.020 moles of P5NMe2OH and 0.04 moles of toluene for every 1 mole of dipropylene glycol were added. While nitrogen entered through a capillary tube, vacuum dehydration and toluene removal were conducted for 3 hours under condition of 105° C., 10 mm Hgabs. (1,330 Pa) or less. Afterwards, the flask content was placed in the autoclave. After conducting nitrogen substitution, the reaction temperature was made to be 70° C. from vacuum conditions of 10 mmHgabs. (1,330 Pa), and with a maximum reaction pressure of 4 kgf/cm² (392 kPa), addition polymerization of propylene oxide was conducted until OHV of 32 mgKOH/g was reached. Next, pressurization by nitrogen was conducted until a gauge pressure of 1.2 kgf/cm² (219 kPa) was reached. Under condition of reaction temperature 70° C., the maximum reaction pressure of 4 kgf/cm² (392 kPa), addition polymerization of ethylene oxide was conducted until OHV of 28 mg KOH/g was achieved. Once the internal pressure of the autoclave stabilized at a constant pressure, vacuum treatment was conducted for 20 minutes at 105° C., 5 mm Hgabs (665 Pa). Next, the reaction temperature was made to be 70° C. from atmospheric conditions, and with a maximum reaction pressure of 4 kgf/cm² (392 kPa), addition polymerization of propylene oxide was conducted until OHV of 18.4 mgKOH/g was reached. Crude polyoxyalkylene polyol was obtained.

For every 100 weight parts of crude polyoxyalkylene polyol which contained phosphazenium compound, 12 weight parts of ion exchange water was added. Next, for every 1 mol of phosphazenium compound in the crude polyoxyalkylene polyol, 2.3 moles of oxalic acid in the form of 8.5 weight % aqueous solution was added in. Neutralization reaction was conducted for 2 hours at 80° C. After completion of the neutralization reaction, 1500 ppm of t-butyl-hydroxytoluene (BHT) was added for every 100 weight parts of crude polyoxyalkylene polyol. Vacuum dehydration was conducted, and while the pressure inside the autoclave was 100 mm Hgabs (13kPa), 5,000 ppm of adsorbent AD-600NS (Tomita Seiyaku) was added. While further dehydrating under a vacuum, the same operations were conducted for 4 hours at a final temperature at 105° C. and pressure of, 10 mmHg abs. (1,330 Pa) or less. After pressuring from vacuum to atmospheric with nitrogen, vacuum filtration was conducted with 5C filter paper (pore size 1 μm) from Advantech Toyo Corp. Recovery of polyoxyalkylene polyol was conducted (acid neutralization removal method). After removing the phosphazenium compound, the OHV of polyoxyalkylene polyol was 18.5 mg KOH/g, C=C 0.022 meq./g, viscosity (η) 1100 mPa·s/ 25° C., H-T bond selectivity 97.0 mol %, $W_{20}/W_{80}$ was 2.52. The residual amount of catalyst was 82 ppm.

Example 8
Polyoxyalkyene Polyol H

In a 500 ml four port flask which were equipped with an agitating device, nitrogen inlet pipe, and thermometer, 0.08 moles of P5NMe2OH and 0.09 moles of toluene for every 1 mole of ethylene glycol were added. While nitrogen entered through a capillary tube, vacuum dehydration and toluene removal were conducted for 3 hours under condition of 95° C., 10 mm Hgabs. (1,330 Pa). Afterwards, the flask content was placed in the autoclave. After conducting nitrogen substitution, the reaction temperature was made to be 60~78° C. from vacuum conditions of 10 mmHgabs. (1,330 Pa), and with a maximum reaction pressure of 5.5 kgf/cm² (593 kPa), addition polymerization of propylene oxide was conducted until OHV of 98 mgKOH/g was reached. Once the internal pressure of the autoclave stabilized at a constant pressure, vacuum treatment was conducted for 50 minutes at 105° C., 5 mm Hgabs (665 Pa). Crude polyoxyalkylene polyol was obtained.

For every 100 weight parts of crude polyoxyalkylene polyol which contained phosphazenium compound, 150 weight parts of ion exchange water and 30 weight parts of n-hexane (Wako Pure Chemical Industries, Ltd.rp. guaranteed reagent, referred to as hexane) were added. Using a T.K. homomixer (made by Tokushu kikakogyo, Model: HV-M type), it was agitated for 1 hour at 70° C. Afterwards, it was left standing for 10 hours at 70 degrees, and liquid separation was conducted. Next, the water phase was removed. Next, for every 100 weight parts of crude polyoxyalkylene polyol, 100 weight parts of ion exchange water was added. The operation described above was repeated twice. Vacuum processing of polyoxyalkylene polyol, which contained water and hexane, was conducted for 2 hours under conditions of 105° C., 40 mmHgabs. (5300 Pa). Afterwards, for every 100 weight parts of crude polyoxyalkylene polyol, 700 ppm of BHT, which is an oxidation inhibitor, was added. Vacuum processing was conducted for 3 hours at 105° C., 5 mm Hgabs. (665 Pa). After pressuring from vacuum to atmospheric with nitrogen, vacuum filtration was conducted with SC filter paper from Advantech Toyo Corp. (rinsing processing method). After removing the phosphazenium compound, the OHV of polyoxyalkylene polyol was 9.8 mg KOH/g, C=C 0.058 meq./g, viscosity (η) 4150 mPa·s/25° C., H-T T bond selectivity 96.1 mol %, $W_{20}/W_{80}$ was 2.78. The residual amount of catalyst was 8 ppm.

Example 9
Polyoxyalkyene Polyol I

In a 500 ml four port flask which were equipped with an agitating device, nitrogen inlet pipe, and thermometer, 0.012 moles of P5NMe2OH and 0.5 moles of toluene for every 1 mole of glycerin were added. While nitrogen entered through a capillary tube, vacuum dehydration and toluene removal were conducted for 3 hours under condition of 105° C., 10 mm Hgabs. (1,330 Pa) or less. Afterwards, the flask content was placed in the autoclave. After conducting nitrogen substitution, the reaction temperature was made to be 80° C. from atmospheric conditions, and with a maximum reaction pressure of 4 kgf/cm² (392 kPa), addition polymerization of propylene oxide was conducted until OHV of 168.3 mgKOH/g was reached. Next, in order to find out the polymerization activity of propylene oxide by P5NMe2OH catalyst, crude polyoxyalkylene polyol with OHV of 168.3 mg KOH/g and which contained P5NMe2OH was used as a polymerization initiator, and under condition of reaction temperature 80° C., maximum pressure during reaction of 4 kgf/cm² (392 kPa), addition polymerization of propylene oxide was conducted until OHV of 28.0 mgKOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

The polymerization activity of propylene oxide by P5NMe2OH was determined by the following steps. The mole number of P5NMe2OH which was present in the polymerization initiator prior to propylene oxide polymerization was obtained (this value will be called a moles). Next, the amount of propylene oxide (this value will be called b g) and the reaction time (this value will be called c min.) used to reach the target OHV was determined. The propylene oxide polymerization activity (unit: g/mol·min) was obtained by dividing b g by a moles and c minutes. The propylene oxide polymerization activity by P5NMe2OH obtained in this way was 490 g/mol·min. The reaction condition of propylene oxide was the described above {reaction temperature 80° C., maximum reaction pressure of 4 kgf/cm² (392 kPa)}. After obtaining the polymerization activity of propylene oxide, the process of removing phosphazenium compound from the polyoxyalkylene polyol was conducted.

For every 100 weight parts of crude polyoxyalkylene polyol which contained phosphazenium compound, 100 weight parts of ion exchange water and 30 weight parts of ion exchange resin (Bayer Co. Product name: Lewatit S-100BG), in which it was exchanged to a hydrogen ion type by a dilute hydrochloric acid solution, were added. Under nitrogen atmosphere, it was agitated for 4 hours at 60° C. Next, vacuum filtration with 5B filter paper from Advantech Toyo Corp. was conducted. After removing the ion exchange resin, for every 100 weight parts of polyoxyalkylene polyol which contained water, 90 weight parts of ion exchange water and 20 weight parts of Bayer Co. Lewatit S-100BG, which was exchanged to hydrogen ion type, were added again. Same operation was conducted. Ion exchange resin were removed by filtration. 700 ppm of BHT was added for every 100 weight parts of polyoxyalkylene polyol which contained water. Vacuum dehydration was conducted for 3 hours under condition of 105° C., 10 mmHgabs. (1,330 Pa) or less. The water in the polyoxyalkylene polyol was removed. Furthermore, vacuum filtration was conducted with 5C filter paper from Advantech Toyo Corp. (ion exchange processing method). After removing the phosphazenium compound, the OHV of polyoxyalkylene polyol was 28.0 mg KOH/g, C=C 0.020 meq./g, viscosity ($\eta$) 1,000 mPa·s/25° C., H-T bond selectivity 96.4 mol %, $W_{20}/W_{80}$ was 2.58. The residual amount of catalyst was 12 ppm.

Example 10
Polyoxyalkylene Polyol J

In a 500 ml four port flask which were equipped with an agitating device, nitrogen inlet pipe, and thermometer, 0.08 moles of P5NMe2OH and 0.12 moles of toluene for every 1 mole of dipropylene glycol were added. While nitrogen entered through a capillary tube, vacuum dehydration and toluene removal were conducted for 3 hours under condition of 100° C., 10 mm Hgabs. (1,330 Pa). Afterwards, the flask content was placed in the autoclave. After conducting nitrogen substitution, the reaction temperature was made to be 75~82° C. from vacuum condition of 10 mmHgabs. (1,330 Pa), and with a maximum reaction pressure of 4.8 kgf/cm² (470 kPa), multi-step addition polymerization of propylene oxide was conducted until OHV of 14.2 mgKOH/g was reached. Once the internal pressure of the autoclave stabilized at a constant pressure, vacuum treatment was conducted for 50 minutes at 105° C., 5 mm Hgabs (665 Pa). Crude polyoxyalkylene polyol was obtained.

For every 100 weight parts of crude polyoxyalkylene polyol which contained phosphazenium compound, 100 weight parts of ion exchange water was added. Using a T.K. homomixer (made by Tokushukika-kogyo, Model: HV-M type), it was agitated for 1 hour at 80° C. Afterwards, it was left standing for 10 hours at 80 degrees, and liquid separation was conducted. Next, the water phase was removed. Next, for every 100 weight parts of crude polyoxyalkylene polyol, 100 weight parts of ion exchange water was added. The operation described above was repeated twice. After conducting vacuum dehydration of polyoxyalkylene polyol which contained water for 2 hours under condition of 105° C., 40 mmHgabs. (5300 Pa), for every 100 weight parts of crude polyoxyalkylene polyol, 700 ppm of BHT, which is an oxidation inhibitor, was added. Vacuum dehydration was further conducted for 3 hours at 105° C., 5 mm Hgabs. (665 Pa). After pressuring from vacuum to atmospheric with nitrogen, vacuum filtration was conducted with 5C filter paper from Advantech Toyo Corp. (rinsing processing method). After removing the phosphazenium compound, the OHV of polyoxyalkylene polyol was 14.2 mg KOH/g, C=C 0.043 meq./g, viscosity ($\eta$) 2180 mPa·s/25° C., H-T bond selectivity 96.8 mol %, $W_{20}/W_{80}$ was 2.72. The residual amount of catalyst was 13 ppm.

Example 11
Polyoxyalkylene Polyol K

In a 500 ml four port flask which were equipped with an agitating device, nitrogen inlet pipe, and thermometer, 0.012 moles of P5NMe2OH and 0.4 moles of toluene for every 1 mole of glycerin were added. While nitrogen entered through a capillary tube, vacuum dehydration and toluene removal were conducted for 4 hours under condition of 105° C., 10 mm Hgabs. (1,330 Pa) or less. Afterwards, the flask content was placed in the autoclave. After conducting nitrogen substitution, the reaction temperature was made to be 80° C. from vacuum conditions of 10 mmHgabs. (1,330 Pa), and with maximum reaction pressure of 4.0 kgf/cm² (392 kPa), multi-step addition polymerization of propylene oxide was conducted until OHV of 18.5 mgKOH/g was reached. Once the internal pressure of the autoclave stabilized at a constant pressure, vacuum treatment was conducted for 50 minutes at 105° C., 5 mm Hgabs (665 Pa). Crude polyoxyalkylene polyol was obtained.

For every 100 weight parts of crude polyoxyalkylene polyol which contained phosphazenium compound, 150 weight parts of ion exchange water was added. Using a T.K. homomixer (made by Tokushu kika-kogyo, Model: HV-M type), it was agitated for 1 hour at room temperature. Afterwards, it was left standing for 10 hours at 60° C., and liquid separation was conducted. Next, the water phase was removed. Next, for every 100 weight parts of crude polyoxyalkylene polyol, 100 weight parts of ion exchange water was added. The operation described above was repeated twice. After conducting vacuum processing of polyoxyalkylene polyol which contained water for 2 hours under conditions of 105° C., 40 mmHgabs. (5300 Pa), for every 100 weight parts of crude polyoxyalkylene polyol, 700 ppm of BHT, which is an oxidation inhibitor, was added. Vacuum processing was conducted for 3 hours at 105° C., 5 mm Hgabs. (665 Pa). After pressuring from vacuum to atmospheric with nitrogen, vacuum filtration was conducted with 5C filter paper from Advantech Toyo Corp. (water rinsing processing method). After removing the phosphazenium compound, the OHV of polyoxyalkylene polyol was 18.7 mg KOH/g, C=C 0.027 meq./g, viscosity ($\eta$) 2450 mPa·s/25° C., H-T bond selectivity 95.9 mol %, $W_{20}/W_{80}$ was 2.62. The residual amount of catalyst was 16 ppm.

The comparative examples will be described in detail below. The catalysts for synthesizing polyoxyalkylene polyol used in the comparative examples were 50 weight % cesium hydroxide aqueous solution from CHEMETALL GMBH described above, and DMC ($Zn_3[Co(CN)_6]_2$. 2.48 DME.4.65 $H_2O$. 0.94 $ZnCl_2$ (DME is an abbreviation for dimethoxy ethane) described in U.S. Pat. No. 5,144,093 (column 4, line 52-Column 5, line 4). When we conducted addition polymerization of ethylene oxide to the polyoxyalkylene polyol obtained by using DMC as a catalyst, we use the alkali metal catalyst which was a 30 weight % potassium methylate (KOMe) methanol solution from Wako Pure Chemical Industries, Ltd.

Comparative Example 1
Polyoxyalkyene Polyol AA

In a 500 ml four port flask which were equipped with an agitating device, nitrogen inlet pipe, and thermometer, 0.48 moles of 50 weight % CsOH aqueous solution for every 1 mole of glycerin were added. After conducting vacuum dehydration for 4 hours under conditions of 105° C., 10 mm Hgabs. (1,330 Pa) or less, the flask content was placed in the autoclave, and nitrogen substitution was conducted. The reaction temperature was made to be 80° C. from atmospheric conditions, and with maximum reaction pressure of 4.0 kgf/cm² (392 kPa), addition polymerization of propylene oxide was conducted until OHV of 168.3 mgKOH/g was reached. Next, in order to find out the polymerization activity of propylene oxide by CsOH, crude polyoxyalkylene polyol with OHV of 168.3 mg KOH/g and which contained CsOH was used as a polymerization initiator, and under conditions of reaction temperature 80° C., maximum pressure during reaction of 4 kgf/cm² (392 kPa), addition polymerization of propylene oxide was conducted until OHV of 28.0 mgKOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

The polymerization activity of propylene oxide by CsOH was determined by the following steps. The mole numbers of CsOH which was present in the polymerization initiator prior to propylene oxide polymerization was obtained (this value will be called a moles). Next, the amount of propylene oxide (this value will be called b g) and the reaction time (this value will be called c min.) needed to reach the target OHV was determined. The propylene oxide polymerization activity (unit: g/mol·min) was obtained by dividing b g by a moles and c minutes. The polymerization activity of propylene oxide by CsOH obtained in this way was 8.7 g/mol·min. The reaction condition of propylene oxide was the reaction condition described above, and was the same reaction conditions as when P5NMe2OH was used, as described previously [reaction temperature 80° C., maximum reaction pressure of 4 kgf/cm$^2$ (392 kPa)]. After obtaining the polymerization activity of propylene oxide, the process of removing cesium from the polyoxyalkylene polyol was conducted.

For every 100 weight parts of crude polyoxyalkylene polyol which contained cesium compound, 80 weight parts of ion exchange water and 30 weight parts of ion exchange resin (Bayer Co. Product name: Lewatit S-100BG), which was exchanged to a hydrogen ion type by a dilute hydrochloric acid solution, were added. Under nitrogen atmosphere, it was agitated for 6 hours at 60° C. Next, vacuum filtration with 5B filter paper from Advantech Toyo Corp. was conducted. After removing the ion exchange resin, for every 100 weight parts of polyoxyalkylene polyol which contained water, 50 weight parts of ion exchange water and 20 weight parts of Bayer Co. Lewatit S-100BG, which was exchanged to hydrogen ion type, were added again. Same operation was conducted. Ion exchange resin was removed by filtration. 500 ppm of BHT was added for every 100 weight parts of polyoxyalkylene polyol which contained water. Vacuum dehydration was conducted for 3 hours under condition of 105° C., 10 mmHgabs. (1,330 Pa) or less. The water in the polyoxyalkylene polyol was removed. Furthermore, vacuum filtration was conducted with 5C filter paper from Advantech Toyo Corp. (ion exchange processing method). After removing the cesium compound, the OHV of polyoxyalkylene polyol was 28.0 mg KOH/g, C=C 0.057 meq./g, viscosity (η) 1150 mPa·s/25° C., H-T bond selectivity 96.5 mol %, $W_{20}/W_{80}$ was 2.87.

Comparative Example 2
Polyoxyalkyene Polyol BB

In a 500 ml four port flask which were equipped with an agitating device, nitrogen inlet pipe, and thermometer, 0.38 moles of 50 weight % CsOH aqueous solution for every 1 mole of glycerin were added. While nitrogen entered through a capillary tube, vacuum dehydration was conducted for 4 hours under condition of 105° C., 10 mm Hgabs. (1,330 Pa) or less. Afterwards, the flask content was placed in the autoclave. After conducting nitrogen substitution, the reaction temperature was made to be 80° C. from atmospheric conditions, and with a maximum reaction pressure of 4.0 kgf/cm$^2$ (392 kPa), addition polymerization of propylene oxide was conducted until OHV of 28.0 mgKOH/g was reached. Right away, pressurization by nitrogen was conducted until a gauge pressure of 1.2 kgf/cm$^2$ (219 kPa) was reached. Under conditions of reaction temperature 100° C., the maximum reaction pressure of 4 kgf/cm$^2$ (392 kPa), addition polymerization of ethylene oxide was conducted until OHV of 24.1 mg KOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained cesium, 4 weight parts of ion exchange water was added. Next, for every 1 mole of cesium in the crude polyoxyalkylene polyol, 1.1 moles of phosphoric acid in the form of 75.1 weight % aqueous solution was added in. Neutralization reaction was conducted for 2 hours at 85° C. After completion of the neutralization reaction, 1000 ppm of t-butylhydroxytoluene (BHT) was added for every 100 weight parts of crude polyoxyalkylene polyol. Vacuum dehydration was conducted. 2,000 ppm of adsorbent (Tomita Pharmaceutical Co. trade name: AD-600NS) was added while the pressure inside the autoclave was 500 mmHg abs (67 kPa). While further dehydrating under a vacuum, the same operations were conducted for 4 hours at a final temperature at 105° C. and pressure of, 10 mmHg abs. (1,330 Pa) or less. Next, after pressuring from vacuum to atmospheric with nitrogen, vacuum filtration was conducted with 5C filter paper from Advantech Toyo Corp. Recovery of polyoxyalkylene polyol was conducted (acid neutralization removal method). After removing the cesium, the OHV of polyoxyalkylene polyol was 24.1 mg KOH/g, C=C 0.023 meq./g, viscosity (η) 1560 mPa·s/25° C., H-T bond selectivity 96.6 mol %, $W_{20}/W_{80}$ was 2.95.

Comparative Example 3
Polyoxyalkyene Polyol CC

In a 500 ml four port flask which were equipped with an agitating device, nitrogen inlet pipe, and thermometer, 0.28 moles of CsOH (50 weight % aqueous solution) for every 1 mole of glycerin were added. While nitrogen entered through a capillary tube, vacuum dehydration was conducted for 4 hours under condition of 105° C., 10 mm Hgabs. (1,330 Pa) or less. The flask content was placed in the autoclave. After conducting nitrogen substitution, from an atmospheric condition the temperature was made to be 88° C., and with the maximum reaction pressure was 3.5 kgf/cm$^2$ (343 kPa), addition polymerization of propylene oxide was conducted until OHV of 38.4 mgKOH/g was reached. Right away, pressurization by nitrogen was conducted until a gauge pressure of 1.2 kgf/cm$^2$ (219 kPa) was reached. Under condition of reaction temperature 120° C., the maximum reaction pressure of 5 kgf/cm$^2$ (490 kPa), addition polymerization of ethylene oxide was conducted until OHV of 33.2 mg KOH/g was achieved. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained cesium, 4 weight parts of ion exchange water and 5 weight parts of n-hexane (Wako Pure Chemical Industries, guaranteed reagent; will be referred as hexane) were added. Next, for every 1 mole of cesium in the crude polyoxyalkylene polyol, 1.02 moles of phosphoric acid in the form of 75.1 weight % aqueous solution was added in. Neutralization reaction was conducted for 2 hours at 65° C. After completion of the neutralization reaction, 1500 ppm of t-butylhydroxytoluene (BHT) was added for every 100 weight parts of crude polyoxyalkylene polyol. Dehydration, hexane removal were conducted under a vacuum. 1,000 ppm of adsorbent (Tomita Pharmaceutical Co. trade name: AD-600NS) was added while the pressure inside the autoclave was 500 mmHg abs (67 kPa). While further dehydrating and removing hexane under a vacuum, the same operations were conducted for 4 hours at a final temperature at 105° C. and pressure of, 10 mmHg abs. (1,330 Pa) or less. Next, after pressuring from vacuum to atmospheric with nitrogen, vacuum filtration was conducted with 5C filter paper from Advantech Toyo Corp. Recovery of polyoxyalkylene polyol was conducted (acid neutralization removal method). After removing the cesium, the OHV of polyoxyalkylene polyol was 33.2 mg KOH/g, C=C 0.039 meq./g, viscosity (η) 1,000 mPa·s/25° C., H-T bond selectivity 96.3 mol %, $W_{20}/W_{80}$ was 2.84.

Comparative Example 4
Polyoxyalkyene Polyol DD

In a 500 ml four port flask which were equipped with an agitating device, nitrogen inlet pipe, and thermometer, 0.28 moles of 50 weight % CsOH aqueous solution for every 1 mole of dipropylene glycol were added. While nitrogen entered through a capillary tube, vacuum dehydration was conducted for 3 hours under condition of 103° C., 10 mm Hgabs. (1,330 Pa) or less. Afterwards, the flask content was placed in the autoclave. After conducting nitrogen substitution, the reaction temperature was made to be 78~81° C. from vacuum conditions of 10 mmHgabs. (1,330 Pa), and with a maximum reaction pressure of 4 kgf/cm² (392 kPa), addition polymerization of propylene oxide was conducted until OHV of 28.2 mgKOH/g was reached. Once the internal pressure of the autoclave stabilized at a constant pressure, vacuum treatment was conducted for 40 minutes at 105° C., 5 mm Hgabs (665 Pa). Crude polyoxyalkylene polyol was obtained.

For every 100 weight parts of crude polyoxyalkylene polyol which contained cesium, 100 weight parts of ion exchange water and 30 weight parts of ion exchange resin (Bayer Co. Product name: Lewatit S-100BG), which was exchanged to a hydrogen ion type by a dilute hydrochloric acid solution, were added. Under nitrogen atmosphere, it was agitated for 4 hours at 60° C. Next, vacuum filtration with 5B filter paper from Advantech Toyo Corp. was conducted. After removing the ion exchange resin, for every 100 weight parts of polyoxyalkylene polyol which contained water, 90 weight parts of ion exchange water and 20 weight parts of Bayer Co. Lewatit S-100BG, which was exchanged to hydrogen ion type, were added again. Same operation was conducted. Ion exchange resins were removed by filtration. 700 ppm of BHT was added for every 100 weight parts of polyoxyalkylene polyol which contained water. Vacuum dehydration was conducted for 3 hours under condition of 105° C., 10 mmHgabs. (1,330 Pa) or less. The water in the polyoxyalkylene polyol was removed. Furthermore, vacuum filtration was conducted with 5C filter paper from Advantech Toyo Corp. (ion exchange processing method). After removing cesium, the OHV of polyoxyalkylene polyol was 28.2 mg KOH/g, C═C 0.038 meq./g, viscosity (η) 790 mPa·s/25° C., H-T bond selectivity 96.4 mol %, $W_{20}/W_{80}$ was 2.85.

Comparative Example 5
Polyoxyalkyene Polyol EE

In a 500 ml four port flask which were equipped with an agitating device, nitrogen inlet pipe, and thermometer, 0.38 moles of CsOH (50 weight % aqueous solution) for every 1 mole of dipropylene glycol were added. While nitrogen entered through a capillary tube, vacuum dehydration was conducted for 3 hours under condition of 105° C., 10 mm Hgabs. (1,330 Pa) or less. Afterwards, the flask content was placed in the autoclave. After conducting nitrogen substitution, the reaction temperature was made to be 80° C. from vacuum conditions of 10 mmHgabs. (1,330 Pa), and with a maximum reaction pressure of 4 kgf/cm² (392 kPa), addition polymerization of propylene oxide was conducted until OHV of 32 mgKOH/g was reached. Next, pressurization by nitrogen was conducted until a gauge pressure of 1.2 kgf/cm² (219 kPa) was reached. Under condition of reaction temperature 80° C., maximum reaction pressure of 4 kgf/cm² (392 kPa), addition polymerization of ethylene oxide was conducted until OHV of 28 mg KOH/g was achieved. Once the internal pressure of the autoclave stabilized at a constant pressure, vacuum treatment was conducted for 20 minutes at 105° C., 5 mm Hgabs (665 Pa). Next, the reaction temperature was made to be 90° C. from atmospheric conditions, and with a maximum reaction pressure of 4 kgf/cm² (392 kPa), addition polymerization of propylene oxide was conducted until OHV of 18.6 mgKOH/g was reached. Crude polyoxyalkylene polyol was obtained.

For every 100 weight parts of crude polyoxyalkylene polyol which contained cesium, 12 weight parts of ion exchange water was added. Next, for every 1 mol of cesium in the crude polyoxyalkylene polyol, 1.1 moles of oxalic acid in the form of 8.5 weight % aqueous solution was added in. Neutralization reaction was conducted for 2 hours at 80° C. After completion of the neutralization reaction, 1500 ppm of t-butylhydroxytoluene (BHT) was added for every 100 weight parts of polyoxyalkylene polyol. Vacuum dehydration was conducted, and while the pressure inside the autoclave was 100 mmHgabs (13 kPa), 5,000 ppm of adsorbent (Tomita Pharmaceutical Co. trade name AD-600NS) was added. While further dehydrating under a vacuum, the same operation were conducted for 4 hours at a final temperature at 105° C. and pressure of, 10 mmHg abs. (1,330 Pa) or less. After pressuring from vacuum to atmospheric with nitrogen, vacuum filtration was conducted with 5C filter paper from Advantech Toyo Corp. Recovery of polyoxyalkylene polyol was conducted (acid neutralization removal method). After removing cesium, the OHV of polyoxyalkylene polyol was 18.6 mg KOH/g, C═C 0.059 meq./g, viscosity (η) 1580 mPa·s/25° C., H-T bond selectivity 96.8 mol %, $W_{20}/W_{80}$ was 2.98.

Comparative Example 6
Polyoxyalkyene Polyol FF

For every 100 weight parts of polyoxyalkylene polyol MN 1000 (Mitsui Chemicals Inc.; OHV 168 mgKOH/g) in which propylene oxide is added to glycerin, 0.05 weight parts of DMC, $(Zn_3[Co(Cn)_6]_2$. 2.48 DME. 4.65 $H_2O$. 0.94 $ZnCl_2$) was added. Vacuum dehydration was conducted for 3 hours at temperature of 105° C. and pressure of 10 mmHgabs. (1,330 Pa) or less. Next, this compound was placed in the autoclave. Under condition of reaction temperature 80° C., maximum reaction pressure of 4 kgf/cm² (392 kPa), propylene oxide was added until OHV of 28.1 mgKOH/g was reached. A crude polyoxyalkylene polyol which contained DMC was obtained. The polymerization activity of propylene oxide by DMC was determined by the following steps. Because DMC forms a complex, the detailed polymerization active site for alkylene oxide is not known. Making the assumption that the zinc atom in the DMC is the active site, the propylene oxide polymerization activity was calculated using the method which was described previously. This resulted in an activity of 2100 g/mol·min. The reaction condition of propylene oxide was the exact same conditions as when P5NMe2OH, CsOH were used as catalysts.

Next, the removal process of DMC from crude polyoxyalkylene polyol was conducted. For every 100 weight parts of polyoxyalkylene polyol which contained DMC, 3.9 weight parts of 30 weight percent potassium methylate (KOMe) methanol solution were added. Methanol removal reaction was conducted for 2 hours at 90° C., 20mmHgabs. (2,660 Pa). Next, 5 weight parts of water and 5 weight parts of AD-600NS (Tomita Pharmaceutical Co.) were added. This was stirred for 2 hours at 90° C., under nitrogen. atmosphere. Using 5C filter paper from Advantech Toyo Corp., vacuum filtration was conducted. After filtration, 500 ppm of BHT, which is a oxidation inihibitor, was added. Vacuum dehydration was conducted for 2 hours under conditions of 120° C., 10 mmHgabs. (1,330 Pa) or less. Recovery of polyoxyalkylene polyol was conducted. After the DMC removal operation, the OHV of polyoxy-alkylene polyol was 28.1 mg KOH/g, C=C 0.010 meq./g, viscosity (η) 2050 mPa·s/25° C., H-T bond selectivity 89.3 mol %, $W_{20}/W_{80}$ was 4.56.

Comparative Example 7
Polyoxyalkyene Polyol GG

For every 100 weight parts of polyoxyalkylene polyol MN 1000 (Mitsui Chemicals Inc. OHV 168 mgKOH/g) in which propylene oxide is added to glycerin, 0.05 weight parts of DMC was added. Vacuum dehydration was conducted for 3 hours at temperature of 105° C. and pressure of 10 mmHgabs. (1,330 Pa) or less. Next, this compound was placed in the autoclave. Under conditions of reaction temperature 80° C., maximum reaction pressure of 4 kgf/cm² (392 kPa), propylene oxide was added until OHV of 28.0 mgKOH/g was reached. A crude polyoxyalkylene polyol which contained DMC was obtained.

For every 100 weight parts of polyoxyalkylene polyol which contained DMC, 2.2 weight parts of 30 weight percent potassium methylate (KOMe) methanol solution was added. Methanol removal reaction was conducted for 2 hours at 90° C., 20mmHgabs. (2,660 Pa). Next, 3 weight parts of water and 5 weight parts of AD-600NS (Tomita Pharmaceutical Co.) were added. This was agitated for 2 hours at 90° C., under nitrogen. atmosphere. Using 5C filter paper from Advantech Toyo Corp., vacuum filtration was conducted. After filtration, vacuum dehydration was conducted for 2 hours under conditions of 120° C., 10 mmHgabs. (1,330 Pa) or less. DMC removal process was conducted. In order to addition polymerize ethylene oxide, for every 100 weight parts of polyoxyalkylene polyol after removal of DMC, 2.5 weight parts of 30 weight percent KOMe methanol solution was added. Methanol removal reaction was conducted for 3 hours at 100° C., 10 mmHgabs. (1,330 Pa) or less. This compound was placed in the autoclave. After nitrogen substitution, under conditions of reaction temperature 100° C., maximum reaction pressure of 5 kgf/cm² (490 kPa), ethylene oxide was added in and reacted until OHV of 24.5 mgKOH/g was reached. After the reaction, vacuum processing was conducted, and a crude polyoxyalkylene polyol was obtained.

For every 1 mole of potassium in the crude polyoxyalkylene polyol, 1.05 moles of phosphoric acid (75.1 weight % phosphoric acid aqueous solution) was added in. For every 100 weight parts of crude polyoxyalkylene polyol, 5 weight parts of ion exchange water was added in. Neutralization reaction was conducted for 2 hours at 90° C. Next, 500 ppm of BHT, which is an oxidation inhibitor, and 8,000 ppm of adsorbent (Kyowa Chemical Industry Co. trade name: KW-700SN) were added. Under vacuum, while water was removed, vacuum dehydration was conducted for 3 hours under final conditions of 105° C., 100 mmHgabs. (1,330 Pa). After returning to atmospheric pressure with nitrogen, vacuum dehydration was conducted using 5C filter paper from Advantech Toyo Corp. Recovery of polyoxyalkylene polyol was conducted. After the potassium removal operation, the OHV of polyoxyalkylene polyol was 24.5 mg KOH/g, C=C 0.019 meq./g, viscosity (η) 2900 mPa·s/25° C., H-T bond selectivity 88.5 mol %, $W_{20}/W_{80}$ was 4.05.

Comparative Example 8
Polyoxyalkyene Polyol HH

For every 100 weight parts of polyoxyalkylene polyol MN 1000 (Mitsui Chemicals Inc. OHV 168 mgKOH/g) in which propylene oxide is added to glycerin, 0.03 weight parts of DMC was added. Vacuum dehydration was conducted for 3 hours at temperature of 105° C. and pressure of 10 mmHgabs. (1,330 Pa) or less. Next, this compound was placed in the autoclave. Under conditions of reaction temperature 80° C. maximum reaction pressure of 4 kgf/cm² (392 kPa), propylene oxide was addition polymerized until OHV of 38.5 mgKOH/g was reached. A crude polyoxyalkylene polyol which contained DMC was obtained. For every 100 weight parts of this polyoxyalkylene polyol, 2.22 weight parts of 30 weight percent potassium methylate (KOMe) methanol solution was added. Methanol removal reaction was conducted for 2 hours at 90° C., 20 mmHgabs. (2,660 Pa). Next, 3 weight parts of water and 5 weight parts of adsorbent (Tomita Pharmaceutical Co. product name: AD-600NS) were added. This was agitated for 2 hours at 90° C., under nitrogen atmosphere. Using 5C filter paper from Advantech Toyo Corp., vacuum filtration was conducted. After filtration, vacuum dehydration was conducted for 2 hours under condition of 120° C., 10 mmHgabs. (1,330 Pa) or less. DMC removal process was conducted. In order to addition polymerize ethylene oxide, for every 100 weight parts of polyoxypropylene polyol after removal of DMC, 2.5 weight parts of 30 weight percent KOMe methanol solution was added. Methanol removal reaction was conducted for 3 hours at 100° C., 10 mmHgabs. (1,330 Pa) or less. This compound was placed in the autoclave. After nitrogen substitution, under conditions of reaction temperature 100° C., maximum reaction pressure of 5 kgf/cm² (490 kPa), ethylene oxide was added in and reacted until OHV of 33.2 mgKOH/g was reached. After the reaction, vacuum processing was conducted, and a crude polyoxyalkylene polyol was obtained.

For every 1 mol of potassium in the crude polyoxyalkylene polyol, 1.05 moles of phosphoric acid (75.1 weight % phosphoric acid solution) was added in. For every 100 weight parts of crude polyoxyalkylene polyol, 4 weight parts of ion exchange water was added in. Neutralization reaction was conducted for 2 hours at 90° C. Next, 500 ppm of BHT, which is an oxidation inhibitor, and 8,000 ppm of adsorbent (Kyowa Chemical Industry Co. trade name: KW-700SN) were added. Under vacuum, while water was removed, vacuum dehydration was conducted for 3 hours under final conditions of 105° C., 10 mmHgabs. (1,330 Pa). After returning to atmospheric pressure with nitrogen, vacuum dehydration was conducted using 5C filter paper from Advantech Toyo Corp. Recovery of polyoxyalkylene polyol was conducted. After the potassium removal operation, the OHV of polyoxyalkylene polyol was 33.2 mg KOH/g, C=C 0.012 meq./g, viscosity (η) 1800 mPa·s/25° C., H-T bond selectivity 87.6 mol %, $W_{20}/W_{80}$ was 4.31.

Comparative Example 9
Polyoxyalkyene Polyol II

For every 100 weight parts of polyoxypropylene polyol Dio1400 (Mitsui Chemicals Inc.) in which propylene oxide was added to propylene glycol, 0.03 weight parts of DMC was added. Vacuum dehydration was conducted for 3 hours at temperature of 105° C. and pressure of 10 mmHgabs. (1,330 Pa) or less. Next, this compound was placed in the autoclave. Under conditions of reaction temperature 80° C., maximum reaction pressure of 4 kgf/cm² (392 kPa), propylene oxide was addition polymerized until OHV of 28.5 mgKOH/g was reached. A crude polyoxypropylene polyol which contained DMC was obtained.

For every 100 weight parts of this polyoxypropylene polyol, 2.8 weight parts of 30 weight percent potassium methylate (KOMe) methanol solution was added. Methanol removal reaction was conducted for 2 hours at 90° C., 20 mmHgabs. (2,660 Pa). Next, 3 weight parts of water and 5 weight parts of AD-600NS (Tomita Pharmaceutical Co.) were added. This was stirred for 2 hours at 90° C., under nitrogen. atmosphere. Using 5C filter paper from Advantech Toyo Corp., vacuum filtration was conducted. After filtration, vacuum dehydration was conducted for 2 hours under conditions of 120° C., 10 mmHgabs. (1,330 Pa) or less. DMC removal process was conducted.

For every 1 mol of potassium in the crude polyoxyalkylene polyol, 1.5 moles of phosphoric acid (75.1 weight % phosphoric acid solution) was added in. For every 100 weight parts of crude polyether polyol, 25 weight parts of ion exchange water was added in. Neutralization reaction was conducted for 2 hours at 90° C. Next, 500 ppm of BHT, which is an oxidation inhibitor was added, and vacuum dehydration was conducted. Under conditions of 105° C., 300 mmHgabs. (40 kPa), 8,000 ppm of adsorbent (Kyouwa Chemical Industry Co. trade name: KW-700SN) was added. Under vacuum, while water was removed, vacuum dehydration was conducted for 3 hours under final conditions of 105° C., 10 mm Hgabs. (1,330 Pa). After returning to atmospheric pressure with nitrogen, vacuum dehydration was conducted using 5C filter paper from Advantech Toyo Corp. Recovery of polyoxyalkylene polyol was conducted. After the potassium removal operation, the OHV of polyoxyalkylene polyol was 28.5 mg KOH/g, C=C 0.013 meq./g, viscosity ($\eta$) 1520 mPa·s/25° C., H-T bond selectivity 85.4 mol %, $W_{20}/W_{80}$ was 4.60.

Comparative Example 10
Polyoxyalkyene Polyol JJ

For every 100 weight parts of polyoxypropylene polyol (will be referred as EG400; OHV 280 mgKOH/g) in which propylene oxide is addition polymerized to ethylene glycol using potassium hydroxide as a catalyst by the method in the prior art, 0.03 weight parts of DMC was added. Vacuum dehydration was conducted for 3 hours at temperature of 105° C. and pressure of 10 mmHgabs. (1,330 Pa) or less. Next, this compound was placed in the autoclave. Under conditions of reaction temperature 80° C., maximum reaction pressure of 4 kgf/cm² (392 kPa), propylene oxide was addition polymerized until OHV of 32.0 mgKOH/g was reached. A crude polyoxypropylene polyol which contained DMC was obtained.

For every 100 weight parts of this polyoxypropylene polyol, 2.9 weight parts of 30 weight percent potassium methylate (KOMe) methanol solution was added. Methanol removal reaction was conducted for 2 hours at 90° C., 20 mmHgabs. (2,660 Pa). Next, 3 weight parts of water and 5 weight parts of adsorbent (Tomita Pharmaceutical Co. product name: AD-600NS) were added. This was stirred for 2 hours at 90° C., under nitrogen atmosphere. Using 5C filter paper from Advantech Toyo Corp., vacuum filtration was conducted. After filtration, vacuum dehydration was conducted for 2 hours under conditions of 120° C., 10 mmHgabs. (1,330 Pa) or less. DMC removal process was conducted. In order to addition polymerize ethylene oxide, for every 100 weight parts of polyoxypropylene polyol after removal of DMC, 2.5 weight parts of 30 weight percent KOMe methanol solution was added. Methanol removal reaction was conducted for 3 hours at 100° C., 10 mmHgabs. (1,330 Pa) or less. This compound was placed in the autoclave. After nitrogen substitution, under conditions of reaction temperature 80° C., maximum reaction pressure of 4 kgf/cm² (392 kPa), ethylene oxide was added in and reacted until OHV of 28.0 mgKOH/g was reached. After the reaction, vacuum processing was conducted, and a crude polyoxyalkylene polyol was obtained.

To further addition polymerize propylene oxide using DMC, potassium removal from the polyoxyalkylene polyol was conducted. For every 1 mol of potassium in the crude polyoxyalkylene polyol, 1.2 moles of phosphoric acid (75.1 weight % phosphoric acid solution) was added in. For every 100 weight parts of crude polyoxyalkylene polyol, 4 weight parts of ion exchange water was added in. Neutralization reaction was conducted for 2 hours at 90° C. 8,000 ppm of adsorbent (Kyouwa Chemical Industry Co. trade name: KW-700SN) was added. Under a vacuum, while removing water, dehydration was conducted for 3 hours under final condition of 105° C., 10 mmHgabs. (1,330 Pa). After returning to atmospheric pressure with nitrogen, vacuum dehydration was conducted using 5C filter paper from Advantech Toyo Corp. Recovery of polyoxyalkylene polyol was conducted. For every 100 weight parts of this polyoxyalkylene polyol, 0.01 weight parts of the DMC used previously was added. Under conditions of 105° C., 10 mmHgabs. (1,330 Pa), vacuum dehydration was conducted for 3 hours. Next, under conditions of 80° C., maximum reaction pressure of 4 kgf/cm² (392 kPa), addition polymerization of propylene oxide was conducted until OHV of 18.6 mg KOH/g was reached. The DMC removal process from this polyoxyalkylene polyol was the method using KOMe as described previously. After the potassium removal operation, the OHV of polyoxyalkylene polyol was 18.6 mg KOH/g, C=C 0.029 meq./g, viscosity ($\eta$) 3200 mPa·s/25° C., H-T bond selectivity 86.3 mol %, $W_{20}/W_{80}$ was 5.20.

The OHV, C=C, viscosity ($\eta$), H-T bond selectivity, $W_{20}/W_{80}$, and the residual amount of polyoxyalkylene polyol (will be referred as polyol) obtained in Examples 1~11 and Comparative Examples 1~10 were all summarized in Tables 1~4. In the table, for the initiators, the abbreviations are Gly for glycerin, DPG for dipropylene glycol, EG for ethylene glycol. As the polymerization catalyst of alkylene oxide, P5NMe2Cl is phosphazenium compound a, P5NMe2OH is phosphazenium compound b, CsOH is cesium hydroxide, DMC is double metal cyanide complex. PO is an abbreviation for propylene oxide, EO is ethylene oxide. Furthermore, the residual amount of phosphazenium compound catalyst is abbreviated as catalyst residual amount. The analytical values for the polyoxyalkylene polyol were obtained by the methods which were described previously.

TABLE 1

Examples 1–6

| | | EXAMPLES | | | | | |
|---|---|---|---|---|---|---|---|
| | | 1 | 2 | 3 | 4 | 5 | 6 |
| Polyol | | A | B | C | D | E | F |
| Initiator | Gly | 1 | — | 1 | 1 | 1 | — |
| | DPG | — | 1 | — | — | — | 1 |
| | EG | — | — | — | — | — | — |
| Phosphazenium com. (mol) | #1 | 0.012 | 0.008 | 0.016 | 0.12 | — | — |
| | #2 | — | — | — | — | 0.012 | 0.016 |
| Alkali metal (mol) | KOH | 0.013 | 0.009 | 0.018 | — | — | — |
| | CsOH | — | — | — | 0.15 | — | — |
| #3 PO addition polym. temp. (° C.) | | 70~86 | 75~78 | 28~78 | 88 | 80 | 75~78 |
| Maximum pressure (kPa) | | 392 | 392 | 784 | 343 | 392 | 392 |
| #4 EO addition polym. temp. (° C.) | | 105 | — | 115 | 120 | 100 | — |
| Maximum pressure (kPa) | | 490 | — | 490 | 490 | 392 | — |
| #3 PO addition polym. temp. (° C.) | | — | — | — | — | — | — |
| Maximum pressure (kPa) | | — | — | — | — | — | — |
| #5 Phosphazenium com. remov. method | | #6 AN | #6 AN | #6 AN | #6 AN | #6 AN | #7 E.I. |
| OHV (mgKOH/g) | | 24.1 | 37.4 | 27.5 | 33.1 | 24.1 | 28.3 |
| C = C (meq./g) | | 0.013 | 0.009 | 0.011 | 0.018 | 0.015 | 0.010 |
| η (mPa · s/25° C.) | | 1220 | 510 | 1090 | 850 | 1150 | 710 |
| H - T (mol %) | | 96.4 | 96.6 | 95.9 | 96.5 | 95.9 | 96.0 |
| $W_{20}/W_{80}$ (-) | | 2.68 | 2.65 | 2.61 | 2.71 | 2.63 | 2.62 |
| Catalyst residual amount (ppm) | | 22 | 30 | 83 | 29 | 19 | 12 |

1: P5NMe2Cl
2: P5NMe2OH
3: PO addition polymerization temperature (° C.)
4: EO addition polymerization temperature (° C.)
5: Phosphazenium compound removal method (° C.)
6: Acid neutralization
7: Ion exchange

TABLE 2

Examples 7–11

| | | EXAMPLES | | | | |
|---|---|---|---|---|---|---|
| | | 7 | 8 | 9 | 10 | 11 |
| Polyol | | G | H | I | J | K |
| Initiator | Gly | — | — | 1 | — | 1 |
| | DPG | 1 | — | — | 1 | — |
| | EG | — | 1 | — | — | — |
| Phosphazenium com. (mol) | #1 | — | — | — | — | — |
| | #2 | 0.02 | 0.08 | 0.012 | 0.08 | 0.012 |
| Alkali metal (mol) | KOH | — | — | — | — | — |
| | CsOH | — | — | — | — | — |
| #3 PO addition polym. temp. (° C.) | | 70 | 60~78 | 80 | 75~82 | 80 |
| Maximum pressure (kPa) | | 392 | 539 | 392 | 470 | 392 |
| #4 EO addition polym. temp. (° C.) | | 70 | — | — | — | — |
| Maximum pressure (kPa) | | 392 | — | — | — | — |
| #3 PO addition polym. temp. (° C.) | | 70 | — | — | — | — |
| Maximum pressure (kPa) | | 392 | — | — | — | — |
| #5 Phosphazenium com. remov. method | | #6 AN | #8 W.R. | #7 I.E. | #8 W.R. | #8 W.R. |
| OHV (mgKOH/g) | | 18.5 | 9.8 | 28.0 | 14.2 | 18.7 |
| C = C (meq./g) | | 0.022 | 0.058 | 0.020 | 0.043 | 0.027 |
| η (mPa · s/25° C.) | | 1100 | 4150 | 1000 | 2180 | 2450 |
| H - T (mol %) | | 97.0 | 96.1 | 96.4 | 96.8 | 95.9 |
| $W_{20}/W_{80}$ (-) | | 2.52 | 2.78 | 2.58 | 2.72 | 2.62 |
| Catalyst residual amount (ppm) | | 82 | 8 | 12 | 13 | 16 |

1: P5NMe2Cl
2: P5NMe2OH
3: PO addition polymerization temperature (° C.)
4: EO addition polymerization temperature (° C.)
5: Phosphazenium compound removal method (° C.)
6: Acid neutralization
7: Ion exchange
8: Water rising

TABLE 3

Comparative Example 1–5

| | | COMPARATIVE EXAMPLES | | | | |
|---|---|---|---|---|---|---|
| | | 1 | 2 | 3 | 4 | 5 |
| Polyol | | AA | BB | CC | DD | EE |
| Initiator (mol) | Gly | 1 | 1 | 1 | — | — |
| | DPG | — | — | — | 1 | 1 |
| | EG | — | — | — | — | — |
| Iniciator (weight parts) | MN1000 | — | — | — | — | — |
| | Diol400 | — | — | — | — | — |
| | EG400 | — | — | — | — | — |
| Catalyst | CsOH (mol) | 0.48 | 0.38 | 0.28 | 0.28 | 0.28 |
| | DMC (wt. parts) | — | — | — | — | — |
| #3 PO addition polym. temp. (° C.) | | 80 | 80 | 88 | 78~81 | 80 |
| Maximum pressure (kPa) | | 392 | 392 | 343 | 392 | 392 |
| #4 EO addition polym. temp. (° C.) | | — | 100 | 120 | — | 80 |
| Maximum pressure (kPa) | | — | 392 | 490 | — | 392 |
| #3 PO addition polym. temp. (° C.) | | — | — | — | — | 90 |
| Maximum pressure (kPa) | | — | — | — | — | 392 |
| OHV (mgKOH/g) | | 28.0 | 24.1 | 33.2 | 28.2 | 18.6 |
| C = C (meq./g) | | 0.057 | 0.023 | 0.039 | 0.038 | 0.059 |
| η (mPa · s/25° C.) | | 1150 | 1560 | 1000 | 790 | 1580 |
| H - T (mol %) | | 96.5 | 96.6 | 96.3 | 96.4 | 96.8 |
| $W_{20}/W_{80}$ (-) | | 2.87 | 2.95 | 2.84 | 2.85 | 2.98 |

3: PO addition polymerization temperature (° C.)
4: EO addition polymerization temperature (° C.)

TABLE 4

Comparative Example 6–10

| | | COMPARATIVE EXAMPLES | | | | |
|---|---|---|---|---|---|---|
| | | 6 | 7 | 8 | 9 | 10 |
| Polyol | | FF | GG | HH | II | JJ |
| Initiator (mol) | Gly | — | — | — | — | — |
| | DPG | — | — | — | — | — |
| | EG | — | — | — | — | — |
| Iniciator (weight parts) | MN1000 | 100 | 100 | 100 | — | — |
| | Diol400 | — | — | — | 100 | — |
| | EG400 | — | — | — | — | 100 |
| Catalyst | CsOH (mol) | — | — | — | — | — |
| | DMC (wt. parts) | 0.05 | 0.05 | 0.03 | 0.03 | 0.03 |
| #3 PO addition polym. temp. (° C.) | | 80 | 80 | 88 | 80 | 80 |
| Maximum pressure (kPa) | | 392 | 392 | 392 | 392 | 392 |
| #4 EO addition polym. temp. (° C.) | | — | 100 | 100 | — | 80 |
| Maximum pressure (kPa) | | — | 490 | 490 | — | 392 |
| #3 PO addition polym. temp. (° C.) | | — | — | — | — | 80 |
| Maximum pressure (kPa) | | — | — | — | — | 392 |
| OHV (mgKOH/g) | | 28.1 | 24.5 | 33.2 | 28.5 | 18.6 |
| C = C (meq./g) | | 0.010 | 0.019 | 0.012 | 0.013 | 0.029 |
| η (mPa · s/25° C.) | | 2050 | 2900 | 1800 | 1520 | 3200 |
| H - T (mol %) | | 89.3 | 88.5 | 87.6 | 85.4 | 86.3 |
| $W_{20}/W_{80}$ (-) | | 4.56 | 4.05 | 4.31 | 4.60 | 5.20 |

3: PO addition polymerization temperature (° C.)
4: EO addition polymerization temperature (° C.)

Referring to Table 5, the polymerization activities of propylene oxide (g/mol·min) for P5NMeOH which was used in Example 9, CsOH (Comparative Example 1), DMC (Comparative Example 6) were shown.

TABLE 5

| | Example 9 | Com. Ex. 1 | Com. Ex. 6 |
|---|---|---|---|
| Polyol | I | AA | FF |
| Catalyst | P5NMe2OH | CsOH | DMC |
| Propylene oxide Polymerization Activity (g/mol · min) | 490 | 8.7 | 2100 |

Comments 1 on Examples

The following information can be obtained from Examples 1~11 and Comparative Examples 1~10.

The polyoxyalkylene polyol of the present invention in which phosphazenium compounds are used as polymerization catalysts for alkylene oxide has about the same C═C, which is an indicator for monool content, as the polyoxyalkylene polyol with a DMC catalyst of the prior art. However, the polyoxyalkylene polyol of the present invention has a lower viscosity.

Although DMC catalysts show the highest values for the polymerization activity for propylene oxide, with the polymerization reaction of ethylene oxide, DMC must be first inactivated by a reaction with an alkali metal compound (potassium methylate), and then the ethylene oxide must be polymerized with this catalyst. The process becomes extremely complicated. In the manufacture method of the present invention, phosphazenium compound catalyst is used. The polymerization activity for propylene oxide is higher than with CsOH catalyst. In addition, a polyoxyalkylene polyol with low C═C can be obtained. There is no need for a complicated process for the polymerization reaction of ethylene oxide, and a polyoxyalkylene polyol with a low viscosity can be obtained.

Examples 12 15, Comparative Examples 11~13
Polymer Dispersed Polyol

The polymer dispersed in polyol of the present invention will be described using examples.

The materials, abbreviations, analysis methods for Examples 12~15, Comparative Examples 11~13 are described below.

(polyoxyalkylene polyol): D, E, BB, GG; they indicate the polyoxyalkylene polyol (referred as polyol) obtained in Example 4 (D), Example 5 (E), and Comparative Example 2 (BB), Comparative Example 7 (GG).

(ethylenically unsaturated monomer-1); acrylonitrile (will be referred as AN).

(ethylenically unsaturated monomer-2); styrene (will be referred as St).

(chain transfer agent); triethyl amine (will be referred as TEA).

(radical initiator); azobisisobutyronitrile (will be referred as AIBN).

(5) The hydroxyl value (OHV, units: mgKOH/g) of the Polymer dispersed polyol and viscosity ($\eta$, units: mPa·s/25° C.).

They were determined by the method described in JIS K-1557.

(6) Polymer concentration (unit: weight %)

Methanol was added to polymer dispersed polyol. After dispersing well, it was centrifuged, and the weight of the insoluble methanol portion is measured. However, when the polymer dispersed polyol used acrylonitrile alone as the ethylenically unsaturated monomer, it was determined from the nitrogen content by elemental analysis.

(7) Particle aggregation

This was an indicator for the dispersion stability of polymer dispersed polyol. The polymer dispersed polyol was centrifuged for 1 hour at 5000 rotations per minute and 2000 G radial centrifugal force. Next, the centrifuge tube was placed upside down and allowed to naturally flow downwards for 24 hours. The presence or absence of non-flowing cake at the bottom of the centrifuge tube was determined by sight.

A one-liter autoclave with a thermometer, agitating device, liquid transporting device was completely filled with polyols indicated in Table 6 and Table 7. While agitating, the temperature was raised to 120° C. Next, mixture solution of polyol, AN, St, TEA, AIBN which was mixed in the ratio shown in Table 6 and Table 7 was continuously added in.

TABLE 6

Example 12–15

| | | EXAMPLES | | | |
|---|---|---|---|---|---|
| | | 12 | 13 | 14 | 15 |
| Polymer dispersed polyol | | A | B | C | D |
| Polyoxyalkylene Polyol (weight parts) | Ex. 4 Polyol D | 77.6 | — | — | — |
| | Ex. 5 Polyol E | — | 77.6 | 76.0 | 56.8 |
| AN (weight parts) | | 22.4 | 22.4 | 19.0 | 34.0 |
| St (weight parts) | | — | — | 5.0 | 8.0 |
| TEA (weight parts) | | — | — | — | 1.0 |
| AIBN (weight parts) | | 0.35 | 0.35 | 0.35 | 0.25 |
| Properties of polymer dispersed. Polyol | #9 Hydro. v. | 26.1 | 20.3 | 19.1 | 15.0 |
| | #10 Viscosity | 2730 | 3950 | 4320 | 6480 |
| | #11 Poly. con. | 20.7 | 20.4 | 22.1 | 40.1 |
| Aggregation of particles | | None | None | None | None |

9: Hydroxyl value (mgKOH/g)
10: Viscosity (mPa·s/25° C.)
12: Polymer concentration (weight %)

TABLE 7

Comparative Examples 11–13

| | | COMPARATIVE EXAMPLES | | |
|---|---|---|---|---|
| | | 11 | 12 | 13 |
| Polymer dispersed polyol | | E | F | G |
| Polyoxyalkylene Polyol (weight parts) | Com. Ex. 2 Polyol BB | 76.0 | 56.8 | — |
| | Com. Ex. 7 Polyol GG | — | — | 76.0 |
| AN (weight parts) | | 19.0 | 34.0 | 19.0 |
| St (weight parts) | | 5.0 | 8.0 | 5.0 |
| TEA (weight parts) | | — | 1.0 | — |
| AIBN (weight parts) | | 0.35 | 0.25 | 0.35 |
| Properties of polymer dispersed. Polyol | #9 Hydro. Value | 20.4 | 15.3 | 19.1 |
| | #10 Viscosity | 4860 | 8910 | 12100 |
| | #11 Polym. con. | 22.1 | 39.8 | 22.3 |
| Aggregation of particles | | None | None | Found |

9 Hydroxyl value (mgKOH/g)
10: Viscosity (mgPa·s/25° Cl)
11: Polymer concentration (weight %)

From the discharge opening, polymer dispersed polyol was continuously obtained. At this time, the reaction pressure was 3.5 kgf/cm$^2$ (444 kPa), residence time was 50 minutes. After the steady state was achieved, the obtained reaction solution was processed by vacuum suctioning for 4 hours at 120° C., 20 mmHgabs. (2,660 Pa). Unreacted ethylenically unsaturated monomer and TEA were removed, and polymer dispersed polyol A–D (Examples 12~15), and polymer dispersed polyols E 0~G (Comparative Examples 11~13) were obtained. The results are shown in Tables 6 and 7.

Examples 16~19, Comparative Examples 14~16
Manufacturing Polyurethane Foams

In order to illustrate the effect of the polymer dispersed polyol obtained by the present invention, a manufacturing example of flexible polyurethane foam which uses the polymer dispersed polyol is described below. The materials, abbreviations, and analysis method used for the examples and comparative examples are described below.

(polymer dispersed polyol): A~G; they indicate the polymer dispersed polyol in Example 12 (A), Example 14 (C), Example 15 (D), and Comparative Example 11 (E), Comparative Example 12 (F), Comparative Example 13 (G).

(Polyol L): Mitsui Chemicals Inc. polyoxyalkylene polyol EP-330N. OHV of 33 mg KOH/g.

(cross-linking agent): DEOA: Mitsui Chemicals Inc. diethanol amine (catalyst-1): L-1020; Katsuzai Chemical Co. tertiary amine catalyst (33 weight % triethylene diamine of diethylene glycol solution).

(catalyst-2); TMDA; Katsuzai Chemical Co. tertiary amine catalyst (70 weight% bis dimethylamino ethyl ether of diethylene glycol solution).

(surfactant); L-5309; Nihon Unicar Corp silicone (isocyanate); cosmonate TM-20; Mitsui Chemicals Inc. polyisocyanate. A mixture of TDI-80 and polymeric MDI at a weight ratio of 80:20.

Polymer dispersed polyol, polyol L, water, DEOA, L-1020, TMDA, L-5309 were agitated and mixed in the ratio shown in Table 8. This was called resin premix. The resin premix was adjusted to 25° C. Cosmonate TM-20 was adjusted to 25° C. The amount of cosmonate TM-20 was deterimed by a ratio (NCO index) of the isocyanate group concentration with respect to the active hydrogen group concentration in the resin premix. NCO index was 1.00.

Next, this was vigorously agitated and mixed with the previously prepared resin premix. After injecting the mixing solution into a commercial 60° C. aluminum test mold (inner measurements: 400×100×100 mm) which ha d been pre-coated with a mold release agent, the lid was closed, and the mold was shut tight with clamps, in order to form and cure in the mold. 6 minutes after the start of agitating, the clamps of the test mold were removed. The cured flexible polyurethane foam was taken out of the mold. The strength appearing in holding down the form by hand was used to evaluate the degree of closed cells content. Next, using a roller, the foam was compressed in thickness of 80% based on the initial thickness thereof and the bubbles in the foam were completely opened (crushing operation). Various properties of the flexible polyurethane foam obtained 24 hours after foaming were measured. The results are shown in Table 8. The flexible polyurethane foam indicated in Comparative Example 16 had a defective foaming condition, and the measurement of the various properties of the foam was not possible.

TABLE 8

Example 16–19, Comparative Examples 14–15

|  |  | EXAMPLES | | | | COMPARATIVE EXAMPLES | | |
|---|---|---|---|---|---|---|---|---|
|  |  | 16 | 17 | 18 | 19 | 14 | 15 | 16 |
| #13 Poly. dis. Polyol (wt. p) | A | 40 | — | — | — | — | — | — |
|  | B | — | 40 | — | — | — | — | — |
|  | C | — | — | 40 | — | — | — | — |
|  | D | — | — | — | 28 | — | — | — |
|  | E | — | — | — | — | 40 | — | — |
|  | F | — | — | — | — | — | 28 | — |
|  | G | — | — | — | — | — | — | 40 |
| Polyol L (weigh parts) |  | 60 | 60 | 60 | 72 | 60 | 72 | 60 |
| Water (weight parts) |  | 3.4 | 3.4 | 3.4 | 3.4 | 3.4 | 3.4 | 3.4 |
| DEOA (weight parts) |  | 1.0 | 1.0 | 1.0 | 1.0 | 1.0 | 1.0 | 1.0 |
| L-1020 (weight parts) |  | 0.6 | 0.6 | 0.6 | 0.6 | 0.6 | 0.6 | 0.6 |
| TMDA (weight parts) |  | 0.1 | 0.1 | 0.1 | 0.1 | 0.1 | 0.1 | 0.1 |
| L-5309 (weight parts) |  | 1.0 | 1.0 | 1.0 | 1.0 | 1.0 | 1.0 | 1.0 |
| #14 Mold filling property |  | good | good | good | good | good | good | bad |
| Degree of closed cells content |  | small | small | small | small | small | small | large |
| Cracks infoam crushed |  | none | none | none | none | none | none | found |
| Overall density (kg/m$^3$) |  | 50 | 50 | 50 | 50 | 50 | 50 | 50 |
| Hardness 25% ILD (kPa) |  | 2,850 | 2,160 | 1,960 | 2,250 | 2,060 | 2,250 | #16 |
| Tensile strength (kPa) |  | 144 | 145 | 150 | 118 | 146 | 117 |  |
| Elongation (%) |  | 115 | 122 | 120 | 116 | 119 | 118 |  |
| Tear strength (kPa) |  | 51.9 | 57.6 | 59.8 | 60.8 | 55.9 | 61.7 |  |
| #15 Hum. Compress. set (%) |  | 6.7 | 8.5 | 8.2 | 12.2 | 9.2 | 15.4 |  |
| Impact resilience core (%) |  | 72 | 74 | 75 | 75 | 75 | 74 |  |

13: Polymer dispersed polyol (weight parts)
14: Properties of flexible polyurethane form
15: Humid aged compression set (%)
16: Not able to be measured (8) Various properties of flexible polyurethane foam.
They were determined by methods described in JIS K-6301, and JIS K-6401.

Comments 2 on Examples

The polymer dispersed polyols which used phosphazeniumcatalyzed polyoxyalkylene polyol as the dispersal medium were a low viscosity. In particular, even when the polymer concentration was increased, they had a lower viscosity than the products of the prior art. As a result, in the wide range of uses of polyurethane, there are improved moldability and improved properties. The flexible polyurethane foams which use the polymer dispersed polyol of the present invention had high air flowability at the time of foaming, and as a result, there are no problems such as cracking generated after crushing. Furthermore, it is possible to provide flexible polyurethane foam with excellent properties in hardness, wet humid aged compression set, impact resilience, and the like.

Furthermore, using the polyoxyalkylene polyols and the polymer dispersed polyols obtained in the examples and the comparative examples described previously, synthesis of isocyanate terminated prepolymer was conducted. In order to illustrate the effects of the isocyanate terminated prepolymer obtained by this present invention, results from a storage stability test of the isocyanate terminated prepolymer which was obtained by the reaction of the polyoxyalkylene polyol and the polyisocyanate compound are shown. Next, manufacture examples of polyurethane resin in which isocyanate terminated prepolymer and 1,4-butane glycol (will be referred as 1,4-BG) was used as curing agent are also shown.

(9) The isocyanate group content (weight %) and viscosity (mPa·s/25° C.) of the isocyanate terminated prepolymer.

The method described in JIS K-7301 was followed.

(10) Measurement of properties of polyurethane resin

The method described in JIS K-6301 was followed.

Example 21
Isocyanate Terminated Prepolymer A 772.6 weight parts of polyoxyalkylene polyol F obtained in Example 6 and 227.4 weight parts of cosmonate PH (4,4'-diphenyl methane diisocyanate, Mitsui Chemicals Inc. same as below) as the isocyanate compound were added. Under nitrogen. atmosphere, they were agitated for 4 hours at 100° C. An isocyanate terminated prepolymer was obtained. The concentration ratio of isocyanate group with respect to the active hydrogen group (NCO index) was 4.67. The isocyanate group content was 6.0 weight %. Viscosity was 5120 mPa·s/25° C.

500 weight parts of the resulting isocyanate terminated prepolymer was sealed in a metal container under nitrogen. atmosphere. This was stored in an oven for 14 days at 60° C. The storage stability test was conducted. After the storage stability test, the isocyanate content of the isocyanate terminated prepolymer was 5.8 weight %, viscosity was 5240 mPa·s/25° C., and little change was observed.

Next, for every 100 weight parts of isocyanate terminated prepolymer A, 6.1 weight parts of 1,4-BG (Wako Pure Chemical Industries, Ltd. same as below), 0.002 weight parts of dibutyl tin dilaurate (Sankyo Organic Synthesis Co. StannBL, abbreviated as DBTDL) were added. This was uniformly mixed by an agitator. This was uniformly poured into a 2 mm thick Teflon coated metal mold. This was cured for 24 hours at 100° C. Furthermore, under condition of 23° C., this was left standing for 7 days. After completely curing, the measurement of properties was conducted. The resulting polyurethane resin had the hardness of 75A. The tensile strength at break was 180 kgf/cm² (17.7 MPa), and the elongation at break was 750%.

Example 22
Isocyanate Terminated Prepolymer B 773.1 weight parts of polyoxyalkylene polyol I obtained in Example 9 and 226.9 weight parts of cosmonate PH as the isocyanate compound were added. Under nitrogen. atmosphere, they were agitated for 4 hours at 100° C. An isocyanate terminated prepolymer was obtained. The NCO index was 4.70. The isocyanate group content was 6.0 weight %. Viscosity was 7,800 mPa·s/25° C.

500 weight parts of the resulting isocyanate terminated prepolymer was sealed in a metal container under nitrogen. atmosphere. This was stored in an oven for 14 days at 60° C. The storage stability test was conducted. After the storage stability test, the isocyanate content of the isocyanate terminated prepolymer was 5.9 weight %, viscosity was 8,000 mPa·s/25° C., and little change was observed.

Next, for every 100 weight parts of isocyanate terminated prepolymer B, 6.1 weight parts of 1,4-BG (Wako Pure Chemical Industries, Ltd.), 0.002 weight parts of DBTDL were added. This was uniformly mixed by an agitator. This was uniformly poured into a 2 mm thick Teflon coated metal mold. This was cured for 24 hours at 100° C. Furthermore, under condition of 23° C., this was left standing for 7 days. After completely curing, the measurement of properties was conducted. The resulting polyurethane resin had the hardness of 77A. The tensile strength at break was 150 kgf/cm² (14.7 MPa), and the elongation at break was 350%.

Example 23
Isocyanate Terminated Prepolymer C 796.2 weight parts of polyoxyalkylene polyol J obtained in Example 10 and 203.8 weight parts of cosmonate PH as the isocyanate compound were added. Under nitrogen. atmosphere, they were agitated for 4 hours at 100° C. An isocyanate terminated prepolymer was obtained. The NCO index was 8.09. The isocyanate group content was 6.0 weight %. Viscosity was 6640 mPa·s/25° C.

500 weight parts of the resulting isocyanate terminated prepolymer was sealed in a metal container under nitrogen. atmosphere. This was stored in an oven for 14 days at 60° C. The storage stability test was conducted. After the storage stability test, the isocyanate content of the isocyanate terminated prepolymer was 5.9 weight %, viscosity was 6690 mPa·s/25° C., and little change was observed.

Next, for every 100 weight parts of isocyanate terminated prepolymer C, 6.1 weight parts of 1,4-BG (Wako Pure Chemical Industries, Ltd.), 0.002 weight parts of DBTDL were added. This was uniformly mixed by an agitator. This was uniformly poured into a 2 mm thick Teflon coated metal mold. This was cured for 24 hours at 100° C. Furthermore, under condition of 23° C., this was left standing for 7 days. After completely curing, the measurement of properties was conducted. The resulting polyurethane resin had the hardness of 73A. The tensile strength at break was 130 kgf/cm² (12.8 MPa), and the elongation at break was 900%

Comparative Example 17
Isocyanate Terminated Prepolymer AA 773.1 weight parts of polyoxyalkylene polyol AA obtained in Comparative Example 1 and 226.9 weight parts of cosmonate PH as the isocyanate compound were added. Under nitrogen. atmosphere, they were stirred for 4 hours at 100° C. An isocyanate terminated prepolymer was obtained. The NCO index was 4.70. The isocyanate group content was 6.0 weight %. Viscosity was 8000 mPa·s/25° C.

500 weight parts of the resulting isocyanate terminated prepolymer was sealed in a metal container under nitrogen atmosphere. This was stored in an oven for 14 days at 60° C. The storage stability test was conducted. After the storage stability test, the isocyanate content of the isocyanate terminated prepolymer was 5.8 weight %, viscosity was 8200 mPa·s/25° C., and little change was observed.

Next, for every 100 weight parts of isocyanate terminated prepolymer AA, 6.1 weight parts of 1,4-BG, 0.002 weight parts of DBTDL were added. This was uniformly mixed by an agitator. This was uniformly poured into a 2 mm thick Teflon coated metal mold. This was cured for 24 hours at 100° C. Under condition of 23° C., this was left standing for 7 days. After completely curing, the measurement of properties was conducted. The resulting polyurethane resin had the hardness of 73A. The tensile strength at break was 120 kgf/cm$^2$ (11.8 MPa), and the elongation at break was 300%.

Comparative Example 18
Isocyanate Terminated Prepolymer BB 772.8 weight parts of polyoxyalkylene polyol DD obtained in Comparative Example 4 and 227.2 weight parts of cosmonate PH as the isocyanate compound were added. Under nitrogen. atmosphere, they were agitated for 4 hours at 100° C. An isocyanate terminated prepolymer was obtained. The NCO index was 4.68. The isocyanate group content was 6.0 weight %. Viscosity was 5150 mPa·s/25° C.

500 weight parts of the resulting isocyanate terminated prepolymer was sealed in a metal container under nitrogen. atmosphere. This was stored in an oven for 14 days at 60° C. The storage stability test was conducted. After the storage stability test, the isocyanate content of the isocyanate terminated prepolymer was 5.9 weight %, viscosity was 5260 mPa·s/25° C., and little change was observed.

Next, for every 100 weight parts of isocyanate terminated prepolymer BB, 6.1 weight parts of 1,4-BG, 0.002 weight parts of DBTDL were added. This was uniformly mixed by an agitator. This was uniformly poured into a 2 mm thick Teflon coated metal mold. This was cured for 24 hours at 100° C. Under condition of 23° C., this was left standing for 7 days. After completely curing, the measurement of properties was conducted. The resulting polyurethane resin had the hardness of 70A. The tensile strength at break was 165 kgf/cm$^2$ (16.2 MPa), and the elongation at break was 700%.

Comparative Example 19
Isocyanate Terminated Prepolymer CC 772.9 weight parts of polyoxyalkylene polyol FF obtained in Comparative Example 6 and 227.1 weight parts of cosmonate PH as the isocyanate compound were added. Under nitrogen. atmosphere, this was stirred for 4 hours at 100° C. An isocyanate terminated prepolymer was obtained. The NCO index was 4.69. The isocyanate group content was 6.0 weight %. Viscosity was at 9800 mPa·s/25° C.

500 weight parts of the resulting isocyanate terminated prepolymer was sealed in a metal container under nitrogen atmosphere. This was stored in an oven for 14 days at 60° C. The storage stability test was conducted. After the storage stability test, the isocyanate content of the isocyanate terminated prepolymer was 5.5 weight %, viscosity was 15,000 mPa·s/25° C. The viscosity was increased.

Next, for every 100 weight parts of isocyanate terminated prepolymer CC, 6.1 weight parts of 1,4-BG, 0.002 weight parts of DBTDL were added. This was uniformly mixed by an agitator. This was uniformly poured into a 2 mm thick Teflon coated metal mold. This was cured for 24 hours at 100° C. Furthermore, under condition of 23° C., this was left standing for 7 days. After completely curing, the measurement of properties was conducted. The resulting polyurethane resin had the hardness of 72A. The tensile strength at break was 120 kgf/cm$^2$ (11.8 MPa), and the elongation at break was 200%.

Comparative Example 20
Isocyanate Terminated Prepolymer DD 772.3 weight parts of polyoxyalkylene polyol II obtained in Comparative Example 9 and 227.7 weight parts of cosmonate PH as the isocyanate compound were added. Under nitrogen. atmosphere, this was stirred for 4 hours at 100° C. An isocyanate terminated prepolymer was obtained. The NCO index was 4.64. The isocyanate group content was 6.0 weight %. Viscosity was 5500 mPa·s/25° C.

500 weight parts of the resulting isocyanate terminated prepolymer was sealed in a metal container under nitrogen. atmosphere. This was stored in an oven for 14 days at 60° C. The storage stability test was conducted. After the storage stability test, the isocyanate content of the isocyanate terminated prepolymer was 5.4 weight %. Viscosity was 9800 mPa·s/25° C. An increasing viscosity was observed.

Next, for every 100 weight parts of isocyanate terminated prepolymer DD, 6.1 weight parts of 1,4-BG, 0.002 weight parts of DBTDL were added. This was uniformly mixed by an agitator. This was uniformly poured into a 2 mm thick Teflon coated metal mold. This was cured for 24 hours at 100° C. Furthermore, under condition of 23° C., this was left standing for 7 days. After completely curing, the measurement of properties was conducted. The resulting polyurethane resin had the hardness of 72A. The tensile strength at break was 123 kgf/cm$^2$ (12.1 MPa), and the elongation at break was 550%.

Results for Examples 21~23. Comparative Examples 7~20 are shown in Table 9. The polyol in the table is an abbreviation for polyoxyalkylene polyol. NCO index represents the ratio of the isocyanate group concentration with respect to the active hydrogen group concentration.

TABLE 9

Example 21–23, Comparative Example 17–20

|  | EXAMPLES ||| COMPARATIVE EXAMPLE ||||
| --- | --- | --- | --- | --- | --- | --- | --- |
|  | 21 | 22 | 23 | 17 | 18 | 19 | 20 |
| Isocyanate terminated prepolymer | A | B | C | AA | BB | CC | DD |
| Example 6: Polyol | F | — | — | — | — | — | — |
| Example 9: Polyol | — | I | — | — | — | — | — |
| Example 10: Polyol | — | — | J | — | — | — | — |
| Comparative Example 1: Polyol | — | — | — | AA | — | — | — |
| Comparative Example 4: Polyol | — | — | — | — | DD | — | — |
| Comparative Example 6: Polyol | — | — | — | — | — | FF | — |
| Comparative Example 9: Polyol | — | — | — | — | — | — | II |
| NOC Index | 4.67 | 4.70 | 8.09 | 4.70 | 4.68 | 4.69 | 4.64 |

TABLE 9-continued

Example 21–23, Comparative Example 17–20

|  |  | EXAMPLES | | | COMPARATIVE EXAMPLE | | | |
|---|---|---|---|---|---|---|---|---|
|  |  | 21 | 22 | 23 | 17 | 18 | 19 | 20 |
|  | Isocyanate group content (weight %) | 6.0 | 6.0 | 6.0 | 6.0 | 6.0 | 6.0 | 6.0 |
|  | Viscosity (mPa · s/25° C.) | 5120 | 7800 | 6840 | 8000 | 5150 | 9800 | 5500 |
| #17 | Isocyanate group content (weight %) | 5.8 | 5.9 | 5.9 | 5.8 | 5.9 | 5.5 | 5.4 |
|  | Viscosity (mPa · s/25° C.) | 5240 | 8000 | 6690 | 8200 | 5260 | 15000 | 9800 |
| #18 | Hardness (Shore A) | 75A | 77A | 73A | 73A | 70A | 72A | 72A |
|  | Tensile strength (MPa) | 17.7 | 14.7 | 12.8 | 11.8 | 16.2 | 11.8 | 12.1 |
|  | Elongation at break (%) | 750 | 350 | 900 | 300 | 700 | 200 | 550 |

17: Storage stability test
18: Property

Comments 3 on Examples

From embodiments 21~23 and from Comparative Examples 17~20, the characteristics of the isocyanate terminated prepolymer of the present invention which used phosphazeniumcatalyzed polyoxyalkylene polyol are that it is low viscosity, and it has excellent storage stability. Furthermore, by using the isocyanate terminated prepolymer of the present invention, a polyurethane resin with excellent mechanical properties can be provided.

Next, using the polymer dispersed polyol of Example 13 and Comparative Example 13, the synthesis of isocyanate terminated prepolymer was conducted. Next, in order to illustrate the effects of the isocyanate terminated prepolymer obtained by the present invention, the results from the storage stability test for the isocyanate terminated prepolymer which were obtained by reacting polymer dispersed polyol and polyisocyanate compound are shown.

(11) Isocyanate group content (weight %) in the isocyanate terminated prepolymer, and viscosity (mPa·s/25° C.)

These are measured following the methods described in JIS K-7301.

Example 24
Isocyanate Terminated Prepolymer D 785.8 weight parts of polymer dispersed polyol B obtained in Example 13 and 214.2 weight parts of cosmonate PH as the isocyanate compound were added. Under nitrogen. atmosphere, they were stirred for 4 hours at 100° C. An isocyanate terminated prepolymer was obtained. The NCO index was 6.02. The isocyanate group content was 6.0 weight %. Viscosity was 10,480 mPa·s/25° C.

500 weight parts of the resulting isocyanate terminated prepolymer was sealed in a metal container under nitrogen. atmosphere. They were stored in an oven for 14 days at 60° C. The storage stability test was conducted. After the storage stability test, the isocyanate content of the isocyanate terminated prepolymer was 5.8 weight %. Viscosity was 12,500 mPa·s/25° C.

Comparative Example 21
Isocyanate Terminated Prepolymer EE 788.2 weight parts of polymer dispersed polyol G obtained in Comparative Example 13 and 211.8 weight parts of cosmonate PH as the isocyanate compound were added. Under nitrogen. atmosphere, this was stirred for 4 hours at 100° C. An isocyanate terminated prepolymer was obtained. The NCO index was 6.38. The isocyanate group content was 5.8 weight %. Viscosity was 98,000 mPa·s/25° C.

500 weight parts of the resulting isocyanate terminated prepolymer was sealed in a metal container under nitrogen. atmosphere. This was stored in an oven for 14 days at 60° C. The storage stability test was conducted. The isocyanate terminated prepolymer after the storage stability test had was gelation, and measurements of the free isocyanate content and viscosity was not possible.

The results of Example 24 and Comparative Example 21 are summarized in Table 10. The NCO index in the table represents the ratio of the isocyanate group concentration with respect to the active hydrogen concentration. The isocyanate content in the isocyanate terminated prepolymer and the viscosity could not be measured for Comparative Example 21 after the storage stability test.

TABLE 10

Example 24 and Comparative Example 21

|  |  | EXAMPLE 24 | COM. EX. 21 |
|---|---|---|---|
| Isocyanate terminated prepolymer | | D | EE |
| Polymer dispersed polyol | Example 13 | B | — |
|  | Comparative Example 13 | — | G |
| NCO Index | | 6.02 | 6.38 |
| Isocyanate group content (weight %) | | 6.0 | 5.8 |
| Viscosity (mPa · s/25° C.) | | 10480 | 98000 |
| Storage stability test | Isocyanate group content (weight %) | 5.8 | Not measurable |
|  | Viscosity (mPa · s/25° C.) | 12500 | |

Comments 4 on Examples

In Example 24 and Comparative Example 21, the isocyanate terminated prepolymer of the present invention in which polymer dispersed polyol used phosphazenium catalyzed polyoxyalkylene polyol as the dispersal medium has a lower viscosity compared to isocyanate terminated prepolymer which polymer dispersed polyol used DMC catalyzed polyoxyalkylene polyol as its dispersal medium. The isocyanate terminated prepolymer of the present invention also has excellent storage stability.

Isocyanate terminated prepolymer in which the content of free isocyanate compound The properties of the polyoxyalkylene polyols and the isocyanate terminated prepolymers of Examples 25~27, Comparative Examples 22~25 are measured by the method described below.

(11) Hydroxyl value (OHV, units: mgKOH/g), total degree of unsaturation (C=C, units: meq./g), viscosity ($\eta$, units: mPa·s/25° C.), CPR (units: non dimensional)

They were determined by the method described in JIS K-1557.

(12) Viscosity of the isocyanate terminated prepolymer (will be abbreviated as $\eta_{pre}$, units: mPa·s/25° C.).

It was determined by the method described in JIS K-7301.

(15) Concentration of free isocyanate compound in prepolymer (units: weight %)

It was determined by gas chromatography (GC).

With regard to the synthesis of polyoxyalkylene polyol, phosphazenium compound b (P5NMe2OH) was used. For the comparison, DMC described above and cesium hydroxide (in the form of 50 weight % cesium hydroxide aqueous solution) from CHEMETALL GMBH. were used.

When the free isocyanate compound was vacuum removed from the crude isocyanate terminated prepolymer, we used a molecular distillation device (Shibata Science Co.: model MS-800). It was referred to as distillation device.

Example 25

Isocyanate Terminated Prepolymer A2

In a 500 ml four port flask which were equipped with an agitating device, nitrogen inlet pipe, and thermometer, 0.020 moles of P5NMe2OH and 0.04 moles of toluene for every 1 mole of dipropylene glycol were added. While nitrogen entered through a capillary tube, vacuum dehydration and toluene removal were conducted for 3 hours under conditions of 105° C., 20 mm Hgabs. (2,660 Pa) or less. Afterwards, the flask content was placed in the autoclave. After conducting nitrogen substitution, the reaction temperature was made to be 80° C. from vacuum condition of 10 mmHgabs. (1,330 Pa), and with maximum reaction pressure of 4.0 kgf/cm² (392 kPa), addition polymerization of propylene oxide was conducted until OHV of 18.8 mgKOH/g was reached. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained phosphazenium compound, 10 weight parts of ion exchange water was added. Next, for every 1 mol of phosphazenium compound in the crude polyoxyalkylene polyol, 2.2 moles of phosphoric acid (in the form of 75.1 weight % aqueous solution) was added in. Neutralization reaction was conducted for 2 hours at 80° C. After completion of the neutralization reaction, 1500 ppm of BHT was added for every 100 weight parts of crude polyoxyalkylene polyol. Vacuum dehydration was conducted, and while the pressure inside the autoclave was 100 mmHgabs (13kPa), 20,000 ppm of adsorbent (Tomita Pharmaceutical Co. trade name: AD-600NS, same as below) was added. While further dehydrating under vacuum, the same operation was conducted for 4 hours at a final temperature at 105° C. and pressure of, 10 mmHg abs. (1,330 Pa) or less. Next, after pressuring from vacuum to atmospheric with nitrogen, vacuum filtration was conducted with 5C filter paper from Advantech Toyo Corp. Recovery of polyoxyalkylene polyol was conducted (acid neutralization removal method).

After removing the phosphazenium compound, the OHV of polyoxyalkylene polyol was 18.8 mg KOH/g, C=C 0.020 meq./g, viscosity ($\eta$) 2,300 mP·s/25° C., CPR was 0.5.

Next, in 2L four port flask which were equipped with an agitating device, nitrogen inlet pipe, dropping funnel, cooling water condenser, and thermometer, 870.9 g of the above polyoxyalkylene polyol and 22.3 g of dipropylene glycol (Mitsui Chemicals Inc., same as below) was added in. Under nitrogen atmosphere, 354.1 g of a mixture of 2,4- and 2,6-toluene diisocyanate compound [weight ratio of 2,4-TDI 97.5 weight %, 2,6-TDI of 2.5 weight %, cosmonate T-100, Mitsui Chemicals Inc., same as below] with an inner temperature in the range of 40–45° C. was dripped over 20 minutes. After dripping the polyisocyanate compound, the temperature was raised to 70° C., and the reaction was conducted for 4 hours at the same temperature.

Next, the temperature was raised to 95° C., and the reaction was conducted for 5 hours at this temperature. The inner temperature was lowered to 60° C., and the reaction was conducted for 12 hours at the same temperature. A crude isocyanate terminated prepolymer was obtained. The NCO index was 6.20. Next, using a molecular distillation device, while agitating, under conditions of temperature 110° C., pressure 0.01 mmHgabs. (1.33 Pa), vacuum removal process of unreacted isocyanate compound from the crude isocyanate terminated prepolymer was conducted for 3 hours. The resulting isocyanate terminated prepolymer had a viscosity ($\eta_{pre}$) of 8,950 mPa·s/25° C. The free isocyanate compound content in the prepolymer was 0.2 weight %.

Example 26

Isocyanate Terminated Prepolymer B2

Into a 500 ml four port flask which were equipped with an agitating device, nitrogen inlet pipe, and thermometer, 0.012 moles of P5NMe2OH and 0.08 moles of toluene for every 1 mole of glycerin were added. While nitrogen entered through a capillary tube, vacuum dehydration and toluene removal were conducted for 4 hours under condition of 105° C., 10 mm Hgabs. (1,330 Pa) or less. Afterwards, the flask content was placed in the autoclave. After conducting nitrogen substitution, the reaction temperature was made to be 80° C. from vacuum conditions of 10 mmHgabs. (1,330 Pa), and with a maximum reaction pressure of 4.0 kgf/cm² (392 kPa), addition polymerization of propylene oxide was conducted until OHV of 33.6 mgKOH/g was reached. Once the internal pressure of the autoclave stabilized at a constant pressure, vacuum treatment was conducted for 30 minutes at 105° C., 5 mm Hgabs (665 Pa). Crude polyoxyalkylene polyol was obtained.

For every 100 weight parts of crude polyoxyalkylene polyol which contained phosphazenium compound, 10 weight parts of ion exchange water was added. Next, for every 1 mole of phosphazenium compound in the crude polyoxyalkylene polyol, 2.2 moles of phosphoric acid (in the form of 75.1 weight % aqueous solution) was added in. Neutralization reaction was conducted for 2 hours at 80° C. After completion of the neutralization reaction, 1500 ppm of t-butyl hydroxytoluene (BHT) was added for every 100 weight parts of crude polyoxyalkylene polyol. Vacuum dehydration was conducted, and while the pressure inside the autoclave was 200 mmHgabs (26 kPa), 15,000 ppm of adsorbent AD-600NS (Tomita Pharmaceutical Co.) was added. While further dehydrating under a vacuum, the same operations were conducted for 4 hours at a final temperature at 105° C. and pressure of, 10 mmHg abs. (1,330 Pa) or less. After pressuring from vacuum to atmospheric with nitrogen, vacuum filtration was conducted with 5C filter paper from Advantech Toyo Corp. Recovery of polyoxyalkylene polyol was conducted (acid neutralization removal method).

After removing the phosphazenium compound, the OHV of polyoxyalkylene polyol was 33.6 mg KOH/g, C=C 0.016 meq./g, viscosity (η) 830 mPa·s/25° C., CPR was 1.0.

Next, into 2L four port flask which were equipped with an agitating device, nitrogen inlet pipe, dropping funnel, cooling water condenser, and thermometer, 1220.2 g of the above polyoxyalkylene polyol was introduced. Under nitrogen atmosphere, 385.2 g of cosmonate T-100 with an inner temperature in the range of 40 45° C. was dripped over 20 minutes. After dripping the polyisocyanate compound, the temperature was raised to 70° C., and the reaction was conducted for 4 hours at the same temperature. Next, the temperature was raised to 95° C., and the reaction was conducted for 3 hours at this temperature. The inner temperature was lowered to 60° C., and the reaction was conducted for 12 hours at the same temperature. A crude isocyanate terminated prepolymer was obtained. The NCO index was 5.80. Next, using a molecular distillation device, while agitating, under condition of temperature 110° C., pressure 0.01 mmHgabs. (1.33 Pa), vacuum removal process of unreacted isocyanate compound from the crude isocyanate terminated prepolymer was conducted for 3 hours. The resulting isocyanate terminated prepolymer had a viscosity ($\eta_{pre}$) of 9,850 mPa·s/25° C. The free isocyanate compound content in the prepolymer was 0.3 weight %.

Example 27

Isocyanate Terminated Prepolymer C2

Into a 500 ml four port flask which were equipped with an agitating device, nitrogen inlet pipe, and thermometer, 0.020 moles of P5NMe2OH and 0.04 moles of toluene for every 1 mole of ethylene glycol were added. While nitrogen entered through a capillary tube, vacuum dehydration and toluene removal were conducted for 3 hours under condition of 105° C., 10 mm Hgabs. (1,330 Pa) or less. Afterwards, the flask content was placed in the autoclave. After conducting nitrogen substitution, the reaction temperature was made to be 70° C. from vacuum conditions of 10 mmHgabs. (1,330 Pa), and with a maximum reaction pressure of 4 kgf/cm² (392 kPa), addition polymerization of propylene oxide was conducted until OHV of 32 mgKOH/g was reached. Pressurization by nitrogen was conducted until a gauge pressure of 1.2 kgf/cm² (219 kPa) was reached. Under conditions of reaction temperature 70° C., the maximum reaction pressure of 4 kgf/cm² (392 kPa), addition polymerization of ethylene oxide was conducted until OHV of 28 mg KOH/g was achieved. Once the internal pressure of the autoclave stabilized at a constant pressure, vacuum treatment was conducted for 20 minutes at 105° C., 5 mm Hgabs (665 Pa). Next, the reaction temperature was made to be 70° C. from atmospheric conditions, and with a maximum reaction pressure of 4 kgf/cm² (392 kPa), addition polymerization of propylene oxide was conducted until OHV of 18.4 mgKOH/g was reached. Crude polyoxyalkylene polyol was obtained.

For every 100 weight parts of crude polyoxyalkylene polyol which contained phosphazenium compound, 12 weight parts of ion exchange water was added. Next, for every 1 mol of phosphazenium compound in the crude polyoxyalkylene polyol, 2.5 moles of phosphoric acid (in the form of 75.1 weight % aqueous solution) was added in. Neutralization reaction was conducted for 2 hours at 80° C. After completion of the neutralization reaction, 1500 ppm of t-butyl hydroxytoluene (BHT) was added for every 100 weight parts of crude polyoxyalkylene polyol. Vacuum dehydration was conducted, and while the pressure inside the autoclave was 100 mmHgabs (13 kPa), 15,000 ppm of adsorbent AD-600NS (Tomita Pharmaceutical Co.) was added. While further dehydrating under a vacuum, the same operation was conducted for 4 hours at a final temperature at 105° C. and pressure of, 10 mmHg abs. (1,330 Pa) or less. After pressuring from vacuum to atmospheric pressure with nitrogen, vacuum filtration was conducted with 5C filter paper from Advantech Toyo Corp. Recovery of polyoxyalkylene polyol was conducted (acid neutralization removal method). After removing the phosphazenium compound, the OHV of polyoxyalkylene polyol was 18.5 mg KOH/g, C=C 0.022 meq./g, viscosity (η) 1,100 mPa·s/25° C., CPR was 0.2.

Next, into a 2L four port flask which were equipped with an agitating device, nitrogen inlet pipe, dropping funnel, cooling water condenser, and thermometer, 953.5 g of the above polyoxyalkylene polyol was introduced. Under nitrogen atmosphere, 197.7 g of norbornane diisocyanate (Mitsui Chemicals Inc.) with an inner temperature in the range of 40–45° C., was dripped over 20 minutes. After dripping the polyisocyanate compound, the temperature was raised to 70° C., and the reaction was conducted for 3 hours at the same temperature.

Next, the temperature was raised to 95° C., and the reaction was conducted for 4 hours at this temperature. The inner temperature was lowered to 60° C., and the reaction was conducted for 15 hours at the same temperature. A crude isocyanate terminated prepolymer was obtained. The NCO index was 5.50. Next, using a molecular distillation device, while agitating, under condition of temperature 160° C., pressure 0.01 mmHgabs. (1.33 Pa), vacuum removal process of unreacted isocyanate compound from the crude isocyanate terminated prepolymer was conducted for 3 hours. The resulting isocyanate terminated prepolymer had a viscosity ($\eta_{pre}$) of 12,350 mPa·s/25° C. The free isocyanate compound content in the prepolymer was 0.8 weight %.

The comparative examples are indicated below. In Comparative Example 22, we used the polyoxyalkylene polyol obtained in Example 25. It related to a prepolymer with an altered NCO index. In Comparative Examples 23 and 25, DMC which was described above was used as the polymerization catalyst for alkylene oxide. The initiator of DMC catalized polyoxyalkylene polyol was a polyoxyalkylene polyol which was manufactured by using potassium hydroxide. Furthermore, when ethylene oxide was addition polymerized, 30 weight % potassium methylate methanol solution (Wako Pure Chemical Industries Ltd., abbreviated as KOMe) was used as a catalyst. In Comparative Example 24, cesium hydroxide (CsOH) was used as the polymerization catalyst for the alkylene oxide.

Comparative Example 22

Isocyanate Terminated Prepolymer D2

Into a 2L four port flask which were equipped with an agitating device, nitrogen inlet pipe, dropping funnel, cooling water condenser, and thermometer, 720.3 g of the polyoxyalkylene polyol obtained in Example 25 and 18.4 g of dipropylene glycol (Mitsui Chemicals Inc.) were introduced. Under nitrogen atmosphere, 99.2 g of cosmonate T-100 with an inner temperature in the range of 40~45° C. was dripped over 20 minutes. After dripping the polyisocyanate compound, the temperature was raised to 70° C., and the reaction was conducted for 4 hours at the same temperature. Next, the temperature was raised to 95° C., and the reaction was conducted for 5 hours at this temperature. The inner temperature was lowered to 60° C., and the reaction was conducted for 12 hours at the same temperature. A crude isocyanate terminated prepolymer was obtained. The NCO index was 2.10.

The resulting isocyanate terminated prepolymer had a viscosity ($\eta_{pre}$) of 12,500 mPa·s/25° C. The free isocyanate compound content in the prepolymer was 2.0 weight %.

Comparative Example 23
Isocyanate Terminated Prepolymer E2

For every 100 weight parts of polypropylene polyol Diol 400 (Mitsui Chemicals Inc.) in which propylene oxide is added to propylene glycol, 0.03 weight parts of DMC was added. Vacuum dehydration was conducted for 3 hours at temperature of 105° C. and pressure of 10 mmHgabs. (1,330 Pa) or less. Next, this compound was placed in the autoclave. After conducting nitrogen substitution, under condition of reaction temperature 80° C. from vacuum condition and at a maximum reaction pressure of 4 kgf/cm² (392 kPa), propylene oxide was added until OHV of 18.7 mgKOH/g was reached. A crude polyoxyalkylene polyol which contained DMC was obtained. For every 100 weight parts of this polyoxyalkylene polyol, 2.8 weight parts of 30 weight % potassium methylate (KOMe) methanol solution was added. Methanol removal reaction was conducted for 2 hours at 90° C., 20 mmHgabs. (2,660 Pa). Next, 3 weight parts of water and 5 weight parts of AD-600NS (Tomita Pharmaceutical Co.) were added. This was agitated for 2 hours at 90° C., under nitrogen. atmosphere. Using 5C filter paper from Advantech Toyo Corp., vacuum filtration was conducted. Vacuum dehydration was conducted for 2 hours under condition of 120° C., 10 mmHgabs. (1,330 Pa) or less. DMC removal process was conducted.

For every 1 mol of potassium in the crude polyoxyalkylene polyol, 1.5 moles of phosphoric acid (75.1 weight % phosphoric acid solution) was added in. For every 100 weight parts of crude polyoxyalkylene polyol, 25 weight parts of ion exchange water was added in. Neutralization reaction was conducted for 2 hours at 90° C. Next, 1500 ppm of BHT, which is an oxidation inhibitor, were added. Vacuum dehydration was conducted. Under conditions of 105° C., 300 mmHgabs. (40 kPa), 8,000 ppm of adsorbent (Kyouwa Chemical Industry Co. trade name: KW-700SN, same as below) was added. While water was removed, vacuum dehydration was conducted for 3 hours under final condition of 105° C., 100 mmHgabs. (1,330 Pa). After pressuring with nitrogen, vacuum filtration was conducted using 5C filter paper from Advantech Toyo Corp. Recovery of polyoxyalkylene polyol was conducted. After the potassium removal operation, the OHV of polyoxyalkylene polyol was 18.7 mg KOH/g, C=C 0.021 meq./g, viscosity ($\eta$) 3,100 mPa·s/25° C., CPR was 5.5.

Next, into a 2L four port flask which were equipped with a agitating device, nitrogen inlet pipe, dropping funnel, cooling water condenser, and thermometer, 871.1 g of the polyoxyalkylene polyol described above and 22.4 g of dipropylene glycol were introduced. Under nitrogen atmosphere, 354.5 g of cosmonate T-100 with an inner temperature in the range of 40~45° C. was dripped over 20 minutes. After dripping the polyisocyanate compound, the temperature was raised to 70° C., and the reaction was conducted for 4 hours at the same temperature. Next, the temperature was raised to 95° C., and the reaction was conducted for 5 hours at this temperature. The inner temperature was lowered to 60° C., and the reaction was conducted for 12 hours at the same temperature. A crude isocyanate terminated prepolymer was obtained. The NCO index was 6.20. While agitating, under conditions of 110° C., 0.01 mmHgabs. (1.33 Pa), vacuum removal process of the unreacted isocyanate compound in the crude isocyanate terminated prepolymer was conducted for 3 hours using a molecular distillation device. The resulting isocyanate terminated prepolymer had a viscosity ( pre) of 19,500 mPa·s/25° C. The free isocyanate compound content in the prepolymer was 0.4 weight %.

Comparative Example 24
Isocyanate Terminated Prepolymer F2

Into a 500 ml four port flask which were equipped with an agitating device, nitrogen inlet pipe, and thermometer, 0.36 moles of CsOH (50 weight % aqueous solution) for every 1 mole of glycerin were added. While nitrogen entered through a capillary tube, vacuum dehydration was conducted for 3 hours under conditions of 105° C., 10 mm Hgabs. (1,330 Pa) or less. Afterwards, the flask content was placed in the autoclave. After conducting nitrogen substitution, the reaction temperature was made to be 80° C. from vacuum conditions of 10 mmHgabs. (1,330 Pa), and with a maximum reaction pressure of 4 kgf/cm² (392 kPa), addition polymerization of propylene oxide was conducted until OHV of 33.4 mgKOH/g was reached. Once the internal pressure of the autoclave stabilized at a constant pressure, vacuum treatment was conducted for 20 minutes at 105° C., 10 mm Hgabs (1,330 Pa). Crude polyoxyalkylene polyol was obtained.

For every 100 weight parts of crude polyoxyalkylene polyol which contained cesium, 12 weight parts of ion exchange water was added. Next, for every 1 mol of cesium in the crude polyoxyalkylene polyol, 1.1 moles of oxalic acid (in the form of 8.5 weight % aqueous solution) was added in. Neutralization reaction was conducted for 2 hours at 80° C. After completion of the neutralization reaction, 1500 ppm of BHT was added for every 100 weight parts of crude polyoxyalkylene polyol. Vacuum dehydration was conducted, and while the pressure inside the autoclave was 100 mmHgabs (13 kPa), 5,000 ppm of adsorbent AD-600NS (Tomita Pharmaceutical Co.) was added. While further dehydrating under vacuum, the same operation was conducted for 4 hours at a final temperature at 105° C. and pressure of, 10 mmHg abs. (1,330 Pa) or less. After pressuring from vacuum to atmospheric pressure with nitrogen, vacuum filtration was conducted with 5C filter paper from Advantech Toyo Corp. Recovery of polyoxyalkylene polyol was conducted (acid neutralization removal method). After removing the cesium, the OHV of polyoxyalkylene polyol was 33.5 mg KOH/g, C=C 0.032 meq./g, viscosity ($\eta$) 940 mPa·s/25° C., CPR was 0.5.

Next, into a 2L four port flask which were equipped with an agitating device, nitrogen inlet pipe, dropping funnel, cooling water condenser, and thermometer, 1235.1 g of the polyoxyalkylene polyol described above was introduced. Under nitrogen atmosphere, 395.1 g of cosmonate T-100 with an inner temperature in the range of 40~45° C. was dripped over 20 minutes. After dripping the polyisocyanate compound, the temperature was raised to 70° C., and the reaction was conducted for 4 hours at the same temperature.

Next, the temperature was raised to 95° C., and the reaction was conducted for 3 hours at this temperature. The inner temperature was lowered to 60° C., and the reaction was conducted for 12 hours at the same temperature. A crude isocyanate terminated prepolymer was obtained. The NCO index was 5.80. While agitating, under condition of 110° C., 0.01 mmHgabs. (1.33 Pa) pressure, vacuum removal process of the unreacted isocyanate compound in the crude isocyanate terminated prepolymer was conducted for 3 hours using a molecular distillation device. The resulting isocyanate terminated prepolymer had a viscosity ($\eta_{pre}$) of 10,800 mPa·s/25° C. The free isocyanate compound content in the prepolymer was 0.3 weight %.

Comparative Example 25
Isocyanate Terminated Prepolymer G2

For every 100 weight parts of polypropylene polyol (referred to as EG 400, OHV 280 mgKOH/g) in which propylene oxide is addition polymerized to ethylene glycol using potassium hydroxide as the catalyst in the prior method, 0.05 weight parts of DMC was added. Vacuum dehydration was conducted for 3 hours at temperature of 105° C. and pressure of 10 mmHgabs. (1,330 Pa) or less. Next, this compound was placed in the autoclave. Under condition of reaction temperature 80° C., maximum reaction pressure of 4 kgf/cm² (392 kPa), propylene oxide was added until OHV of 32.0 mgKOH/g was reached. A crude polyoxyalkylene polyol which contained DMC was obtained.

For every 100 weight parts of this polyoxyalkylene polyol, 2.9 weight parts of 30 weight percent potassium methylate (KOMe) methanol solution was added. Methanol removal reaction was conducted for 2 hours at 90° C., 20mmHgabs. (2,660 Pa). Next, 3 weight parts of water and 5 weight parts of adsorbent AD-600NS (Tomita Pharmaceutical Co.) were added. This was agitated for 2 hours at 90° C., under nitrogen. atmosphere. Using 5C filter paper from Advantech Toyo Corp., vacuum filtration was conducted. After filtration, vacuum dehydration was conducted for 2 hours under condition of 120° C., 10 mmHgabs. (1,330 Pa) or less. DMC removal process was conducted.

In order to addition polymerize ethylene oxide, for every 100 weight parts of polyoxypropylene polyol after removal of DMC, 2.5 weight parts of 30 weight % KOMe methanol solution was added. Methanol removal reaction was conducted for 3 hours at 100° C., 10mmHgabs. (1,330 Pa) or less. This compound was placed in the autoclave. After nitrogen substitution, under conditions of reaction temperature 80° C., maximum reaction pressure of 4 kgf/cm² (392 kPa), ethylene oxide was added in and reacted until OHV of 28.0 mgKOH/g was reached. After the reaction, vacuum processing was conducted, and a crude polyoxyalkylene polyol was obtained. Furthermore, in order to conduct addition polymerization of propylene oxide using DMC, potassium was removed from polyoxyalkylene polyol.

For every 1 mol of potassium in the crude polyoxyalkylene polyol, 1.2 moles of phosphoric acid (75.1 weight % phosphoric acid solution) was added in. For every 100 weight parts of crude polyoxyalkylene polyol, 4 weight parts of ion exchange water was added in. Neutralization reaction was conducted for 2 hours at 90° C. 8,000 ppm of adsorbent KW-700SN (Kyowa Chemical Industry Co.) was added. Under reduced pressure, while water was removed, vacuum dehydration was conducted for 3 hours under the final condition of 105° C., 10 mmHgabs. (1,330 Pa). After returning to atmospheric pressure with nitrogen, vacuum dehydration was conducted using 5C filter paper from Advantech Toyo Corp. Recovery of polyoxyalkylene polyol was conducted. For every 100 weight parts of this polyoxyalkylene polyol, 0.01 weight parts of DMC was added. Under conditions of 105° C., 10 mmHgabs. (1,330 Pa), vacuum dehydration was conducted for 3 hours. Under conditions of reaction temperature 80° C., maximum reaction pressure of 4 kgf/cm² (392 kPa), addition polymerization of propylene oxide was conducted until OHV of 18.6 mgKOH/g was reached. The removal process of the DMC from this polyoxyalkylene polyol was the same method which was used for KOMe as described above. After the potassium removal operation, the OHV of polyoxyalkylene polyol was 18.6 mg KOH/g, C=C 0.029 meq./g, viscosity ($\eta$) 3200 mPa·s/25° C., CPR was 2.0.

Next, into a 2L four port flask which were equipped with an agitating device, nitrogen inlet pipe, dropping funnel, cooling water condenser, and thermometer, 926.3 g of the polyoxyalkylene polyol described above was introduced. Under nitrogen atmosphere, 192.4 g of norbornane diisocyanate (Mitsui Chemicals Inc.) with an inner temperature in the range of 40~45° C. was dripped over 20 minutes. After dripping the polyisocyanate compound, the temperature was raised to 70° C., and the reaction was conducted for 3 hours at the same temperature. Next, the temperature was raised to 95° C., and the reaction was conducted for 4 hours at this temperature. The inner temperature was lowered to 60° C., and the reaction was conducted for 15 hours at the same temperature. A crude isocyanate terminated prepolymer was obtained. The NCO index was 5.50. While agitating, under condition of 160° C., 0.01 mmHgabs. (1.33 Pa), vacuum removal process of the unreacted isocyanate compound in the crude isocyanate terminated prepolymer was conducted for 3 hours using a molecular distillation device. The resulting isocyanate terminated prepolymer had a viscosity ($\eta_{pre}$) of 21,200 mPa·s/25° C. The free isocyanate compound content in the prepolymer was 1.3 weight %.

Referring to Table 11, for Examples 25~27 and Comparative Examples 22–25, the OHV, viscosity ($\eta$), C=C, CPR, and isocyanate terminated prepolymer viscosity ($\eta_{pre}$), free isocyanate content in the prepolymer are summarized. In the Table, for the initiators, DPG is an abbreviation for dipropylene glycol, Gly for glycerin, EG for ethylene glycol. Diol 400 is a polyol in which alkylene oxide is addition polymerized to propylene glycol, EG400 is a polyol with OHV of 280 mgKOH/g in which alkylene oxide is addition polymerized to ethylene glycol. Furthermore, AO stands for alkylene oxide, PO stands for propylene oxide, EO stands for ethylene oxide. For the catalysts, phosphazenium compound is abbreviated as PZ, double metal cyanide complex as DMC, cesium hydroxide as CsOH, and potassium methylate as KOMe. The isocyanate terminated prepolymer is abbreviated as prepolymer. For the polyisocyanate compound, the mixture of 2,4- and 2,6-tolylene diisocyanate is abbreviated as T-100, norbornane diisocyanate is abbreviated as NBDI. Furthermore, the NCO index is the ratio of the isocyanate concentration with respect to the hydroxyl concentration of the polyol.

Example 28

60 weight parts of prepolymer C2 obtained from Example 27 and 40 weight parts of prepolymer (Mitsui Chemicals Inc., trade name: HL-901) which is derived from polytetramethylene glycol and which has a free isocyanate compound content of 0.3 weight % were uniformly mixed at 80° C., under nitrogen. atmosphere. Vacuum defoaming was conducted. This mixture prepolymer is called isocyanate terminated prepolymer H2.

TABLE 11

Example 25–27, Comparative Examples 22–25

|  |  | Examples | | | Comparative Examples | | | |
|---|---|---|---|---|---|---|---|---|
|  |  | 25 | 26 | 27 | 22 | 23 | 24 | 25 |
| #19 | Prepolymer | A2 | B2 | C2 | D2 | E2 | F2 | G2 |
|  | Initiator | DPG | Gly | EG | DPG | Diol400 | Gly | EG400 |
|  | Catalyst | PZ | PZ | PZ | PZ | DMC | CsOH | #23 |
|  | Alkylene oxide addition type | PO | PO | #24 | PO | PO | PO | #24 |
|  | Catalyst removal method | Acid neutralization | | | | | | |
|  | OHV (mgKOH/g) | 18.8 | 33.6 | 18.5 | 18.8 | 18.7 | 33.5 | 18.6 |
|  | C = C (meq./g) | 0.02 | 0.016 | 0.022 | 0.020 | 0.021 | 0.032 | 0.029 |
|  | η (mPa · s/25° C.) | 2300 | 830 | 1100 | 2300 | 3100 | 940 | 3200 |
|  | CPR | 0.5 | 1.0 | 0.2 | 0.5 | 5.5 | 0.5 | 2.0 |
| #20 | Blended polyol | DPG | None | None | DPG | DPG | None | None |
|  | Polyisocyanate | T-100 | T-100 | NBDI | T-100 | T-100 | T-100 | NBDI |
|  | NCO Index | 6.20 | 5.80 | 5.50 | 2.10 | 6.20 | 5.80 | 5.50 |
|  | #21 V.r.m. of crude prepolymer | Yes | Yes | Yes | No | Yes | Yes | Yes |
|  | $\eta_{pre}$ (mPa · s/25° C.) | 8950 | 9850 | 12350 | 12500 | 19500 | 10800 | 21200 |
|  | #22 F. isocyante c.c. (wt. %) | 0.2 | 0.3 | 0.8 | 2.0 | 0.4 | 0.3 | 1.3 |

19: Characteristics of polyol
20: Characteristics of prepolymer
21: Vacuum removal method of crude prepolymer
22: Free isocyanate compound content (wt. %)
23: DMC/KOMe/DMC
24: PO/EO/PO

Comments 5 on Examples

From Examples 25~27, Comparative Examples 22~25, the isocyanate terminated prepolymer of the present invention, in which phosphazenium compound catalyzed polyoxyalkylene polyol was used and in which vacuum removal process of unreacted isocyanate compounds was conducted, has a lower viscosity prepolymer compared to ones where DMC was used. The free isocyanate compound content was also lower with the present invention. Compared with ones which used cesium hydroxide (CsOH), the viscosity of the prepolymer of present invention was lower. As a result, because reductions in plasticizers, organic solvents are possible, it has excellent processability. Furthermore, with DMC catalyzed system, for the triblock copolymerization of propylene oxide, ethylene oxide, and propylene oxide, a complicated reaction procedure was necessary at the time of reaction (Comparative Example 25). In the phosphazenium compound system of the present invention, this complicated reaction procedure was unnecessary (Example 27), and the manufacture of a low viscosity isocyanate terminated prepolymer was possible.

Next, in order to illustrate the effects of the isocyanate terminated prepolymer of the present invention, and in order to study the storage stability of the prepolymer, a polyurethane resin was produced. Its mechanical properties and outwards appearance were evaluated.

Polyurethane Resin

Isocyanate terminated prepolymer which had been vacuum defoamed and adjusted to 80° C. and 4,4'-diamino-3,3'-diethyl-5,5'-dimethyl diphenylmethane (Ihara Chemical Industry Co.) which had been vacuum defoamed and adjusted to 120° C. were stirred and mixed for 1 minute in a manner so as not to mix any air bubbles. The usage amount of this amine compound which was used as chain extender was an amount equivalent to NCO index of 1.05.

The above mixture was uniformly poured into a Teflon-coated metal mold the dimensions of length 20 cm, width 20 cm, thickness 2 mm which had been heated to 100° C. The mixture was cured at 100° C. for 24 hours. After releasing from the metal mold, it was left for 1 week in a constant temperature, constant humidity oven at 23° C., relative humidity of 40% Afterwards, the property measurements were conducted.

(16) Mechanical properties of polyurethane resin (hardness, strength at break, elongation impact resilience, tear strength, and hysterisis)

These were measured following JIS K-6301, JIS K-7312.

(17) Storage stability (units: %) of isocyanate terminated prepolymer

The evaluation of storage stability was calculated by measuring the viscosity (a) of the prepolymer right after manufacturing, and then measuring the viscosity (b) of the prepolymer after storing for 14 days at 60° C. The viscosity rate of change was calculated with the formula [(b−a)×100/a].

The test sample for measuring viscosity (b) was a prepolymer which was sealed in a metal container and stored in a 60° C. oven for 14 days. The measurement method for the viscosity was by the method described in JIS K-7301.

(18) Evaluation of appearance of polyurethane resin

This was evaluated by the feel of the tack (stickiness) of the surface of the polyurethane resin. The evaluation standards were described below.

○: little tack,
Δ: some tack,
X: large amount of tack

(17) Water resistance of polyurethane resin (unit: %)

The sample for measurement of properties was submerged in heated 90° C. water for 3 days. Using the method (14) described above, the strength was measured. The strength (c) prior to submersion in hot water and the strength at break (d) after submersion was used for the formula [(d×100)/c].

Theses results of properties for the polyurethane resin are shown in table 12.

TABLE 12

Examples 29–31, Comparative Examples 26–28

|  |  | Examples | | | Comparative Examples | | |
| --- | --- | --- | --- | --- | --- | --- | --- |
|  |  | 29 | 30 | 31 | 26 | 27 | 28 |
|  | Isocyanate terminated prepolymer | A2 | B2 | H2 | D2 | E2 | F2 |
|  | Storage stability of prepolymer (%) | 13 | 14 | 12 | 19 | 35 | 18 |
| #25 | Hardness (Shore A) | 61A | 62A | 58A | 58A | 60A | 55A |
|  | Strength at break (kPa) | 3920 | 3040 | 3230 | 3140 | 3330 | 2160 |
|  | Elongation (%) | 870 | 320 | 630 | 720 | 700 | 300 |
|  | Impact resilience (%) | 56 | 63 | 57 | 45 | 48 | 59 |
|  | Tensile strength (kPa) | 3140 | 1760 | 1860 | 2060 | 2260 | 980 |
|  | Hysterisis (%) | 19 | 12 | 20 | 35 | 23 | 32 |
| #26 | #27 M. R. of break. Strength (%) | 95 | 85 | 85 | 70 | 81 | 67 |
|  | Outward appearance | ○ | ○ | ○ | ○ | Δ | × |

25: Mechanical properties of polyurethane
26: Water resistance
27: Maintenance rate of strength at break Comments 6 on Examples From Examples 29~31, Comparative Examples 26~28, the polyurethane resin which used isocyanate terminated prepolymer in which phosphazenium catalyzed polyoxyalkylene polyol was used and in which the unreacted isocyanate compound was removed had advantages over polyurethane resin which used cesium hydroxide or DMC-catalyzed isocyanate terminated prepolymer. These advantages were increased hardness, strength at break, elongation, impact resilience, tear strength, water resistance and decreased hysterisis. Furthermore, the polyurethane resin of the present invention had little tack, and there was little surface contamination. Furthermore, with the polyoxyalkylene polyol of the present invention in which a specified phosphazenium removal process was conducted, an isocyanate terminated prepolymer with excellent storage stability can be manufactured.

Polyoxyalkylene polyamine and polyurethane urea resin

(18) Hydroxyl value (units: mgKOH/g) of polyoxyalkylene polyol

Determined by the measurement method described in JIS K-1557.

(19) Amine value (units: mgKOH/g) of polyoxyalkylene polyamine

Determined by "The quantitative method for organic compounds by functional group" (Frederick T. Weiss, translated by Eshima Akira, published by Hirokawa Shoten, 1974).

The polyoxyalkylene polyamine in a methanol solvent was reacted with a salicyl aldehyde. Only the primary amino group was made to be a weakly basic azomethine. Next, potential difference titration was conducted with an isopropanol solution of hydrochloric acid. The first point of inflection was for the secondary and tertiary amine values (f), the next point of inflection was for the total amine value (e), and the difference (e–f) was the primary amine value (c) (azomethine titration method).

The polyoxyalkylene polyamine was reacted with acetic acid anhydride. The primary amino group and the secondary amino group was acetylated. The remaining tertiary amino group was titrated with acetate perchlorate solution. (acetylation-perchlorate method)

In other words, by the azomethine titration method, total amine value (e), primary amine value (c), secondary and tertiary amine values (f) could be separately quantified. Furthermore, by the acetylation-perchlorate method, tertiary amine value (g) was quantified. Secondary amine value (d) could be calculated using the following equation (1).

$$e = c + d + g = c + f \quad \text{(equation 1)}$$

(20) Active hydrogen value of polyoxyalkylene polyamine. (units: mgKOH/g)

Determined by following the method described in JIS K-0070. The active hydrogen value (a) of polyoxyalkylene polyamine was represented by the total sum of OHV (b) and primary amine value (c) and secondary amine value (d), which was determined from (equation 1).

By the analysis method in the above (19) and (20), the hydroxyl group, primary amino group, secondary amino group, and tertiary group at the molecular terminus of the polyoxyalkylene polyamine could all be determined.

(21) Viscosity of polyoxyalkylene polyamine ($\eta$, units: mPa·s/25° C.).

The method described in JIS K-1557 was followed.

(22) H-T bond selectivity of polyoxyalkylene polyamine

Same method as described in the section on polyoxyalkylene polyol described above.

The catalyst for synthesis of polyoxyalkylene polyol which was used in the manufacture of polyoxyalkylene polyamine was phosphazenium compound b (P5NMe2OH).

The manufacture device of the polyoxyalkylene polyamine was described below. The manufacture device (will be referred to as autoclave A) of the polyoxyalkylene polyol which was to be used for the manufacture of polyoxyalkylene polyamine was an autoclave (made by Nitto Koatsu Co.) which had an inner capacity of 2.5 L and which was equipped with an agitating device, thermometer, pressure meter, nitrogen inlet opening, and alkylene oxide monomer inlet opening.

The manufacture device (will be referred to as autoclave B) of the polyoxyalkylene polyamine was an autoclave (made by Nitto Koatsu Co.) which had an inner capacity of 1.0 L and was equipped with an agitating device, thermometer, pressure meter, nitrogen inlet opening, hydrogen and liquid ammonia inlet opening.

Example 32

Polyoxyalkylene Polyamine A

In a 500 mL four port flask which were equipped with an agitating device, nitrogen inlet pipe, and thermometer, 0.009 moles of P5NMe2OH and 0.02 moles of toluene for every 1 mole of glycerin were added. While nitrogen entered through a capillary tube, vacuum dehydration and toluene removal operation was conducted for 3 hours under conditions of 105° C., 10 mm Hgabs. (1,330 Pa). Afterwards, the flask content was placed in autoclave A. After conducting nitrogen substitution, the reaction temperature was made to be 80° C. from vacuum conditions of 10 mmHgabs. (1,330 Pa), and with a maximum reaction pressure of 4 kgf/cm² (392 kPa), addition polymerization of propylene oxide was conducted until OHV of 33.6 mgKOH/g was reached. Once the internal pressure of autoclave A stabilized at a constant pressure, vacuum treatment was conducted for 40 minutes at 105° C., 5 mm Hgabs (665 Pa). Crude polyoxyalkylene polyol was obtained.

For every 100 weight parts of crude polyoxyalkylene polyol which contained phosphazenium compound, 5 weight parts of Ni diatomaceous earth catalyst (Ni content 50 weight %, same as below) was added in autoclave B. Under condition of 10 kgf/cm² (980 kPa), nitrogen substitution was conducted 5 times. For 1 equivalent of hydroxyl group of the crude polyoxyalkylene polyol, 10 equivalents of liquid ammonia was added in. Next, hydrogen was added in until. pressure of 50 kgf/cm² (4900 kPa) was reached. While agitating, the temperature was raised to 220° C. The reaction was conducted for 8 hours. The maximum pressure was 63 kgf/cm² (6174 kPa). After the completion of the reaction, vacuum drying was conducted for 20 minutes under condition of 105° C., 10 mmHgabs. (1,330 Pa) or lower. Excess ammonia in the polyoxyalkylene polyamine was removed. Next, for every 100 weight parts of polyoxyalkylene polyamine, 0.3 weight parts of adsorbent (Tomita Pharmaceutical Co. trade name: AD-600 NS, same as below) was added. Processing was conducted for 2 hours at 80° C. Next, the catalyst and adsorbent were removed by vacuum filtration using 5C filter paper from Advantech Toyo Corp. The resulting polyoxyalkylene polyamine had active hydrogen value of 33.6 mgKOH/g, total amine value of 29.8 mgKOH/g, primary amine value of 29.0 mgKOH/g, secondary amine value of 0.8 mg KOH/g, tertiary amine value was not detected. Viscosity ($\eta$) was 700 mPa·s/25° C., H-T bond selectivity was 96.0 mol %.

Example 33
Polyoxyalkylene Polyamine B

Into a 500 mL four port flask which were equipped with an agitating device, nitrogen inlet pipe, and thermometer, 0.020 moles of P5NMe2OH and 0.04 moles of toluene for every 1 mole of dipropylene glycol were added. While nitrogen entered through a capillary tube, vacuum dehydration and toluene removal operation was conducted for 3 hours under conditions of 105° C., 10 mm Hgabs. (1,330 Pa). Afterwards, the flask content was placed in autoclave A. After conducting nitrogen substitution, the reaction temperature was made to be 70° C. from vacuum conditions of 10 mmHgabs. (1,330 Pa), and with a maximum reaction pressure of 4 kgf/cm² (392 kPa), addition polymerization of propylene oxide was conducted until OHV of 32 mgKOH/g was reached. Next, gauge pressure was adjusted to 1.2 kgf/cm² (219 kPa) by nitrogen. Under conditions of reaction temperature 70° C., maximum reaction pressure of 4 kgf/cm² (392 kPa), addition polymerization of ethylene oxide was conducted until OHV of 28 mgKOH/g was reached. Furthermore, once the internal pressure of autoclave A stabilized at a constant pressure, vacuum treatment was conducted for 20 minutes at 105° C., 5 mm Hgabs (665 Pa). The reaction temperature was made to be 70° C. from atmospheric condition, and with the maximum reaction pressure of 4 kgf/cm² (392 kPa), addition polymerization of propylene oxide was conducted until OHV of 18.5 mgKOH/g was reached. Crude polyoxyalkylene polyol was obtained.

For every 100 weight parts of crude polyoxyalkylene polyol which contained phosphazenium compound, 5 weight parts of Ni diatomaceous earth catalyst (Ni content 50 weight %, same as below) were added in autoclave B. Under condition of 10 kgf/cm² (980 kPa), nitrogen substitution was conducted 5 times. For 1 equivalent of hydroxyl group of the crude polyoxyalkylene polyol, 10 equivalents of liquid ammonia was added in. Next, hydrogen was added in until pressure of 50 kgf/cm² (4900 kPa) was reached. While agitating, the temperature was raised to 220° C. Reaction was conducted for 8 hours. The maximum pressure was 60 kgf/cm² (5880 kPa). After the completion of the reaction, vacuum drying was conducted for 20 minutes under conditions of 105° C., 10 mmHgabs. (1,330 Pa) or lower. Excess ammonia in the polyoxyalkylene polyamine was removed. Next, refining of the polyoxyalkylene polyamine was conducted by vacuum filtration using 5C filter paper from Advantech Toyo Corp. The resulting polyoxyalkylene polyamine had a active hydrogen value of 18.5 mgKOH/g, total amine value of 16.1 mgKOH/g, primary amine value of 15.6 mgKOH/g, secondary amine value of 0.48 mgKOH/g, tertiary amine value was not detected. Viscosity ($\eta$) was 1100 mPa·s/25° C., H-T bond selectivity was 97.0 mol %.

Example 34
Polyoxyalkylene Polyamine C

In a 500 ml four port flask which were equipped with an agitating device, nitrogen inlet pipe, and thermometer, 0.010 moles of P5NMe2OH and 0.04 moles of toluene for every 1 mole of glycerin were added. While nitrogen entered through a capillary tube, vacuum dehydration and toluene removal operation was conducted for 3 hours under conditions of 105° C., 10 mm Hgabs. (1,330 Pa). Afterwards, the flask content was placed in autoclave A. After conducting nitrogen substitution, the reaction temperature was made to be 75~82° C. from vacuum condition of 10 mmHgabs. (1,330 Pa), and with the maximum reaction pressure of 4.8 kgf/cm² (470 kPa), a multistep addition polymerization of propylene oxide was conducted until OHV of 28.5 mgKOH/g was reached. Once the internal pressure of autoclave A stabilized at a constant pressure, vacuum treatment was conducted for 50 minutes at 105° C., 5 mm Hgabs (665 Pa). Crude polyoxyalkylene polyol was obtained.

For every 100 weight parts of crude polyoxyalkylene polyol which contained phosphazenium compound, 5 weight parts of Ni diatomaceous earth catalyst (Ni content 50 weight %) were added in autoclave B. Under condition of 10 kgf/cm² (980 kPa), nitrogen substitution was conducted 5 times. For 1 equivalent of hydroxyl group of the crude polyoxyalkylene polyol, 10 equivalents of liquid ammonia was added in. Next, hydrogen was added in until pressure of 50 kgf/cm² (4900 kPa) was reached. While agitating, the temperature was raised to 220° C. Reaction was conducted for 8 hours. The maximum pressure was 65 kgf/cm² (6370 kPa). After the completion of the reaction, vacuum drying was conducted for 20 minutes under condition of 105° C., 10 mmHgabs. (1,330 Pa) or lower. Excess ammonia in the polyoxyalkylene polyamine was removed. Next, for every 100 weight parts of polyoxyalkylene polyamine, 0.3 parts of adsorbent AD-600NS was added. Refining process was conducted for 3 hours at 80° C. Next, adsorbent, catalysts were removed by vacuum filtration using 5C filter paper from Advantech Toyo Corp. The resulting polyoxyalkylene polyamine had the active hydrogen value of 28.5 mgKOH/g, total amine value of 25.0 mgKOH/g, primary amine value of 24.0 mgKOH/g, secondary amine value of 1.00 mgKOH/g, tertiary amine value was not detected. Viscosity ($\eta$) was 1050 mPa·s/25° C., H-T bond selectivity was 96.4 mol %.

The comparative examples are indicated below. In the comparative example, we used DMC and KOMe which were the catalysts for synthesis of polyoxyalkylene polyol above.

Comparative Example 29
Polyoxyalkylene Polyamine D

For every 100 weight parts of polyoxypropylene polyol MN1OOO (Mitsui Chemicals Inc., OHV 168 mgKOH/g) in which propylene oxide is added to glycerin, 0.5 weight parts of DMC was added. Under conditions of 105° C., 10 mmHgabs. (1,330 Pa) or less, vacuum dehydration was conducted for 3 hours. Next, the compound was added in autoclave A. Under conditions of reaction temperature 80° C., maximum reaction pressure of 4 kgf/cm$^2$ (392 kPa), propylene oxide was added until OHV of 33.6 mgKOH/g was achieved. A crude polyoxypropylene polyol which contained DMC was obtained.

For every 100 weight parts of this polyoxypropylene polyol, 2.22 weight parts of 30 weight % potassium methylate (KOMe) methanol solution was added. Methanol removal reaction was conducted for 2 hours at 90° C., 20 mmHgabs. (2,660 Pa). Afterwards, 3 weight parts water and 5 weight parts of adsorbent AD-600NS (Tomita Pharmaceutical Co.) were added. This was agitated for 2 hours under nitrogen. atmosphere at 90° C. Next, vacuum filtration was conducted using Advantech Toyo Corp. 5C filter paper. After filtration, vacuum dehydration was conducted for 2 hours under condition of 120° C., 10 mmHgabs. (1,330 Pa) or less. DMC removal operation was conducted.

For every 100 weight parts of the resulting polyoxyalkylene polyol, 5 weight parts of Ni diatomaceous earth catalyst (Ni content 50 weight %) were placed in autoclave B. Under condition of 10 kgf/cm$^2$ (980 kPa), nitrogen substitution was conducted 5 times. For 1 equivalent of hydroxyl group of the polyoxyalkylene polyol, 10 equivalents of liquid ammonia was added in. Next, hydrogen was added in until pressure of 50 kgf/cm$^2$ (4900 kPa) was reached. While agitating, the temperature was raised to 220° C. The reaction was conducted for 8 hours. The maximum pressure was 69 kgf/cm$^2$ (6762 kPa). After the completion of the reaction, vacuum drying was conducted for 20 minutes under condition of 105° C., 10 mmHgabs. (1,330 Pa) or lower. Excess ammonia in the polyoxyalkylene polyamine was removed. Next, adsorbent, catalyst was removed by vacuum filtration using 5C filter paper from Advantech Toyo Corp. The resulting polyoxyalkylene polyamine had the active hydrogen value of 33.6 mg KOH/g, total amine value of 29.9 mgKOH/g, primary amine value of 29.3 mgKOH/g, secondary amine value of 0.6 mgKOH/g, tertiary amine value was not detected. Viscosity ($\eta$) was 2500 mPa·s/25° C., H-T bond selectivity was 87.5 mol %.

Comparative Example 30
Polyoxyalkylene Polyamine E

For every 100 weight parts of polyoxypropylene polyol Diol 400 (Mitsui Chemicals Inc.) in which propylene oxide is addition polymerized to propylene glycol, 0.03 weight parts of DMC was added. Under conditions of 105° C., 10 mmHgabs. (1,330 Pa) or less, vacuum dehydration was conducted for 3 hours. Next, the compound was placed in autoclave A. Under condition of reaction temperature 80° C., maximum reaction pressure of 4 kgf/cm$^2$ (392 kPa), propylene oxide was addition polymerized until OHV of 32.0 mgKOH/g was achieved. A crude polyoxypropylene polyol which contained DMC was obtained.

For every 100 weight parts of this polyoxypropylene polyol, 2.9 weight parts of 30 weight % potassium methylate (KOMe) methanol solution was added. Methanol removal reaction was conducted for 2 hours at 90° C., 20 mmHgabs. (2,660 Pa). Afterwards, 3 weight parts water and 5 weight parts of adsorbent AD-600NS (Tomita Pharmaceutical Co.) were added. This was agitated for 2 hours under nitrogen. atmosphere at 90° C. Next, vacuum filtration was conducted using Advantech Toyo Corp. 5C filter paper. After filtration, vacuum dehydration was conducted for 2 hours under conditions of 120° C., 10 mmHgabs. (1,330 Pa) or less. DMC removal operation was conducted. In order to conduct addition polymerization of ethylene oxide, 2.5 weight parts of 30 weight % KOMe methanol solution was added for every 100 weight parts of polyoxypropylene polyol after DMC removal. Methanol removal reaction was conducted for 3 hours at 100° C., 10 mmHgabs. (1330 Pa) or less. The compound was placed in autoclave A. After nitrogen substitution, under conditions of reaction temperature 80° C., maximum pressure 4 kgf/cm$^2$ (392 kPa) at the time of reaction, ethylene oxide was added in and reacted until OHV of 28.0 mgKOH/g was achieved. In order to conduct addition polymerization of propylene oxide using DMC, potassium was removed from the polyoxyalkylene polyol.

For every 1 mol of potassium in the crude polyoxyalkylene polyol, 1.2 moles of phosphoric acid (75.1 weight % phosphoric acid solution) was added in. For every 100 weight parts of crude polyoxyalkylene polyol, 4 weight parts of ion exchange water was added in. Neutralization reaction was conducted for 2 hours at 90° C. 8,000 ppm of adsorbent (Kyouwa Chemical Industry Co. trade name: KW-700SN) was added. Under vacuum, while water was removed, vacuum dehydration was conducted for 3 hours under final conditions of 105° C., 10 mmHgabs. (1,330 Pa). After returning to atmospheric pressure with nitrogen, vacuum filtration was conducted using 5C filter paper from Advantech Toyo Corp. Recovery of polyoxyalkylene polyol was conducted. For every 100 weight parts of this polyoxyalkylene polyol, 0.01 weight parts of DMC was added. Under conditions of 105° C., 10 mmHgabs. (1,330 Pa), vacuum dehydration was conducted for 3 hours. Under conditions of reaction temperature 80° C., maximum reaction pressure of 4 kgf/cm$^2$ (392 kPa), addition polymerization of propylene oxide was conducted until OHV of 18.6 mgKOH/g was reached. The removal process of the DMC from this polyoxyalkylene polyol was the same method which was used for KOMe as described above.

For every 100 weight parts of the resulting polyoxyalkylene polyol, 5 weight parts of Ni diatomaceous earth catalyst (Ni content 50 weight %) were placed in autoclave B. Under condition of 10 kgf/cm$^2$ (980 kPa), nitrogen substitution was conducted 5 times. For 1 equivalent of hydroxyl group of the polyoxyalkylene polyol, 10 equivalents of liquid ammonia was added in. Next, hydrogen was added in until pressure of 50 kgf/cm$^2$ (4900 kPa) was reached. While agitating, the temperature was raised to 220° C. The reaction was conducted for 8 hours. The maximum pressure was 62 kgf/cm$^2$ (6080 kPa). After the completion of the reaction, vacuum drying was conducted for 20 minutes under conditions of 105° C., 10 mmHgabs. (1,330 Pa) or lower. Excess ammonia in the polyoxyalkylene polyamine was removed. Next, catalyst was removed by vacuum filtration using 5C filter paper from Advantech Toyo Corp. The resulting polyoxyalkylene polyamine had the active hydrogen value of 18.6 mgKOH/h, total amine value of 16.0 mgKOH/g, primary amine value of 15.5 mgKOH/g, secondary amine value of 0.5 mgKOH/g, tertiary amine value was not detected. Viscosity (η) was 3200 mPa·s/25° C., H-T bond selectivity was 86.0 mol %.

Comparative Example 31
Polyoxyalkyene Polyol F

For every 100 weight parts of polyoxypropylene polyol MN1000 (Mitsui Chemicals Inc.: OHV 168 mgKOH/g) in which propylene oxide is added to glycerin, 0.7 weight parts of DMC was added. Under conditions of 105° C., 10 mmHgabs. (1,330 Pa) or less, vacuum dehydration was conducted for 3 hours. Next, the compound was placed in autoclave A. Under condition of reaction temperature 80° C., maximum reaction pressure of 4 kgf/cm² (392 kPa), propylene oxide was addition polymerized until OHV of 28.1 mgKOH/g was achieved. A crude polyoxypropylene polyol which contained DMC was obtained.

Next, DMC removal process from the crude polyoxyalkylene polyol was conducted. For every 100 weight parts of this polyoxypropylene polyol, 3.9 weight parts of 30 weight % potassium methylate (KOMe) methanol solution was added. Methanol removal reaction was conducted for 2 hours at 90° C., 20 mmHgabs. (2,660 Pa). Afterwards, 5 weight parts of water and 5 weight parts of adsorbent AD-600NS (Tomita Pharmaceutical Co.) were added. They were stirred for 2 hours under nitrogen atmosphere at 90° C. Next, vacuum filtration was conducted using Advantech Toyo Corp. 5C filter paper. After filtration, vacuum dehydration was conducted for 2 hours under condition of 120° C., 10 mmHgabs. (1,330 Pa). Recovery of polyoxyalkylene polyol was conducted.

For every 100 weight parts of the resulting polyoxyalkylene polyol, 5 weight parts of Ni diatomaceous earth catalyst (Ni content 50 weight %) was added in autoclave B. Under condition of 10 kgf/cm² (980 kPa), nitrogen substitution was conducted 5 times. For 1 equivalent of hydroxyl group of the polyoxyalkylene polyol, 10 equivalents of liquid ammonia was added in. Next, hydrogen was added in until pressure of 50 kgf/cm² (4900 kPa) was reached. While agitating, the temperature was raised to 220° C. The reaction was conducted for 8 hours. The maximum pressure was 65 kgf/cm² (6370 kPa). After the completion of the reaction, vacuum drying was conducted for 20 minutes under condition of 105° C., 10 mmHgabs. (1,330 Pa) or lower. Excess ammonia in the polyoxyalkylene polyamine was removed. Next, catalyst was removed by vacuum filtration using 5C filter paper from Advantech Toyo Corp. The resulting polyoxyalkylene polyamine had the active hydrogen value of 28.1 mgKOH/g, total amine value of 24.4 mgKOH/g, primary amine value of 23.7 mgKOH/g, secondary amine value of 0.7 mgKOH/g, tertiary amine value was not detected. Viscosity (η) was 2350 mPa·s/25° C., H-T bond selectivity was 86.3 mol %.

Referring to Table 13, the active hydrogen value, amine value, viscosity (η), and the H-T bond selectivity for the polyoxyalkylene polyamines (will be referred as polyamine) of Examples 32~34, Comparative Examples 29~31 are summarized.

TABLE 13

Examples 32–34, Comparative Examples 29–31

|  |  | Examples | | | Comparative Examples | | |
|---|---|---|---|---|---|---|---|
|  |  | 32 | 33 | 34 | 29 | 30 | 31 |
| Polyamine |  | A | B | C | D | E | F |
| #28 Initi. & cata. (m.r.) | Gly | 1 | — | 1 | — | — | — |
|  | DPG | — | 1 | — | — | — | — |
|  | P5NMe2OH | 0.009 | 0.020 | 0.010 | — | — | — |
| #29 Initi. & cata. (wt. P.) | MN-1000 | — | — | — | 100 | — | 100 |
|  | Diol-400 | — | — | — | — | 100 | — |
|  | DMC | — | — | — | 0.5 | 0.03 | 0.7 |
| PO addition polymerization temp. (° C.) |  | 80 | 70 | 75–82 | 80 | 80 | 80 |
| Maximum pressure (kPa) |  | 392 | 392 | 470 | 392 | 392 | 392 |
| EO addition polymerization temp. (° C.) |  | — | 70 | — | — | 80 | — |
| Maximum pressyre (kPa) |  | — | 392 | — | — | 392 | — |
| PO addition polymerization temp. (° C.) |  | — | 70 | — | — | 80 | — |
| Maximum pressure (kPa) |  | — | 392 | — | — | 392 | — |
| Amination reaction temp. (° C.) |  | 220 | 220 | 220 | 220 | 220 | 220 |
| Maximum pressure (kPa) |  | 6174 | 5880 | 6370 | 6762 | 6080 | 6370 |
| Active hydrogen value (mgKOH/g) |  | 33.6 | 18.5 | 28.5 | 33.6 | 18.6 | 28.1 |
| Total amine value (mgKOH/g) |  | 29.8 | 16.1 | 25.0 | 29.9 | 16.0 | 24.4 |
| Primary amine value (mgKOH/g) |  | 29.0 | 15.6 | 24.0 | 29.3 | 15.5 | 23.7 |
| Secondary amine value (mgKOH/g) |  | 0.80 | 0.48 | 1.00 | 0.60 | 0.50 | 0.70 |
| Tertiary amine value (mgKOH/g) |  | 0 | 0 | 0 | 0 | 0 | 0 |
| η (mPa · s/25° C.) |  | 700 | 1100 | 1050 | 2500 | 3200 | 2350 |
| H-T (mol %) |  | 96.0 | 97.0 | 96.4 | 87.5 | 86.0 | 86.3 |

28: Initiator and catalyst (mol ratio)
29: Initiator and catalyst (weight parts)

For the initiators, Gly is an abbreviation for glycerin, DPG for dipropylene glycol. DMC is an abbreviation for double metal cyanide complex. PO is an abbreviation for propylene oxide. EO is for ethylene oxide. In the table, the analysis values for the polyoxyalkylene polyol are determined by the method described previously.

Comments 7 on Examples

From Examples 32~34, Comparative Examples 29~31, the polyoxyalkylene polyamine of the present invention which had as its precursor a polyoxyalkylene polyol which used phosphazenium compound as the polymerization catalyst for an alkylene oxide had a lower viscosity compared with a polyoxyalkylene polyamine in which DMC catalyzed polyol was used. With a DMC catalyst, during the copolymerization reaction of ethylene oxide, DMC had to first be inactivated by a reaction with an alkali metal compound (potassium methylate). Next, the ethylene oxide had to polymerized by the alkali metal compound catalyst. The operation was complicated. On the other hand, with a phosphazenium catalyst from the present invention, even with the copolymerization reaction with ethylene oxide, no complicated operation was necessary, and a low viscosity polyoxyalkylene polyamine could be obtained.

Polyurethane Urea Resin

Next, in order to illustrate the effects of the polyoxyalkylene polyamine (will be referred to as polyamine) of the present invention, examples and comparative examples are described.

Using the polyamines obtained from Example 32 (polyamine A), Example 34 (polyamine C), Comparative Example 29 (polyamine D), and Comparative Example 31 (polyamine F), RIM molding was conducted with a metal mold by a polyurethane injection molding machine. For the polyurethane injection molding machine, model NR-230 of Toho Kikai Co. and LRM-150M of Cincinnati Milactone Co. were used.

DEDTA (a mixture of 3,5-diethyl-2,4-diamino toluene and 3,5-diethyl-2,6-diamino toluene at a weight ratio of 80:20, made by.Ethyl Corporation) which was a polyamine chain extender was mixed with polyamine. Next, it was adequately vacuum defoamed (below, this component will be referred as amine mixture solution).

The polyisocyanate compound was an isocyanate terminated prepolymer (will be referred to as prepolymer) in which cosmonate PH (4,4'-diphenyl methane diisocyanate, made by Mitsui Chemicals Inc.) and tripropylene glycol were reacted. This prepolymer had an isocyanate content (NCO %) of 22.5 weight %. This prepolymer was adequately vacuum defoamed before molding.

The temperature of the amine mixture solution described above was adjusted to 35° C., and that of the prepolymer to 45° C. Molding was conducted under the condition of the injection speed of 250 g/s, injection time of 2 seconds. For the metal mold, an aluminum mold which had been heated to 75° C. was used. It had dimensions of 500 mm×400 mm×3.0 mm.

(23) Filling properties of polyurethane urea resin

By the above method, the sample was injected into the metal mold and molded. After 30 seconds it is released from the mold. The interior of the metal mold was observed by eye, and the filling property of the resin was studied. The evaluation standards were as below.

○: Resin uniformly filled metal mold.
X: resin filled the metal mold in a non-uniform manner.

(24) Surface conditions of the polyurethane urea resin

The molded product obtained from before was observed by eye. The surface conditions of the resin were studied. The evaluation criteria were as below.

○: there are no wrinkles, voids on the surface, it is smooth and flat,
X: there are wrinkles, voids.

(25) Properties of polyurethane urea resin

A sample piece was cut from the molded product. After heating for 2 hours at 120° C. in an oven, the properties of the resin were measured. For the elongation, hardness, tensile strength, the method described in JIS K-7312 was followed.

(26) Density of polyurethane urea resin

Using Mirage Co.'s electronic densimeter (model: SD-120L), the density at temperature of 23° C. was measured.

Referring to Table 14, mixing ratio of the materials, filling property immediately after molding, surface conditions, and property measurement results are shown. Referring to Table 14, polyamine was polyoxyalkylene polyamine, DETDA was diethyl diamino toluene described above, and prepolymer was isocyanate terminated prepolymer described above.

TABLE 14

Examples 35–36, Comparative Examples 32–33

|  |  | Examples | | Comparative Examples | |
|---|---|---|---|---|---|
|  |  | 35 | 36 | 32 | 33 |
|  | Polyamine | A | C | D | F |
| Material ratio (wt. parts) | Polyamine | 100 | 100 | 100 | 100 |
|  | DETDA | 30 | 30 | 30 | 30 |
|  | Prepolymer | 78 | 77 | 78 | 77 |
| Moldability | Filling property | ○ | ○ | × | × |
|  | Surface condition | ○ | ○ | × | × |
| Density (g/cm3) |  | 1.15 | 1.15 | 1.14 | 1.15 |
| Properties | Hardness (Shore D) | 68D | 65D | 63D | 62D |
|  | Elongation (%) | 300 | 310 | 210 | 220 |
|  | Tensile strength (MPa) | 40.2 | 36.8 | 35.8 | 34.3 |

Comments 8 on Examples

From Examples 35~36 and Comparative Examples 32~33, the polyurethane urea resin which used the polyoxyalkylene polyamine of the present invention had better filling properties to the metal mold and improved surface conditions of the molded product compared with the polyamine which had DMC-catalyzed polyol as its precursor. Furthermore, the polyurethane urea resin which used the polyoxyalkylene polyamine excels in terms of mechanical properties, such as elongation, hardness, and tensile strength, or the like.

Possible Uses in Industry

The polyoxyalkylene polyol of the present invention which was catalyzed by phosphazenium compounds had a higher H-T bond electivity compared with the method in which DMC was used. The molecular weight distribution of the main reaction components was also sharper. As a result, it had the characteristic of low viscosity, and has a low content of monool. Furthermore, in the case of DMC catalyst, when having triblock copolymerization of propylene oxide, ethylene oxide, and propylene oxide, there was a need for complicated reaction operations in which catalysts need to be switched. On the other hand, with the present invention, the complicated reaction procedures were unnecessary because phosphazenium compound catalysts were used.

Furthermore, if cesium hydroxide which was an alkali metal hydroxide was used as a catalyst, the H-T bond selectivity of the polyoxyalkylene polyol was high, and the viscosity was low. However, in order to reduce the monool content, the reaction time for the polyoxyalkylene polyol became long, and this was a disadvantage for production. On the other hand, with the present invention, it is possible to efficiently produce high molecular weight polyoxyalkylene polyol with low content of monool.

The polymer dispersed polyol of the present invention used as its dispersal medium a polyoxyalkylene polyol with a low monool content and a high H-T bond selectivity. As a result, it had the characteristic of low viscosity. It could improve the properties for the wide range of polyurethane applications. Furthermore, even if the polymer concentration was increased, it was lower viscosity compared with the prior art. Furthermore, it was a polymer dispersed polyol with no particle aggregation and good dispersal stability.

The isocyanate terminated prepolymer of the present invention used a polyoxyalkylene polyol with a low monool content and a high H-T bond selectivity. As a result, it had the characteristic of low viscosity. It could improve the properties in a wide range of polyurethane applications. Furthermore, the storage stability of the isocyanate terminated prepolymer was excellent.

The isocyanate terminated prepolymer of the present invention in which there was low content of free isocyanate compounds had a lower viscosity compared with prepolymers which used DMC catalyst and CsOH catalysts. As a result, the usage amount of plasticizers, organic solvents, and the like could be reduced, and it had excellent processability.

The polyurethane resin of the present invention had the advantages of excellent hardness, strength at break, elongation, impact resilience, tear strength, water resistance, and low hysterisis compared with ones which used DMC catalysts and CsOH catalysts. Furthermore, the polyurethane resin of the present invention had low tack, and little surface contamination.

Furthermore, the polyoxyalkylene polyamine of the present invention had a low viscosity. The surface conditions were good, and a polyurethane urea resin with excellent mechanical properties could be provided.

As a result, the polyoxyalkylene polyol, polymer dispersed polyol, isocyanate terminated prepolymer, and polyoxyalkylene polyamine of the present invention can be used as the raw material for the following fields: rigid, semirigid, flexible polyurethane foam; paints; adhesives, floor materials, water resistant material, sealant, shoe soles, elastomer, lubricating agent, work fluid, and sanitary products. It is a remarkably useful material. Furthermore, the polyoxyalkylene polyamine of the present invention is a useful compound as material for a variety of plastics such as epoxy resin, polyamide, polyimide, or the like.

What is claimed is:

1. A polyoxyalkylene polyol obtained by using a phosphazenium compound as a catalyst wherein said polyoxyalkylene polyol has:

a hydroxyl value (OHV) of 2~200 mgKOH/g;

a total degree of unsaturation (C=C) of 0.0001~0.07 meq./g;

a head to tail (H-T) bond selectivity of the polyoxyalkylene polyol resulting from addition polymerization of propylene oxide is 95 mole % or greater;

$W_{20}/W_{80}$ is 1.5 to less than 3; and a residual amount of said phosphazenium compound catalyst is 150 ppm or less.

2. A polyoxyalkylene polyol as described in claim 1, wherein:

said phosphazenium compound is a salt of a phosphazenium cation shown in formula (1) and an inorganic anion;

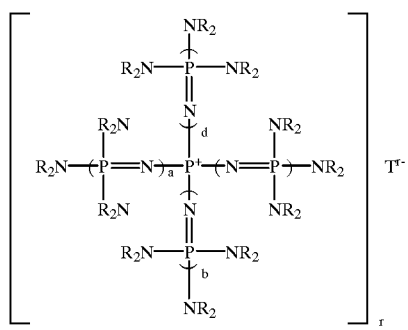

or it is a phosphazenium compound shown in formula (2)

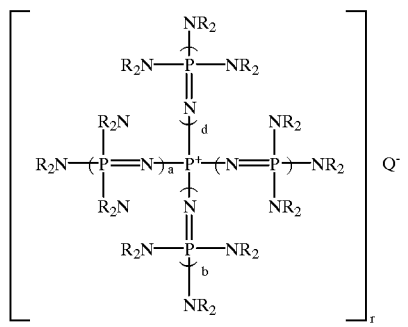

wherein in formulas (1) and (2), a, b, c, d are integers from 0~3 where all four are not 0; R is a hydrocarbon group of the same type or different types with a carbon number of 1~10 and two R's from the same nitrogen atom can be bonded to form a ring structure; in formula (1), r is an integer from 1~3 and is the number of phosphazenium cations; $T^{r-}$ represents an inorganic anion with a valency of r; and $Q^-$ in formula (2) represents an anion selected from the group consisting of hydroxy anion, alkoxy anion, aryloxy anion, and carboxy anion.

3. A polyoxyalkylene polyol as described in claim 1, wherein:

OHV is 9~120 mgKOH/g;

C=C is 0.0001~0.05 meq./g;

H-T bond selectivity is 96 mole % or greater; and $W_{20}/W_{80}$ is 2 to, less than 3.

4. A polyoxyalkylene polyol as described in claim 1, wherein:

C=C is 0.0001~0.03 meq./g.

5. A manufacture method for a polyoxyalkylene polyol, wherein:

in the presence of a salt of a phosphazenium cation represented by formula (1) and an inorganic anion and an alkali metal salt or an alkali earth metal salt, or in the presence of a phosphazenium compound represented by formula (2) and an active hydrogen compound, the amount of said phosphazenium compound represented by formulas (1) or (2) is prepared in the range of $1 \times 10^{-4} \sim 5 \times 10^{-1}$ moles for every 1 mole of active hydrogen compound;

under the conditions of reaction temperature 15~130° C. and maximum reaction pressure of 882 kPa (9 kgf/ cm²), alkylene oxide is addition polymerized to produce a crude polyoxyalkylene polyol;

next, removal of said phosphazenium compound which is contained in said crude polyoxyalkylene polyol is conducted by a method selected from the group consisting of methods e~h described below;

e. for every 100 weight parts of said crude polyoxyalkylene polyol, 1~40 weight parts of water is added; next, for every 1 mole of phosphazenium compound in the crude polyoxyalkylene polyol, 0.5~8 moles of inorganic acid or organic acid is added; the phosphazenium compound is neutralized at 50~130° C.; next, for every 100 weight parts of crude polyoxyalkylene polyol, 0.005~2.5 weight parts of adsorbent is added; water is removed through vacuum processing; and phosphazenium salt and adsorbent are removed by filtration;

f. for every 100 weight parts of said crude polyoxyalkylene polyol, 1~40 weight parts of a mixture of water and an organic solvent which is inactive to polyoxyalkylene polyol is added; next, for every 1 mole of phosphazenium compound in said crude polyoxyalkylene polyol, 0.5~8 moles of inorganic acid or organic acid is added; said phosphazenium compound is neutralized at 50~130° C.; next, for every 100 weight parts of crude polyoxyalkylene polyol, 0.005~2.5 weight parts of adsorbent is added; water and organic solvent are removed by vacuum processing; and phosphazenium salt and adsorbent are removed by filtration;

g. for every 100 weight parts of crude polyoxyalkylene polyol, 1~200 weight parts of water only or a mixture of water and organic solvent which is inactive to polyoxyalkylene polyol is added; liquid separation is conducted; and after rinsing, water and organic solvent are removed by vacuum processing; and h. for every 100 weight parts of crude polyoxyalkylene polyol, 20~200 weight parts of water is added; and after bringing into contact with an ion exchange resin at 15~100° C., water is removed by vacuum processing, wherein formulas (1) and (2) are as follows:

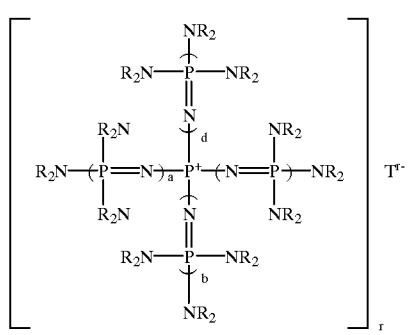
(1)

or it is a phosphazenium compound shown in formula (2)

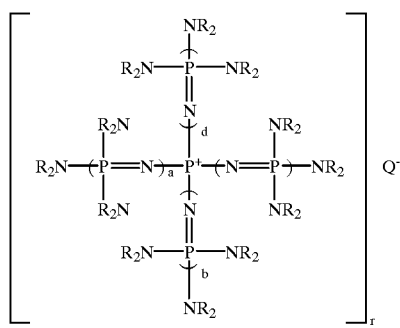
(2)

wherein in formulas (1) and (2), a, b, c, d are integers from 0~3 where all four are not 0; R is a hydrocarbon group of the same type or different types with a carbon number of 1~10 and two R's from the same nitrogen atom can be bonded to form a ring structure; in formula (1), r is an integer from 1~3 and is the number of phosphazenium cations; $T^{r-}$ represents an inorganic anion with a valency of r; and $Q^-$ in formula (2) represents an anion selected from the group consisting of hydroxy anion, alkoxy anion, aryloxy anion, and carboxy anion.

6. A polyoxyalkylene polyol manufacture method as described in claim 5, wherein:

in methods e and f described above, for every 1 mole of said phosphazenium compound in said crude polyoxyalkylene polyol, 0.5~2.5 moles of said inorganic acid or organic acid, and for every 100 weight parts of said crude polyoxyalkylene polyol, 0.005~1.5 weight parts of said adsorbent are added.

7. A polyoxyalkylene polyol manufacture method as described in claim 5, wherein:

in chemical formula (1), a, b, c, d, and r are all 1, and $T^-$ is a chlorine ion.

8. A polyoxyalkylene polyol manufacture method as described in claim 5, wherein:

in chemical formula (2), a, b, c, d, and r are all 1, and $Q^-$ is a hydroxy anion.

9. A polyoxyalkylene polyol manufacture method as described in claim 5, wherein:

the amount of phosphazenium compound represented by formula (1) or (2) is prepared in the range of $5 \times 10^{-4} \sim 1 \times 10^{-1}$ moles for every 1 mole of active hydrogen compound;

under the conditions of reaction temperature 40~120° C., maximum reaction pressure of 686 kPa (7 kgf/cm²), alkylene oxide is addition polymerized, and said crude polyoxyalkylene polyol is manufactured.

10. A polymer dispersed polyol, wherein:

polymer particles are dispersed within a polyol;

said polyol is a polyoxyalkylene polyol described in claim 1;

the concentration of said polymer particles is 5~60 weight %.

11. A polymer dispersed polyol as described in claim 10, wherein:

the concentration of said polymer particles is 10~50 weight %.

12. A polymer dispersed polyol as described in claim 10, wherein:

said polymer particles are a polymer obtained from at least one of ethylenically unsaturated monomers selected from the group consisting of acrylonitrile, styrene, acrylamide, and methyl methacrylate.

13. An isocyanate terminated prepolymer, wherein:

said isocyanate terminated prepolymer results from reacting a polyol and an isocyanate;

said polyol is a polyoxyalkylene polyol described in claim 1; and isocyanate group content of said isocyanate terminated prepolymer is 0.3~30 weight %.

14. An isocyanate terminated prepolymer as described in claim 13, wherein:

the CPR of said polyoxyalkylene polyol is 5 or less.

15. An isocyanate terminated prepolymer as described in claim 13, wherein:

isocyanate group content is 0.4~20 weight %.

16. An isocyanate terminated prepolymer as described in claim 13, wherein:

the content of free isocyanate compound is 1 weight % or less.

17. An isocyanate terminated prepolymer, wherein:

said isocyanate terminated prepolymer results from reacting a polyol and an isocyanate;

said polyol is a polymer dispersed polyol described in claim 10; and isocyanate group content of said isocyanate terminated prepolymer is 0.3~30 weight %.

18. An isocyanate terminated prepolymer as described in claim 17, wherein:

isocyanate group content is 0.4~20 weight %.

19. A polyurethane resin, wherein:

said polyurethane resin results from reacting a prepolymer and a chain extender; and said prepolymer contained at least 60 weight % of an isocyanate terminated prepolymer described in claim 13 or 17.

20. A polyurethane resin described in claim 19, wherein:

the content of free isocyanate compounds in said isocyanate terminated prepolymer is 1 weight % or less.

21. A polyurethane resin described in claim 19, wherein:

said prepolymer is a mixture, comprising:

an isocyanate terminated prepolymer described in claim 17; and an isocyanate terminated prepolymer which has a free isocyanate compound content of 1 weight % or less, and which is obtained from at least one type of polyol selected from the group consisting of polytetramethylene glycol, polyethylene adipate, and polycaprolactone polyol.

22. A polyoxyalkylene polyamine, wherein:

said polyoxyalkylene polyamine is a polyol which has its terminal hydroxyl group aminated; and said polyol is a polyoxyalkylene polyol described in one claim from claims 1~4.

23. A polyoxyalkylene polyamine as described in claim 22, wherein:

the active hydrogen value is 5~180 mgKOH/g;

the oxypropylene group content is at least 50 mole %; and

H-T bond selectivity of the oxypropylene group bond is at least 95 mole %.

24. A polyurethane urea resin, wherein:

said polyurethane urea resin is obtained by a reaction of a polyisocyanate compound and a polyol which contained polyoxyalkylene polyamine of claim 22.

* * * * *

UNITED STATES PATENT AND TRADEMARK OFFICE
CERTIFICATE OF CORRECTION

PATENT NO. : 6,207,794 B1
DATED : March 27, 2001
INVENTOR(S) : Satoshi Yamasaki, Yasunori Hara, Satoshi Tamura, Fumio Yamazaki, Hitoshi Watanabe, Mikio Matsufuji, Shinsuke Matsumoto, Ariko Nishikawa, Tsukuru Izukawa, Masaaki Aoki, Tadahito Nobori, Usaji Takaki It is certified that error appears in the above-identified patent and that said Letters Patent is hereby corrected as shown below:

Claim 3,
Line 6, "is 2 to, less than 3" should read -- is 2 to less than 3 --.

Claim 9,
Line 4, "$5 \times 10^{-}$" should read -- $5 \times 10^{-4}$ --; and the "$_4$" that appears on line 5 should be deleted.

Claim 21,
Line 4, the reference to claim "17" should be to claim -- 16 --;
Line 9, the reference to "polyethylene adipate" should read -- polyoxyethylene adipate --.

Signed and Sealed this

Twelfth Day of March, 2002

Attest:

Attesting Officer

JAMES E. ROGAN
Director of the United States Patent and Trademark Office